(12) United States Patent
Oh et al.

(10) Patent No.: US 12,361,598 B2
(45) Date of Patent: Jul. 15, 2025

(54) POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

(71) Applicant: LG ELECTRONICS INC., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 18/032,109

(22) PCT Filed: Oct. 18, 2021

(86) PCT No.: PCT/KR2021/014446
§ 371 (c)(1),
(2) Date: Apr. 14, 2023

(87) PCT Pub. No.: WO2022/080982
PCT Pub. Date: Apr. 21, 2022

(65) Prior Publication Data
US 2023/0419552 A1    Dec. 28, 2023

(30) Foreign Application Priority Data

Oct. 16, 2020   (KR) ........................ 10-2020-0134522

(51) Int. Cl.
*G06T 9/00*    (2006.01)
(52) U.S. Cl.
CPC .................................. *G06T 9/001* (2013.01)

(58) Field of Classification Search
None
See application file for complete search history.

(56) References Cited

FOREIGN PATENT DOCUMENTS

| KR | 10-2017-0135914 A | 12/2017 |
| KR | 10-2018-0035816 A | 4/2018 |
| KR | 10-2018-0117230 A | 10/2018 |
| KR | 10-2019-0082065 A | 7/2019 |

OTHER PUBLICATIONS

"G-PCC codec description v8", SO/IEC JTC 1/SC 29/WG 11, Coding of moving pictures and audio Convenorship: JISC ( Japan ). Oct. 2, 2020. N19525.

*Primary Examiner* — Xiaolan Xu
(74) *Attorney, Agent, or Firm* — Bryan Cave Leighton Paisner LLP

(57) ABSTRACT

A point cloud data transmission method according to embodiments may comprise the steps of: encoding point cloud data; and transmitting a bitstream including the point cloud data. Further, a point cloud data transmission device according to embodiments may comprise: an encoder for encoding point cloud data; and a transmitter for transmitting a bitstream including the point cloud data. Further, a point cloud data reception method according to embodiments may comprise the steps of: receiving a bitstream including point cloud data; and decoding the point cloud data. Further, a point cloud data reception device according to embodiments may comprise: a receiver for receiving a bitstream including point cloud data; and a decoder for decoding the point cloud data.

17 Claims, 70 Drawing Sheets

FIG. 6
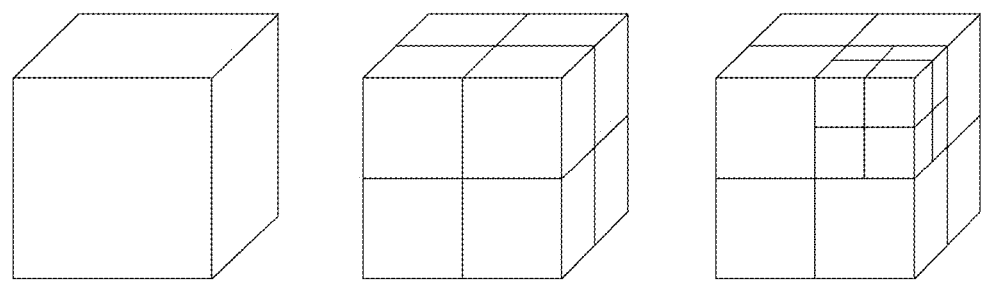
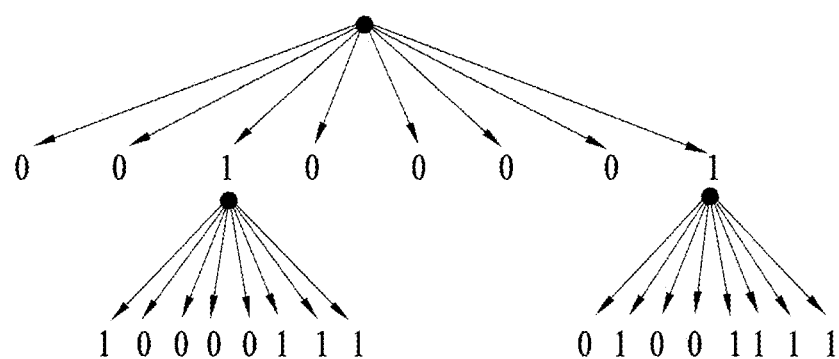

FIG. 7
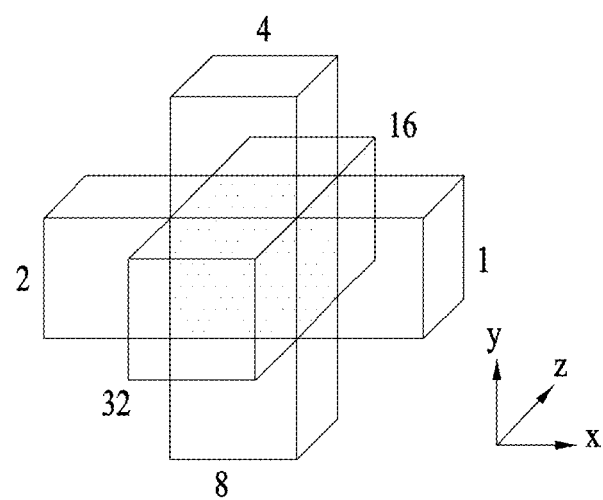
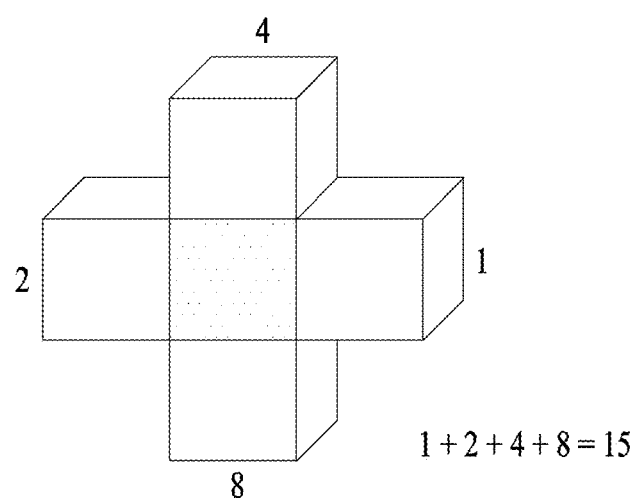
$1+2+4+8=15$

FIG. 20
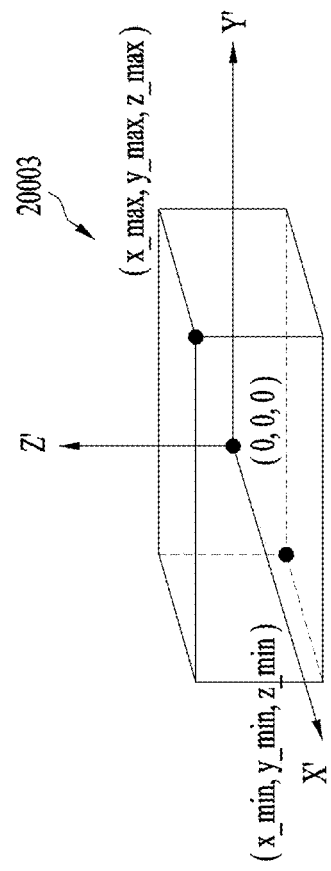
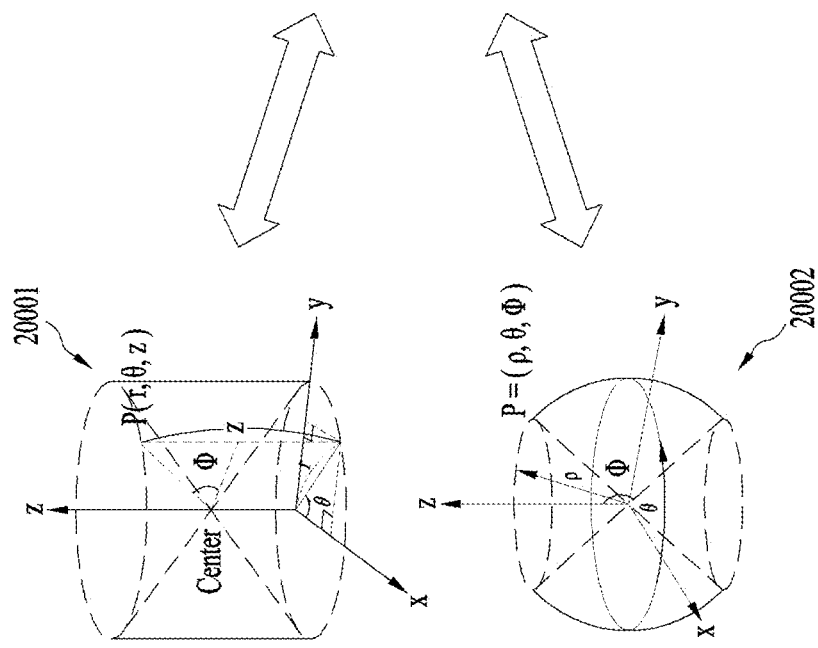

FIG. 21
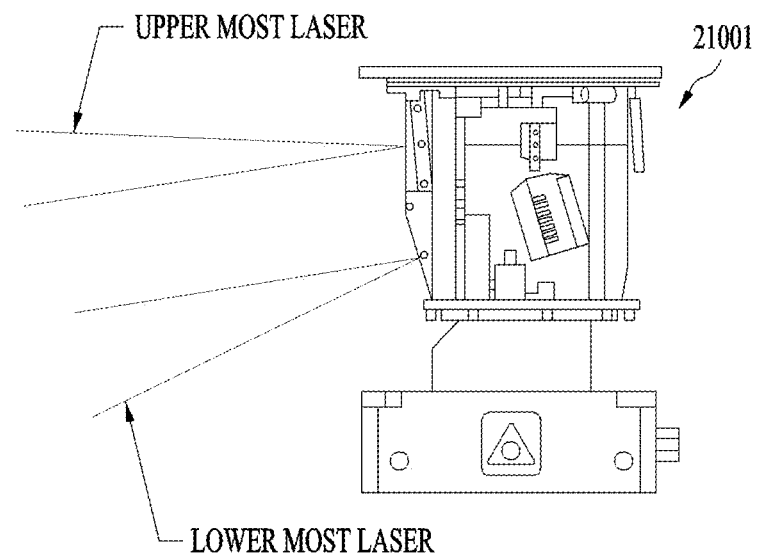
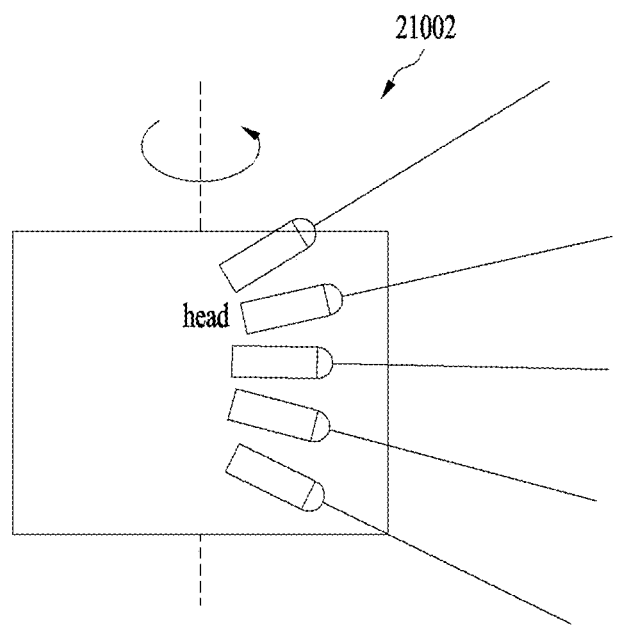

FIG. 22
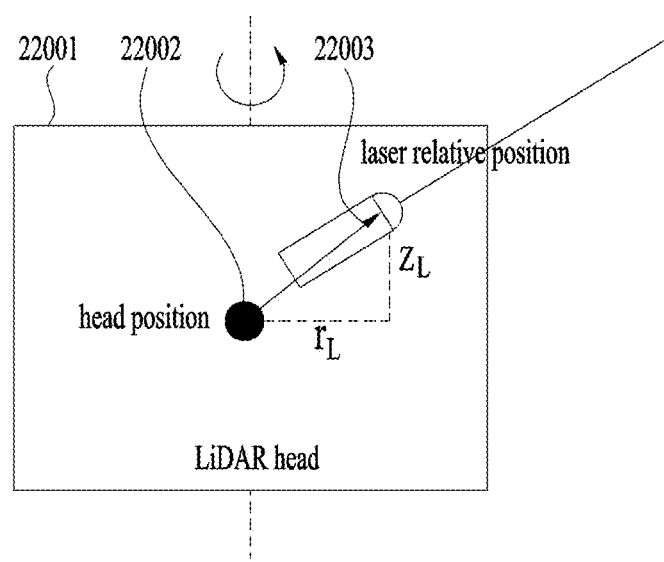
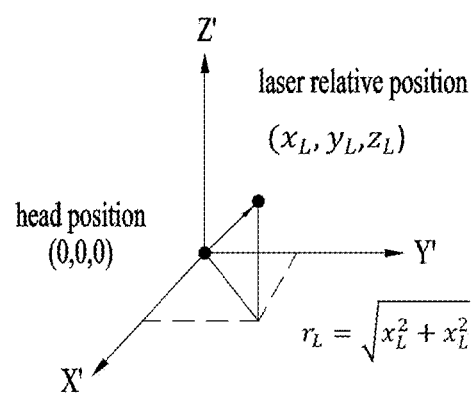

FIG. 26

| seq_parameter_set() { | Descriptor |
|---|---|
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor | u(32) |
| sps_seq_parameter_set_id | ue(v) |
| sps_num_attribute_sets | ue(v) |
| for( i = 0; i < sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| projection_flag | u(1) |
| if(projection_flag) | |
| projection_info ( ) | |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 27

| tile_inventory( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| projection_flag | u(1) |
| if(projection_flag) | |
| projection_info ( ) | |
| } | |
| byte_alignment( ) | |
| } | |

FIG. 28

| general_attribute_slice_bitstream( ) { | Descriptor |
|---|---|
| attribute_slice_header( ) | |
| attribute_slice_data( ) | |
| } | |

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_qp_delta_luma | se(v) |
| ash_qp_delta_chroma | se(v) |
| } | |
| projection_flag | u(1) |
| if(projection_flag) | |
| projection_info ( ) | |
| byte_alignment( ) | |
| } | |

FIG. 29

| projection_info ( ) { | Descriptor |
|---|---|
| projection_info_id | ue(v) |
| coord_conversion_type | u(4) |
| projection_type | u(4) |
| laser_position_adjustment_flag | u(1) |
| if(laser_position_adjustment_flag) { | |
| num_laser | u(8) |
| for( i=0; i<num_laser; i++) { | |
| r_laser[i] | ue(v) |
| z_laser[i] | ue(v) |
| theta_laser[i] | ue(v) |
| } | |
| } | |
| sampling_adjustment_cubic_flag | u(1) |
| sampling_adjustment_spread_bbox_flag | u(1) |
| sampling_adjustment_type | u(4) |
| geo_projection_enable_flag | u(1) |
| attr_projetion_enable_flag | u(1) |
| bounding_box_x_offset | ue(v) |
| bounding_box_y_offset | ue(v) |
| bounding_box_z_offset | ue(v) |
| bounding_box_x_length | ue(v) |
| bounding_box_y_length | ue(v) |
| bounding_box_z_length | ue(v) |
| orig_bounding_box_x_offset | ue(v) |
| orig_bounding_box_y_offset | ue(v) |
| orig_bounding_box_z_offset | ue(v) |
| orig_bounding_box_x_length | ue(v) |
| orig_bounding_box_y_length | ue(v) |
| orig_bounding_box_z_length | ue(v) |
| rotation_yaw | ue(v) |
| rotation_pitch | ue(v) |
| rotation_roll | ue(v) |

FIG. 30

| | |
|---|---|
| if (coord_conversion_type == 0 \|\| coord_conversion_type == 2) { | ue(v) |
|     cylinder_center_y | ue(v) |
|     cylinder_center_z | ue(v) |
|     cylinder_radius_max | ue(v) |
|     cylinder_degree_max | ue(v) |
|     cylinder_z_max | ue(v) |
|     ref_vector_x | ue(v) |
|     ref_vector_y | ue(v) |
|     ref_vector_z | ue(v) |
|     normal_vector_x | ue(v) |
|     normal_vector_y | ue(v) |
|     normal_vector_z | ue(v) |
|     clockwise_degree_flag | u(1) |
|     granurality_radius | ue(v) |
|     granurality_angular | ue(v) |
|     granurality_normal | ue(v) |
| } | |
| else if (coord_conversion_type == 1 \|\| coord_conversion_type == 3) { | |
|     cylinder_center_x | ue(v) |
|     cylinder_center_y | ue(v) |
|     cylinder_center_z | ue(v) |
|     cylinder_radius_max1 | ue(v) |
|     cylinder_radius_max2 | ue(v) |
|     cylinder_degree_max1 | ue(v) |
|     cylinder_degree_max2 | ue(v) |
|     cylinder_z_max | ue(v) |
|     ref_vector_x | ue(v) |
|     ref_vector_y | ue(v) |
|     ref_vector_z | ue(v) |
|     normal_vector_x | ue(v) |
|     normal_vector_y | ue(v) |
|     normal_vector_z | ue(v) |
|     granurality_radius | ue(v) |
|     granurality_angular | ue(v) |
|     granurality_normal | ue(v) |
| } | |
| } | |

FIG. 31A

C1_ai — lossless geometry, lossy attributes [all intra]

| | End-to-End BD-AttrRate [%] | | |
|---|---|---|---|
| | Luma | Chroma Cb | Chroma Cr | Reflextance |
| Cat1-A average | | | | |
| Cat1-B average | | | | |
| Cat3-fused average | | | | |
| Cat3-frame average | | | | -5.4% |
| Overall average | | | | -5.4% |
| Avg. Enc Time [%] | 97% | | | |
| Avg. Dec Time [%] | 94% | | | |

C2_ai — lossy geometry, lossy attributes [all intra]

| | End-to-End BD-AttrRate [%] | | | | Geom. BD-TotGeomRate [%] | |
|---|---|---|---|---|---|---|
| | Luma | Chroma Cb | Chroma Cr | Reflextance | D1 | D2 |
| Cat1-A average | | | | | | |
| Cat1-B average | | | | | 0.0% | 0.0% |
| Cat3-fused average | | | | | | |
| Cat3-frame average | | | | -4.0% | 0.0% | 0.0% |
| Overall average | | | | -4.0% | | |
| Avg. Enc Time [%] | 99% | | | | | |
| Avg. Dec Time [%] | 94% | | | | | |

FIG. 31B

| CW_ai | lossless geometry, lossy attributes [all intra] | | | |
|---|---|---|---|---|
| | bpip ratio [%] | | | |
| | Geometry | Colour | Reflectance | Total |
| Cat1-A average | | | | |
| Cat1-B average | | | | |
| Cat3-fused average | | | | |
| Cat3-frame average | 100.0% | | 98.6% | 99.7% |
| Overall average | 100.0% | | 98.6% | 99.7% |
| Avg. Enc Time [%] | 96% | | | |
| Avg. Dec Time [%] | 96% | | | |

| CY_ai | lossless geometry, lossy attributes [all intra] | | | |
|---|---|---|---|---|
| | EtE Hausdorff BD-AttrRate [%] | | | |
| | Luma | Chroma Cb | Chroma Cr | Reflextance |
| Cat1-A average | | | | |
| Cat1-B average | | | | |
| Cat3-fused average | | | | |
| Cat3-frame average | | | | -2.7% |
| Overall average | | | | -2.7% |
| Avg. Enc Time [%] | 96% | | | |
| Avg. Dec Time [%] | 96% | | | |

FIG. 32

C1_ai — lossless geometry, lossy attributes [all intra]

| C1_ai | End-to-End BD-AttrRate [%] | | |
|---|---|---|---|
| | Luma | Chroma Cb | Chroma Cr | Reflextance |
| Cat1-A average | | | | |
| Cat1-B average | | | | |
| Cat3-fused average | | | | -15.3% |
| Cat3-frame average | | | | -15.3% |
| Overall average | | | | |
| Avg. Enc Time [%] | 98% | | | |
| Avg. Dec Time [%] | 98% | | | |

C2_ai — lossy geometry, lossy attributes [all intra]

| C2_ai | End-to-End BD-AttrRate [%] | | | | Geom. BD-TotGeomRate [%] | |
|---|---|---|---|---|---|---|
| | Luma | Chroma Cb | Chroma Cr | Reflextance | D1 | D2 |
| Cat1-A average | | | | | | |
| Cat1-B average | | | | | | |
| Cat3-fused average | | | | -12.5% | 0.0% | 0.0% |
| Cat3-frame average | | | | -12.5% | 0.0% | 0.0% |
| Overall average | | | | | | |
| Avg. Enc Time [%] | 110% | | | | | |
| Avg. Dec Time [%] | 133% | | | | | |

FIG. 33

| attribute_parameter_set( ) { | Descriptor |
|---|---|
| ...... | |
| attr_coord_conv_enable_flag | u(1) |
| if(attr_coor_conv_enable_flag){ | |
| for ( i=0; i<3; i++) | |
| attr_coord_conv_scale[i] | ue(v) |
| } | |
| ...... | |
| } | |

FIG. 42

| sequence_parameter_set( ) { | Descriptor |
|---|---|
| sps_seq_parameter_set_id | ue(v) |
| .... | |
| sps_projection_param_present_flag | u(1) |
| if( sps_param_present_flag ) | |
| projection_info ( ) | |
| .... | |

FIG. 43

| geometry_parameter_set( ) { | Descriptor |
|---|---|
| gps_geom_parameter_set_id | ue(v) |
| .... | |
| if( sps_projection_flag ) | |
| sps_seq_parameter_set_id | ue(v) |
| else { | |
| gps_projection_param_present_flag | u(1) |
| if( gps_param_present_flag ) | |
| projection_info ( ) | |
| } | |
| .... | |

FIG. 44

| attribute_parameter_set( ) { | Descriptor |
|---|---|
| aps_attr_parameter_set_id | ue(v) |
| .... | |
| if( sps_projection_flag ) | |
| sps_seq_parameter_set_id | ue(v) |
| else if(gps_param_present_flag ) | |
| gps_geom_parameter_set_id | ue(v) |
| else { | |
| aps_projection_param_present_flag | u(1) |
| if(aps_parameter_present_flag ) | |
| projection_info ( ) | |
| } | |
| .... | |

FIG. 45

| general_geometry_slice_bitstream( ) { | Descriptor |
|---|---|
|     geometry_slice_header( ) | |
|     geometry_slice_data( ) | |
| } | |

| geometry_slice_header( ) { | Descriptor |
|---|---|
|     gsh_geom_parameter_set_id | ue(v) |
|     …. | |
|     projection_flag | u(1) |
|     if(projection_flag) | |
|         projection_info ( ) | |
|     byte_alignment( ) | |
| } | |

FIG. 46

| general_attribute_slice_bitstream( ) { | Descriptor |
|---|---|
| attribute_slice_header( ) | |
| attribute_slice_data( ) | |
| } | |

| attribute_slice_header( ) { | Descriptor |
|---|---|
| ash_attr_parameter_set_id | ue(v) |
| …. | |
| projection_flag | u(1) |
| if(projection_flag) | |
| projection_info ( ) | |
| byte_alignment( ) | |
| } | |

FIG. 47

| projection_info ( ) { | Descriptor |
|---|---|
| projection_info_id | ue(v) |
| coord_conversion_type | u(4) |
| projection_type | u(4) |
| laser_position_adjustment_flag | u(1) |
| if(laser_position_adjustment_flag) { | |
| num_laser | u(8) |
| for( i=0; i<num_laser; i++) { | |
| r_laser[i] | ue(v) |
| z_laser[i] | ue(v) |
| theta_laser[i] | ue(v) |
| } | |
| } | |
| elevation_index_enable_flag | u(1) |
| azimuthal_index_enable_flag | u(1) |
| if ( azimuthal_index_enable_flag ) { | |
| num_laser | u(8) |
| for( i=0; i<num_laser; i++) { | |
| laser_phi_per_turn[i] | u(8) |
| laser_angle_offset[i] | u(8) |
| for( j=0; j< laser_phi_per_turn[i]; j++ ) | |
| laser_sampling_angle[i][j] | u(8) |
| } | |
| groupnig_rate | u(4) |
| } | |
| sampling_adjustment_cubic_flag | u(1) |
| sampling_adjustment_spread_bbox_flag | u(1) |
| sampling_adjustment_type | u(4) |

FIG. 48

| | |
|---|---|
| geo_projection_enable_flag | u(1) |
| attr_projetion_enable_flag | u(1) |
| bounding_box_x_offset | ue(v) |
| bounding_box_y_offset | ue(v) |
| bounding_box_z_offset | ue(v) |
| bounding_box_x_length | ue(v) |
| bounding_box_y_length | ue(v) |
| bounding_box_z_length | ue(v) |
| orig_bounding_box_x_offset | ue(v) |
| orig_bounding_box_y_offset | ue(v) |
| orig_bounding_box_z_offset | ue(v) |
| orig_bounding_box_x_length | ue(v) |
| orig_bounding_box_y_length | ue(v) |
| orig_bounding_box_z_length | ue(v) |
| rotation_yaw | ue(v) |
| rotation_pitch | ue(v) |
| rotation_roll | ue(v) |
| if (coord_conversion_type == 0 \|\| coord_conversion_type == 2) { | |
|   cylinder_center_x | ue(v) |
|   cylinder_center_y | ue(v) |
|   cylinder_center_z | ue(v) |
|   cylinder_radius_max | ue(v) |
|   cylinder_degree_max | ue(v) |
|   cylinder_z_max | ue(v) |
|   ref_vector_x | ue(v) |
|   ref_vector_y | ue(v) |
|   ref_vector_z | ue(v) |
|   normal_vector_x | ue(v) |
|   normal_vector_y | ue(v) |
|   normal_vector_z | ue(v) |
|   clockwise_degree_flag | u(1) |
|   granurality_radius | ue(v) |
|   granurality_angular | ue(v) |
|   granurality_normal | ue(v) |
| } | |

FIG. 49

| else if (coord_conversion_type == 1 \|\| coord_conversion_type == 3) { | |
|---|---|
| cylinder_center_x | ue(v) |
| cylinder_center_y | ue(v) |
| cylinder_center_z | ue(v) |
| cylinder_radius_max1 | ue(v) |
| cylinder_radius_max2 | ue(v) |
| cylinder_degree_max1 | ue(v) |
| cylinder_degree_max2 | ue(v) |
| cylinder_z_max | ue(v) |
| ref_vector_x | ue(v) |
| ref_vector_y | ue(v) |
| ref_vector_z | ue(v) |
| normal_vector_x | ue(v) |
| normal_vector_y | ue(v) |
| normal_vector_z | ue(v) |
| granurality_radius | ue(v) |
| granurality_angular | ue(v) |
| granurality_normal | ue(v) |
| } | |
| } | |

FIG. 51

| C2_ai | End-to-End BD-AttrRate [%] lossy geometry, lossy attributes [all intra] | | | | Geom. BD-TotGeomRate [%] | |
|---|---|---|---|---|---|---|
| | Luma | Chroma Cb | Chroma Cr | Reflextance | D1 | D2 |
| Cat1-A average | | | | | | |
| Cat1-B average | | | | | | |
| Cat3-fused average | | | | 0.6% | | |
| Cat3-frame average | | | | | -9.1% | -8.9% |
| Overall average | | | | 0.6% | -9.1% | -8.9% |
| Avg. Enc Time [%] | 95% | | | | | |
| Avg. Dec Time [%] | 100% | | | | | |

| CW_ai | bpip ratio [%] lossless geometry, lossy attributes [all intra] | | | |
|---|---|---|---|---|
| | Geometry | Colour | Reflectance | Total |
| Cat1-A average | | | | |
| Cat1-B average | | | | |
| Cat3-fused average | | | 100.0% | 109.6% |
| Cat3-frame average | 112.1% | | 100.0% | 109.6% |
| Overall average | 112.1% | | | |
| Avg. Enc Time [%] | 100% | | | |
| Avg. Dec Time [%] | 100% | | | |

FIG. 52

| C2_ai | Total | | Geometry | |
|---|---|---|---|---|
| | Avg. Enc Time [%] | Avg. Dec Time [%] | Avg. Enc Time [%] | Avg. Dec Time [%] |
| Cat1-A average | | | | |
| Cat1-B average | | | | |
| Cat3-fused average | | | | |
| Cat3-frame average | 95% | 100% | 81% | 99% |

| CW_ai | Total | | Geometry | |
|---|---|---|---|---|
| | Avg. Enc Time [%] | Avg. Dec Time [%] | Avg. Enc Time [%] | Avg. Dec Time [%] |
| Cat1-A average | | | | |
| Cat1-B average | | | | |
| Cat3-fused average | | | | |
| Cat3-frame average | 100% | 100% | 100% | 102% |

FIG. 53

C2 ai-lossy geometry, lossy attribute

| Class | Sequence | shift in G:T bits ratio [pp] | shift in G:T bits ratio [pp] | Geom. BD-TotGeomRate | | End-to-End BD-AttrRate [%] | | | | Geom. BD-TotGeomRate | | End-to-End BD-AttrRate [%] | | | |
|---|---|---|---|---|---|---|---|---|---|---|---|---|---|---|---|
| | | | | D1 | D2 | Luma | Chroma Cb | Chroma Cr | Reflectance | D1 | D2 | Luma | Chroma Cb | Chroma Cr | Reflectance |
| cat3-frame | ford_01_q1mm | 0% | 0% | -2.0% | -0.7% | | | | 1.8% | -1.2% | 0.4% | | | | -8.0% |
| | ford_02_q1mm | 0% | 0% | -2.3% | -0.6% | | | | 1.4% | -1.4% | 0.6% | | | | -8.3% |
| | ford_03_q1mm | 0% | 0% | -1.8% | -1.1% | | | | 0.6% | -1.2% | -0.2% | | | | -8.7% |
| | qnxadas-junction-approach | -1% | -1% | -14.4% | -15.1% | | | | 0.0% | -13.8% | -14.4% | | | | -12.4% |
| | qnxadas-junction-exit | -1% | -1% | -14.4% | -14.9% | | | | 0.4% | -13.7% | -14.2% | | | | -12.8% |
| | qnxadas-motorway-join | -1% | -1% | -14.0% | -14.7% | | | | 0.2% | -13.4% | -14.1% | | | | -12.1% |
| | qnxadas-motorway-bends | -1% | -1% | -14.6% | -15.7% | | | | 0.1% | -14.0% | -15.2% | | | | -12.2% |
| | Cat3-fused average | | | | | | | | | | | | | | |
| | Cat3-frame average | -1% | -1% | -9.1% | -8.9% | | | | 0.6% | -8.4% | -8.1% | | | | -10.6% |
| | Overall average | -1% | -1% | -9.1% | -8.9% | | | | 0.6% | -8.4% | -8.1% | | | | -10.6% |

FIG. 54

| CW_ai - lossless geometry, lossless attribute | | bpip ratio [%] | | | | shift in G:T bits ratio [pp] | shift in G:T bits ratio [pp] |
|---|---|---|---|---|---|---|---|
| Class | Sequence | Total | Geometry | Colour | Reflectance | | |
| cat3-frame | ford_01_q1mm | 124.1% | 132.2% | | 100.0% | 5% | 5% |
| | ford_02_q1mm | 124.1% | 132.5% | | 100.0% | 5% | 5% |
| | ford_03_q1mm | 122.4% | 129.8% | | 100.0% | 5% | 5% |
| | qnxadas-junction-approach | 93.0% | 91.3% | | 100.0% | -1% | -1% |
| | qnxadas-junction-exit | 92.2% | 91.0% | | 100.0% | -1% | -1% |
| | qnxadas-motorway-join | 92.8% | 91.6% | | 100.0% | -1% | -1% |
| | qnxadas-navigating-bends | 93.7% | 92.3% | | 100.0% | -1% | -1% |
| | Cat3-fused average | | | | | | |
| | Cat3-frame average | 109.6% | 112.1% | | 100.0% | 1% | 1% |
| | Overall average | 109.6% | 112.1% | | 100.0% | | |

FIG. 61

| sequence_parameter_set( ) { | Descriptor |
|---|---|
| sps_seq_parameter_set_id | ue(v) |
| .... | |
| sps_output_coordinte_present_flag | u(1) |
| sps_geom_coding_coordinate_present_flag | u(1) |
| sps_attr_coding_coordinate_present_flag | u(1) |
| if( sps_output_coordinate_present_flag ){ | |
| num_output_coordinate | u(4) |
| for( i=0; i<num_output_coordinate; i++ ) | |
| sps_output_coordinate_type [i] | u(4) |
| } | |
| .... | |

FIG. 62

| geometry_parameter_set( ) { | Descriptor |
|---|---|
| gps_geom_parameter_set_id | ue(v) |
| .... | |
| if ( sps_geom_coding_coordinate_present_flag ) { | |
| geom_coding_coordinate_type | u(4) |
| projection_info ( ) | |
| } | |
| .... | |

FIG. 63

| attribute_parameter_set( ) { | Descriptor |
|---|---|
| aps_attr_parameter_set_id | ue(v) |
| .... | |
| if( sps_attr_coding_coordinate_present_flag ) { | |
| attr_coding_coordinate_type | u(4) |
| projection_info ( ) | |
| } | |
| .... | |

POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

CROSS-REFERENCE TO RELATED APPLICATIONS

This application is the National Stage filing under 35 U.S.C. 371 of International Application No. PCT/KR2021/014446, filed on Oct. 18, 2021, which claims the benefit of and priority to Korean Patent Application No. 10-2020-0134522, filed on Oct. 16, 2020, the entire contents of which are incorporated herein for all purposes by this reference.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 20 illustrates an example of a projection process of a coordinate system of point cloud data according to embodiments;

FIG. 21 schematically illustrates a LiDAR structure for acquiring point cloud data according to embodiments;

FIG. 22 illustrates the position of a LiDAR head and the position of a laser according to embodiments;

FIG. 26 illustrates an exemplary syntax of a sequence parameter set (SPS) according to embodiments;

FIG. 27 illustrates an exemplary syntax of a tile inventory according to embodiments;

FIG. 28 illustrates exemplary syntaxes of a general attribute slice bitstream and an attribute slice header according to embodiments;

FIGS. 29 and 30 illustrate an exemplary syntax of projection information (projection_info) according to embodiments;

FIGS. 31a and 31b illustrate tables showing performance improvement of prediction lifting conversion attribute coding coordinate conversion according to embodiments;

FIG. 32 illustrates performance improvement of RAHT conversion attribute coding based on coordinate system conversion according to embodiments;

FIG. 33 illustrates an exemplary syntax of an attribute parameter set according to embodiments;

FIG. 42 illustrates an exemplary syntax of an SPS according to embodiments;

FIG. 43 illustrates an exemplary syntax of a geometry parameter set (GPS) according to embodiments;

FIG. 44 illustrates an exemplary syntax of an attribute parameter set (APS) according to embodiments;

FIG. 45 illustrates exemplary syntaxes of a general geometry slice bitstream and a geometry slide header according to embodiments;

FIG. 46 illustrates exemplary syntaxes of a general attribute slice bitstream and an attribute slice header according to embodiments;

FIGS. 47 to 49 illustrate an exemplary syntax of projection information according to embodiments;

FIGS. 51 to 54 illustrate tables illustrating improvement of performance in LiDAR sequence compression according to embodiments;

FIG. 61 illustrates an exemplary syntax of an SPS according to embodiments;

FIG. 62 illustrates an exemplary syntax of a GPS according to embodiments;

FIG. 63 illustrates an exemplary syntax of an APS according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
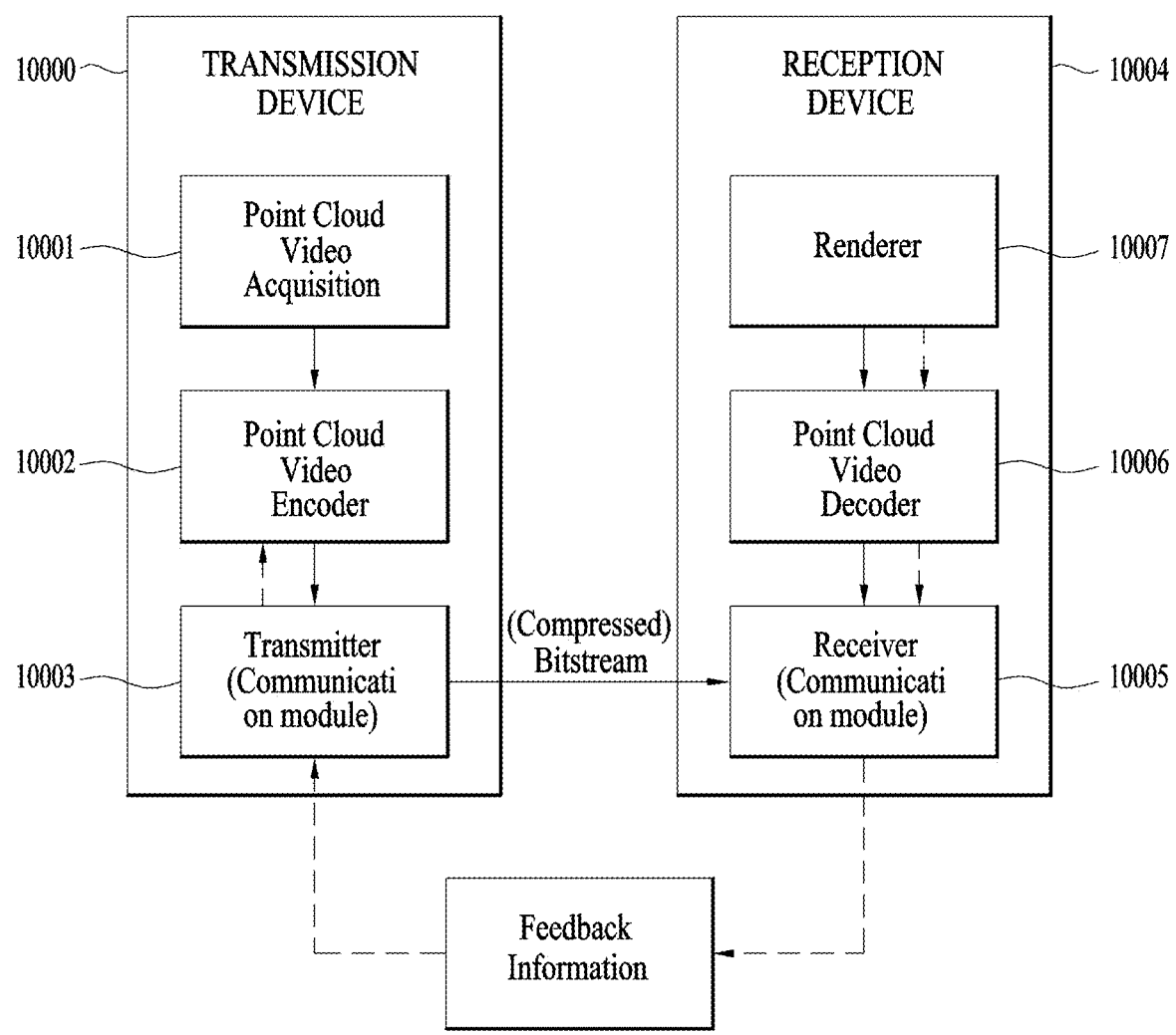
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
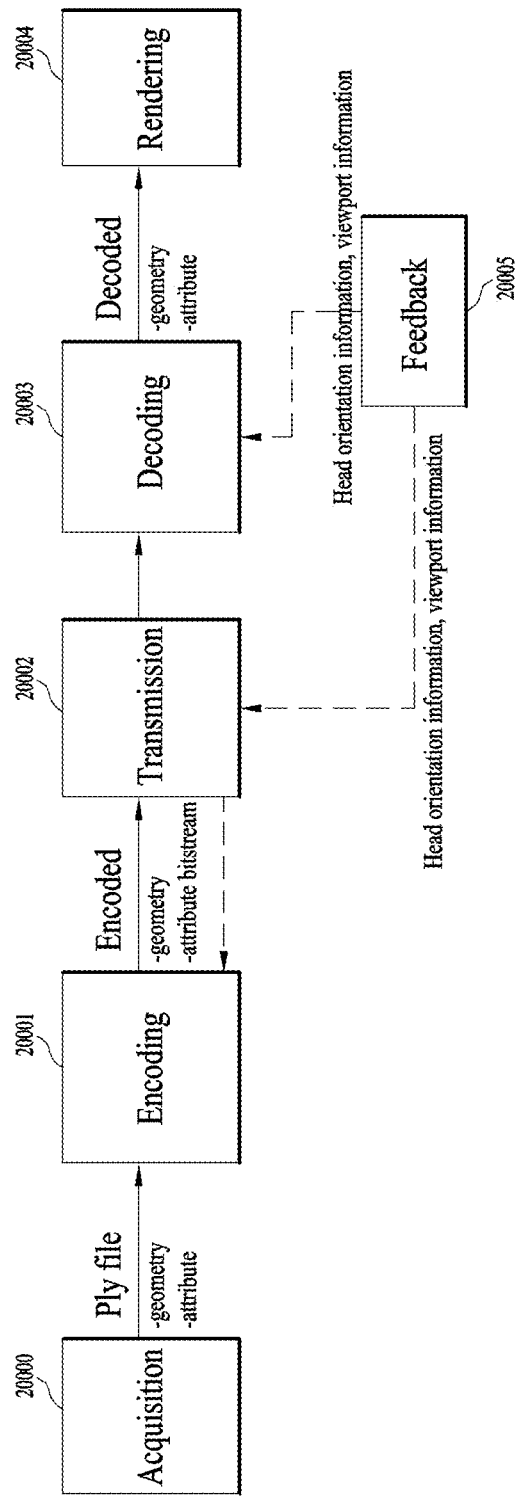
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
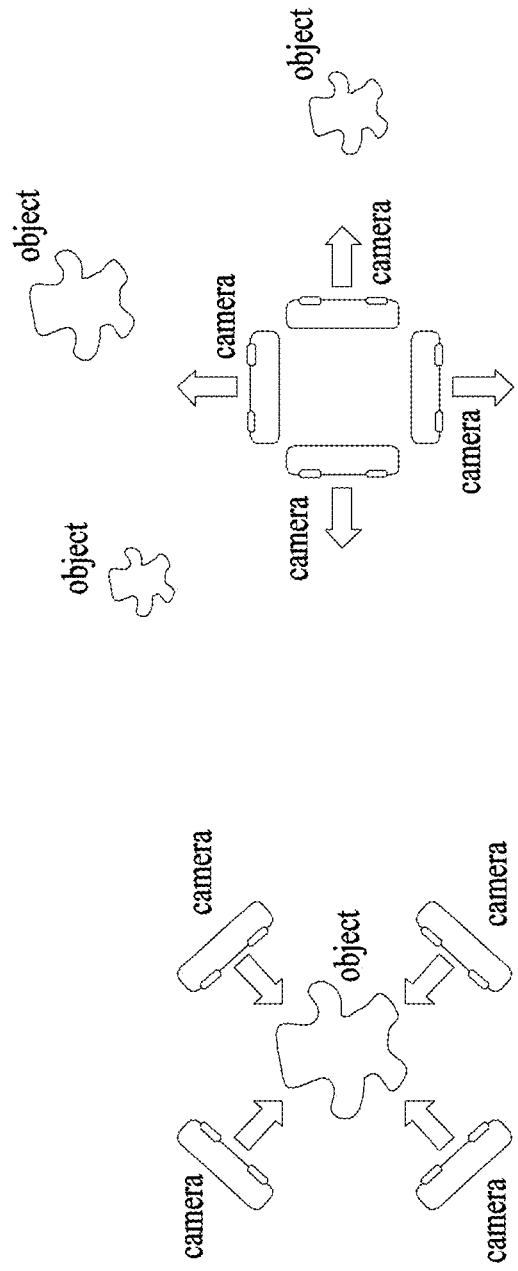
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
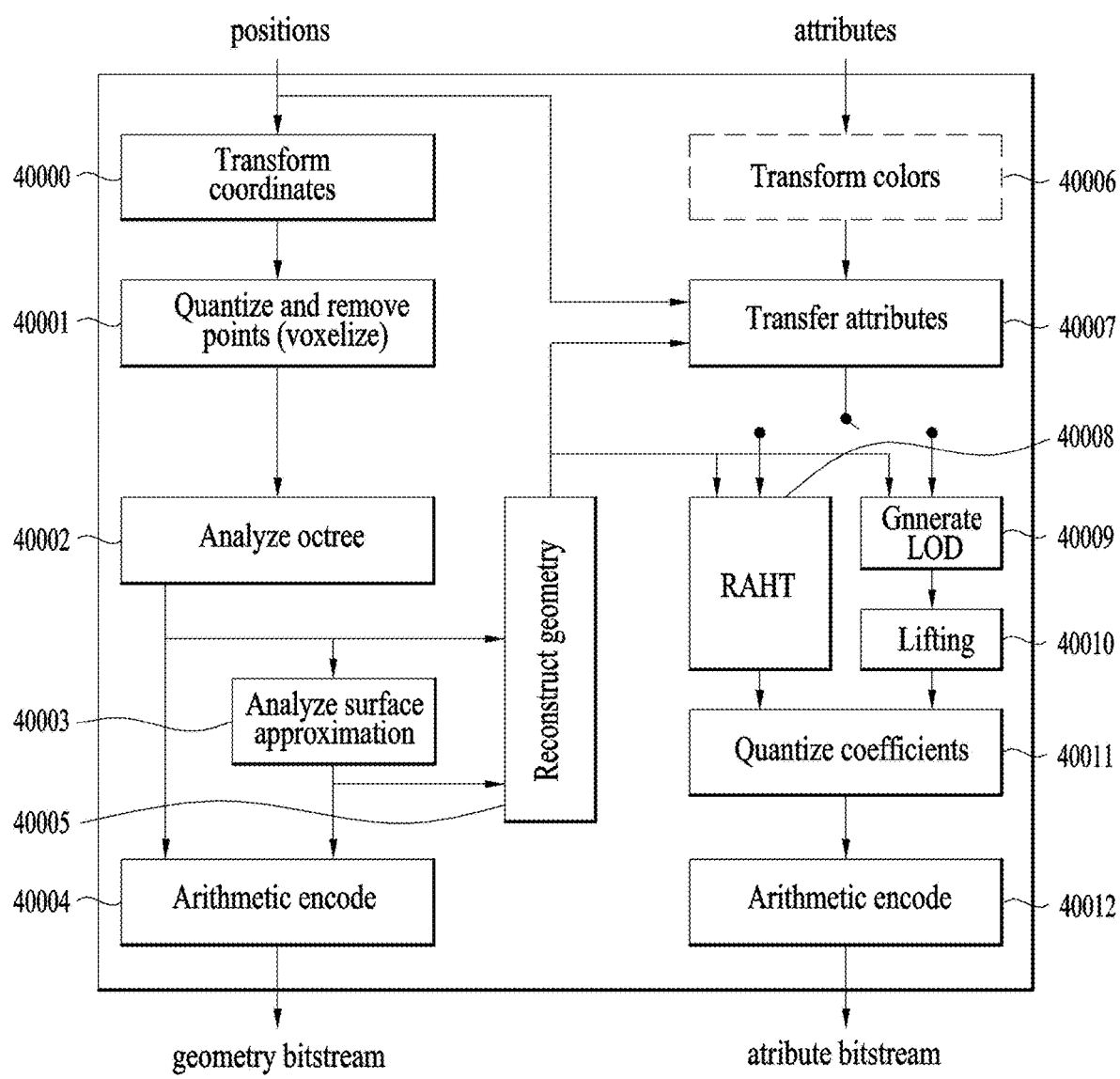
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates all representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
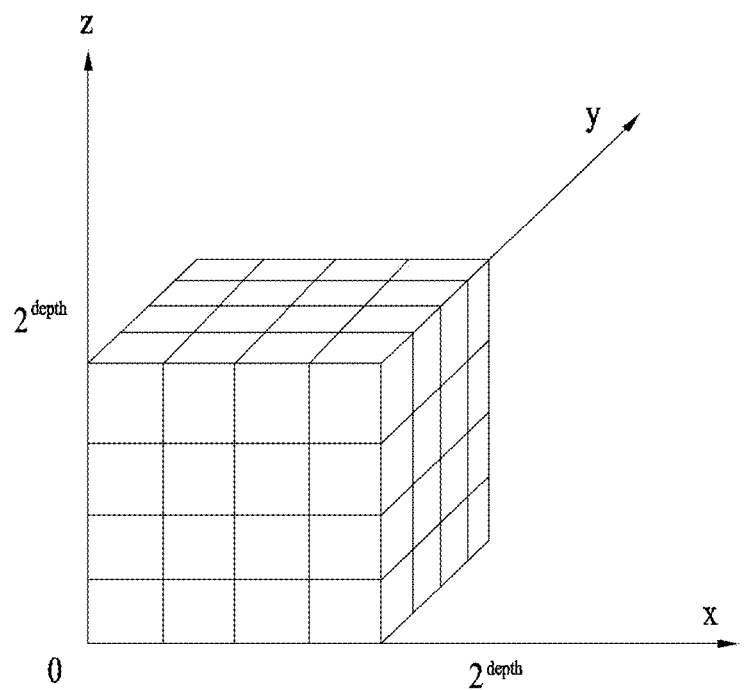
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$) Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x, \Delta y, \Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$i) \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix};$$

$$ii) \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$iii) \begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through a tan 2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |

TABLE 2-1-continued

Triangles formed from vertices ordered 1, . . . , n

| n | triangles |
|---|---|
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
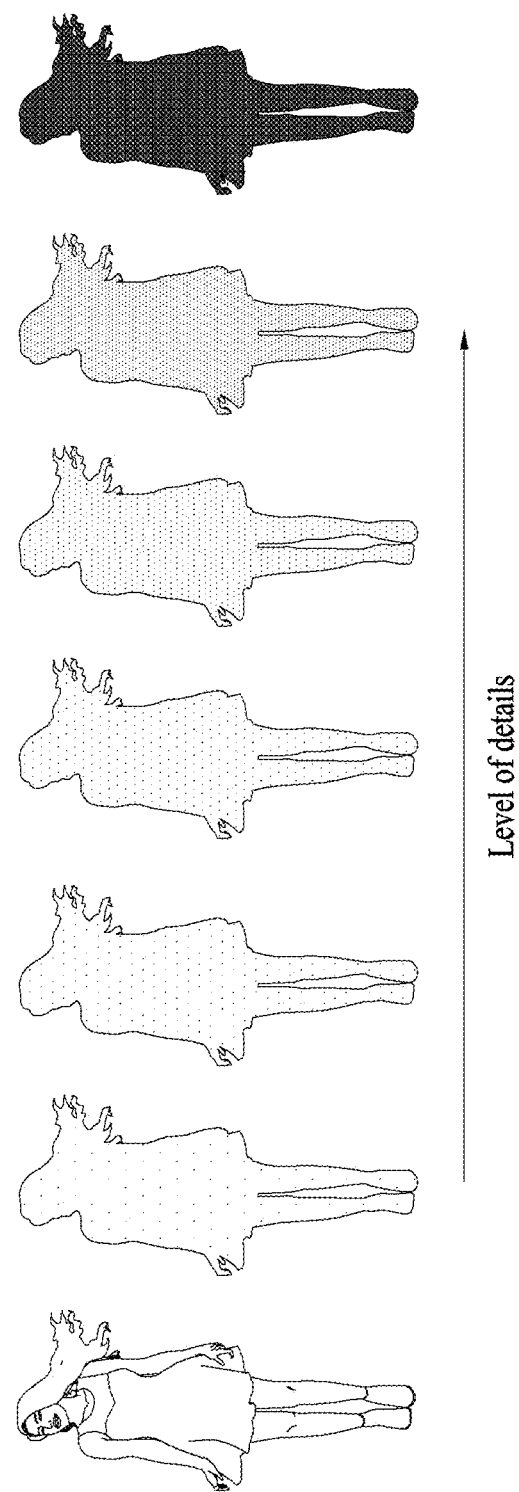
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
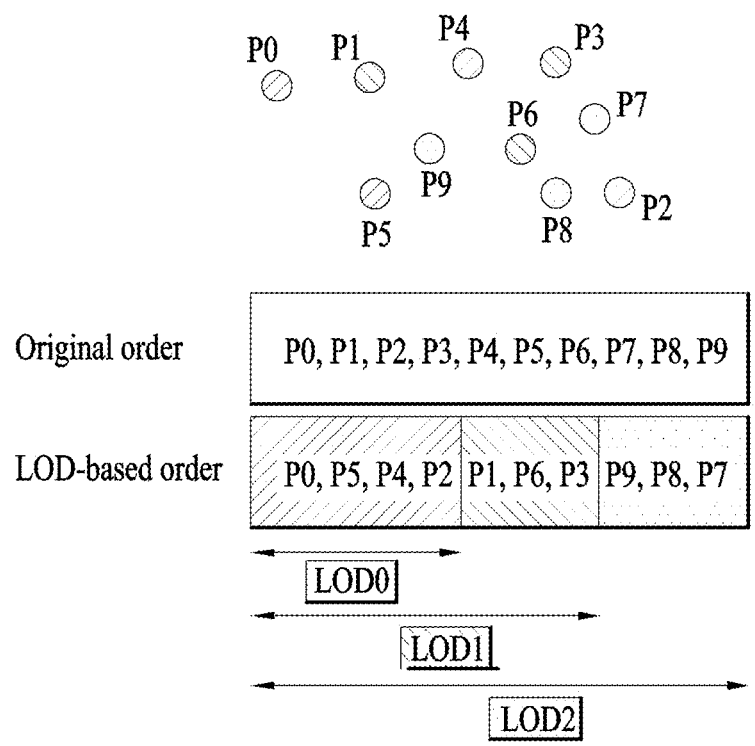
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE 1

Attribute prediction residuals quantization pseudo code

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE 2

Attribute prediction residuals inverse quantization pseudo code

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $$w2 = w_{l_{2x+1,y,z}} \cdot \begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding in the same manner of the high-pass coefficients.

Figure 10:
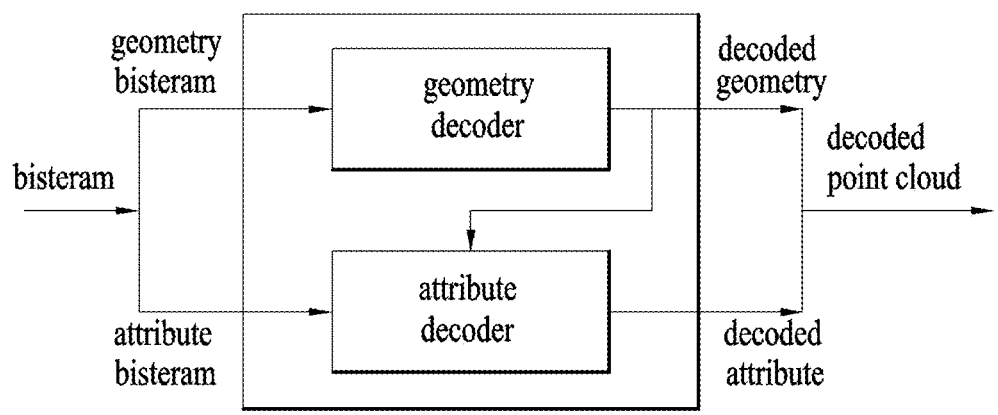
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
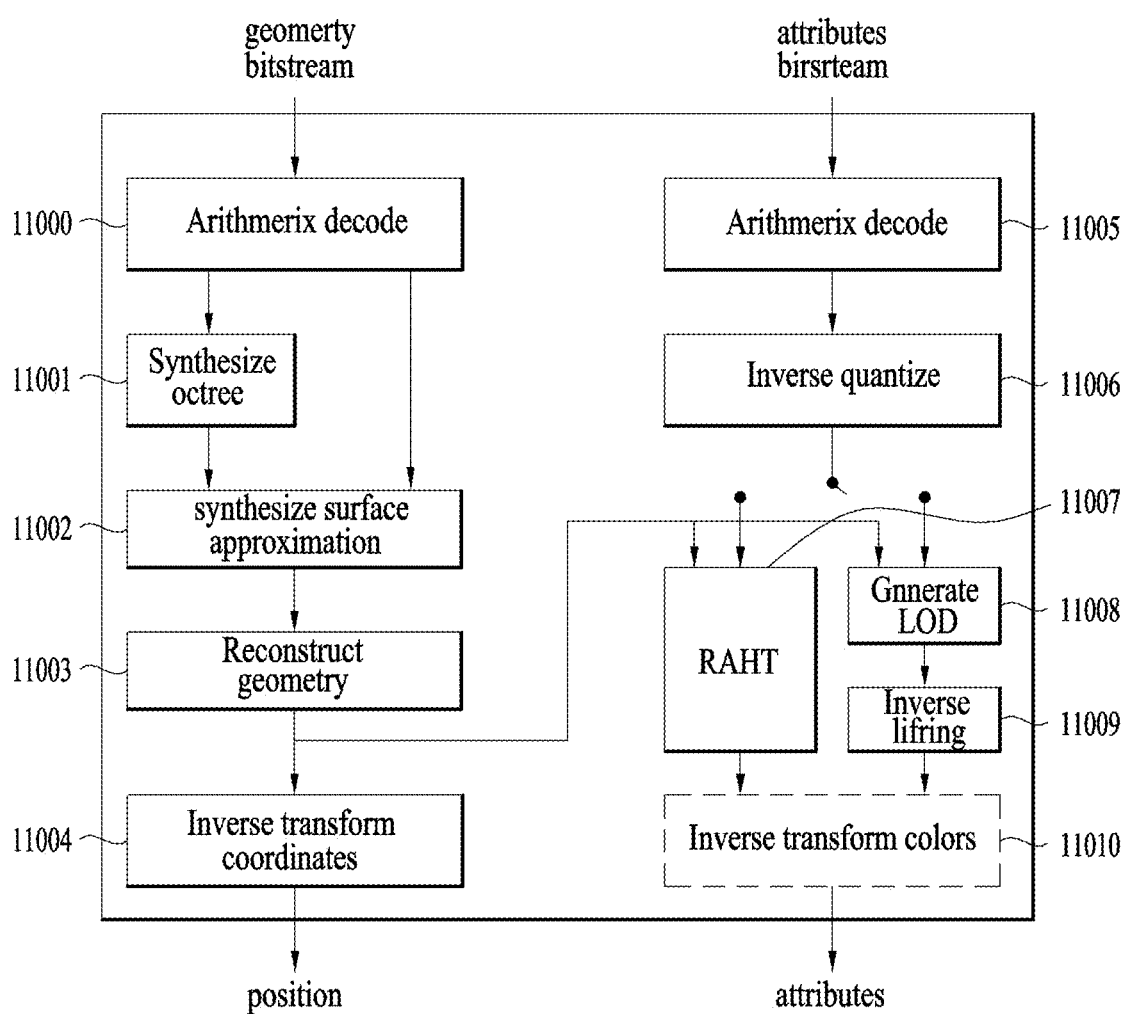
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
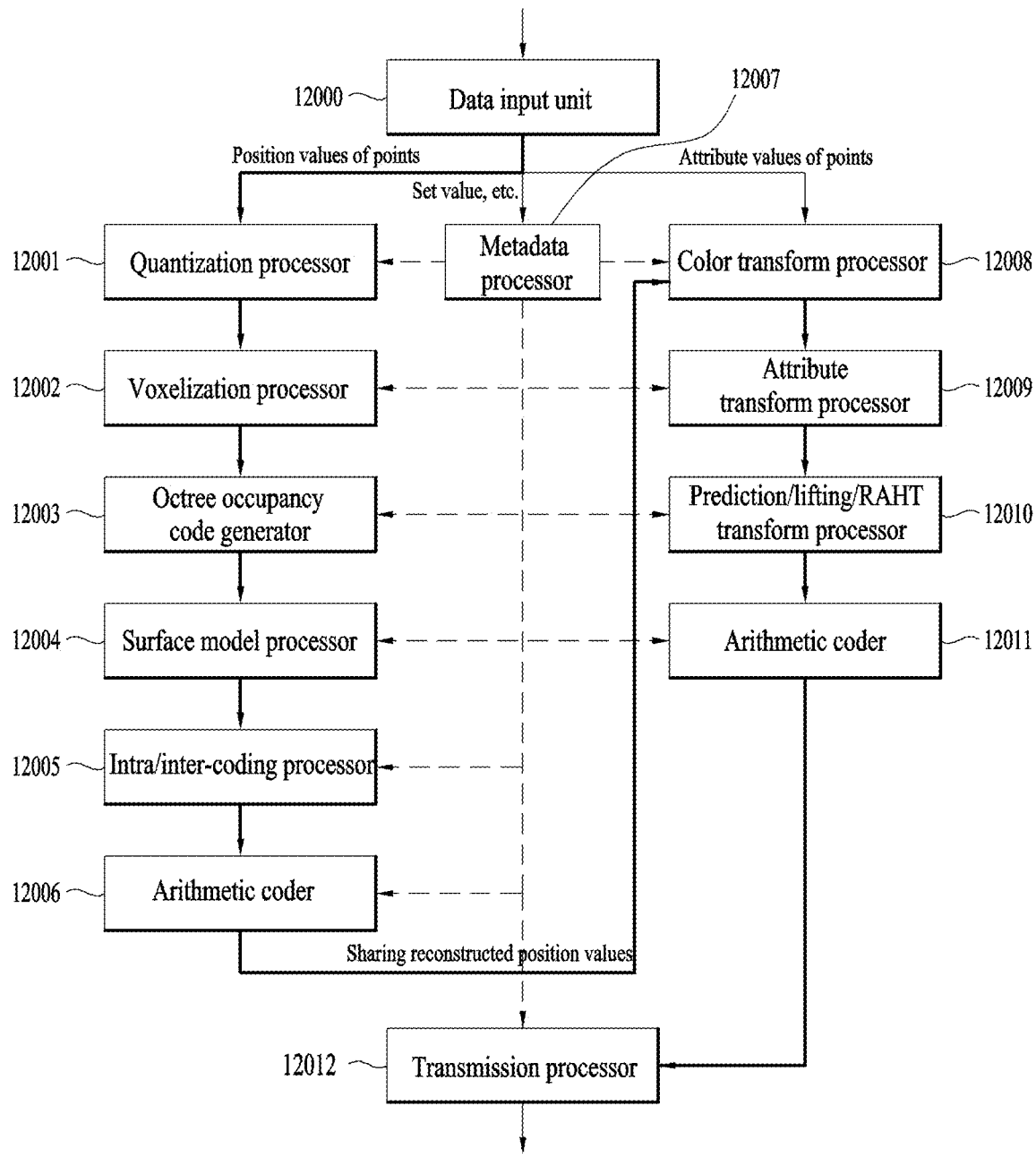
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
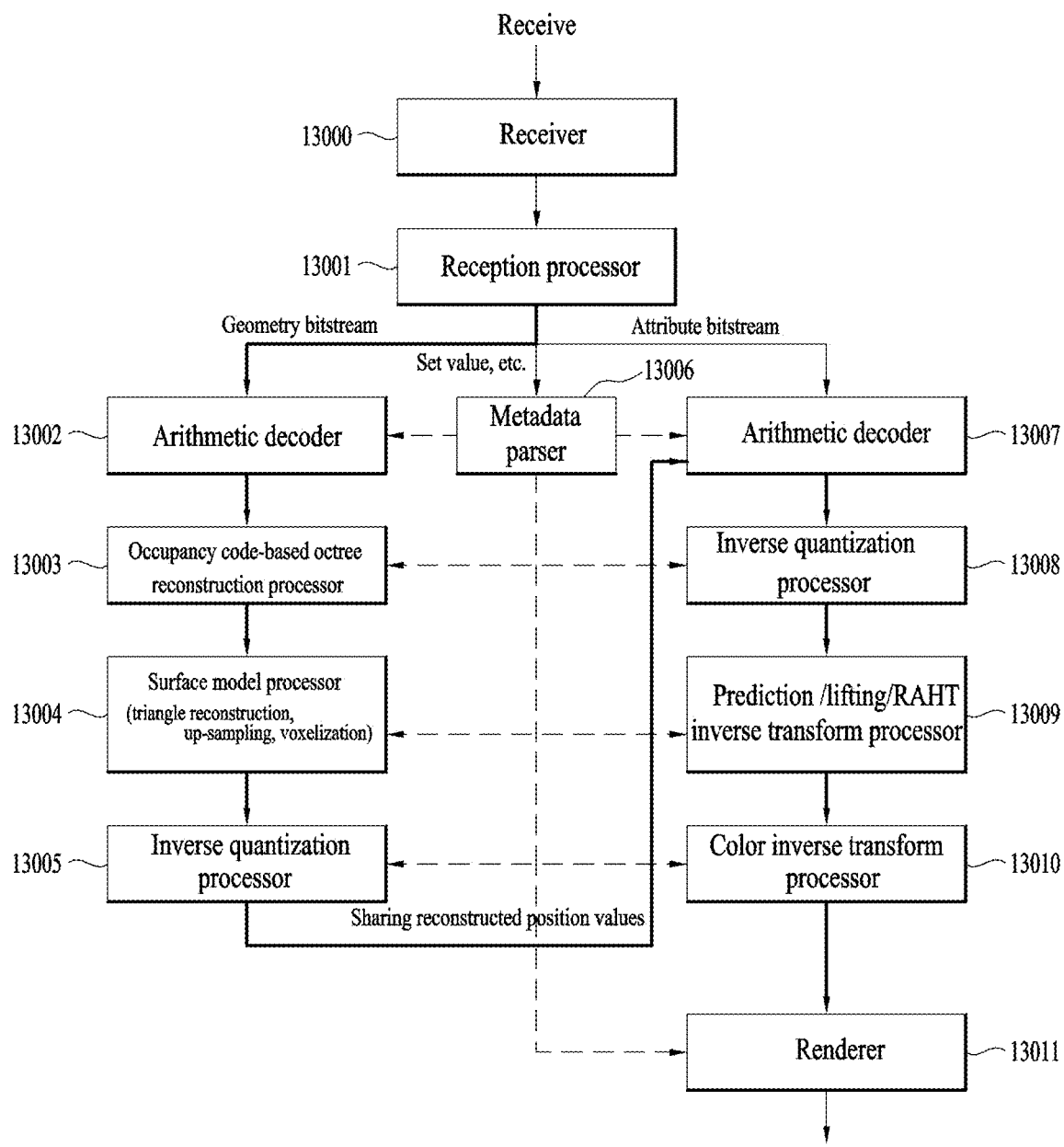
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
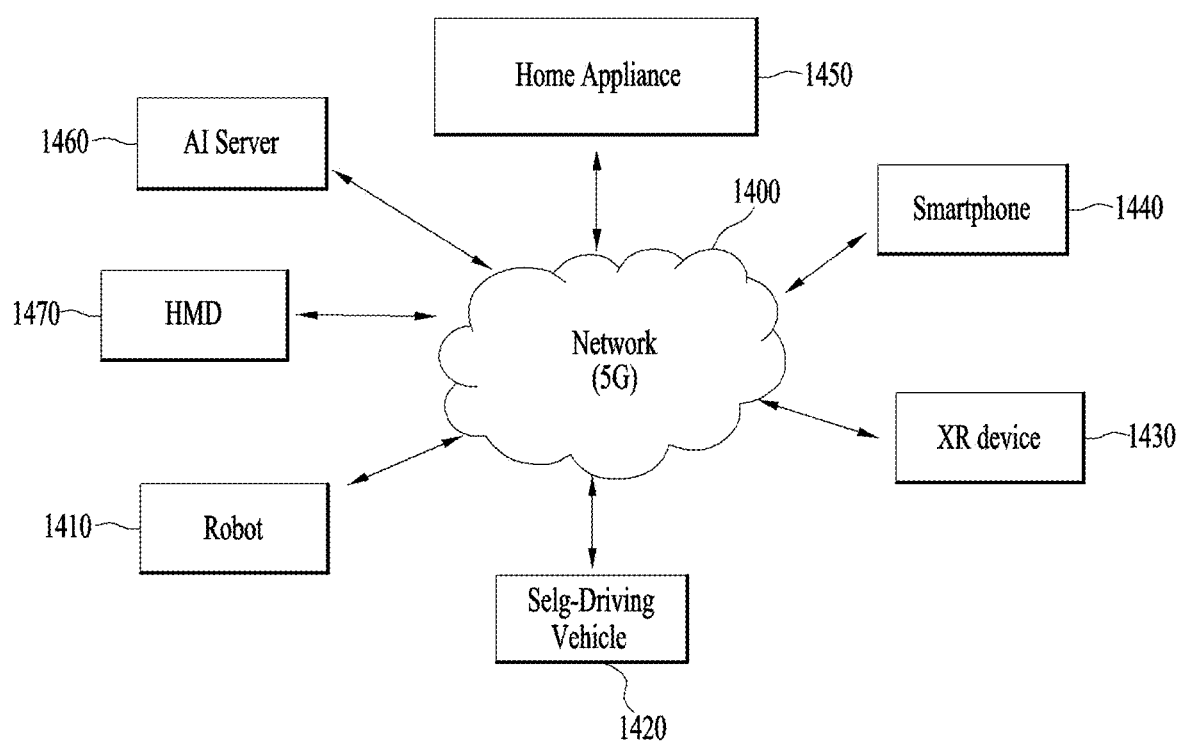
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud data may include a set of points, and each point may have geometry data (geometry information) and attribute data (attribute information). The geometry data represents three-dimensional (3D) position information (e.g., a coordinate value of X, Y, and Z axes) of each point. That is, the position of each point is represented by parameters in a coordinate system representing a 3D space (e.g., parameters (x, y, z) of three axes, i.e., X, Y, and Z axes, representing a space). The attribute information may represent color (RGB, YUV, etc.), reflectance, normal vectors, transparency, etc. of a point. The attribute information may be expressed in scalar or vector form.

According to embodiments, the point cloud data may be classified into category 1 of static point cloud data, category 2 of dynamic point cloud data, and category 3 acquired while the point cloud data dynamically moves, according to the type and acquisition method of the point cloud data. Category 1 includes a point cloud of a single frame with a high density of points for an object or a space. Data of category 3 is divided into frame-based data having a plurality of frames acquired while moving and fused data of a single frame in which a point cloud acquired through a LiDAR sensor for a large-scale space and a color image acquired through a 2D image are matched.

Figure 15:
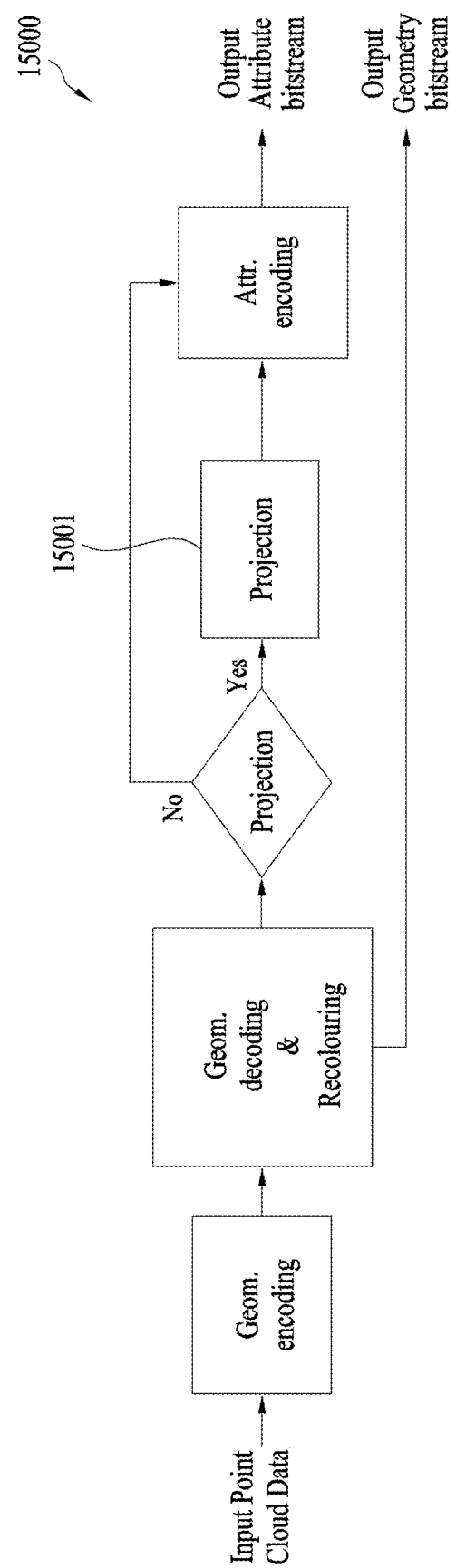
FIG. 15 is a block diagram illustrating a point cloud data transmission device according to embodiments.

FIG. 15 is a block diagram illustrating a point cloud data transmission method according to embodiments. In this embodiment, a projection process of point cloud data may be performed as preprocessing for attribute compression of the point cloud data. That is, geometry information of input point cloud data is encoded. In the case of lossy coding, attribute information is matched with changed geometry information through geometry decoding and recoloring. Attribute encoding is then performed. When efficiency of attribute encoding increases through a change in geometry information (e.g., when data with a certain pattern, such as LiDAR data, is obtained), point cloud data projection may be performed as preprocessing.

This figure illustrates a point cloud data transmission method 15000 of the point cloud data transmission device (e.g., the point cloud data transmission device of FIG. 1, 2, 4, 11, 12, or 64). The point cloud data transmission device according to the embodiments may perform an identical or similar operation to the encoding operation described with reference to FIGS. 1 to 14.

The point cloud data transmission method 15000 according to the embodiments includes encoding geometry information of point cloud data and encoding attribute information of the point cloud data. In addition, the transmission method 15000 includes transmitting a bitstream including the point cloud data. Encoding the attribute information may include determining whether to project the geometry information and projecting the geometry information (15001).

The point cloud data transmission device according to the embodiments may encode point cloud data. The point cloud data transmission device according to the embodiments includes a geometry encoder that encodes geometry representing the positions of points of the point cloud data and an attribute encoder that encodes attributes of the points. The point cloud data transmission device according to the embodiments may further include a projector that projects the positions of points for at least one of the geometry encoder or the attribute encoder.

The geometry encoder according to the embodiments may perform an identical or similar operation to the geometry encoding operation described with reference to FIGS. 1 to 14. The attribute encoder according to the embodiments may perform an identical or similar operation to the attribute encoding operation described with reference to FIGS. 1 to 14. The projection process according to the embodiments of FIG. 15 may correspond to a projection operation or data conversion operation of FIGS. 16 to 69 to be described later. The projection process of FIG. 15 may correspond to an operation performed by a data converter described with reference to FIG. 59. In addition, the projection operation of FIG. 15 may correspond to an operation performed by a projector 64110 described with reference to FIG. 64. That is, the projection process of FIG. 15 may perform coordinate system conversion, index adjustment, and scaling, and related details will be described later.

The projection process according to the embodiments may include a process of converting coordinates representing the positions of points expressed in a first coordinate system into coordinates of a second coordinate system and projecting the positions of the points based on the coordinates representing the positions of the points converted into and expressed as the coordinates of the second coordinate system. The projection operation 15001 in FIG. 15 may include a process of converting coordinates representing the positions of points expressed in the first coordinate system described above into coordinates of a second coordinate system. The projection operation 15001 in FIG. 15 may include a process of projecting the positions of the points based on the coordinates representing the positions of the points converted into and expressed in the above-described second coordinate system. The first coordinate system and the second coordinate system according to the embodiments may include a Cartesian coordinate system, a spherical coordinate system, a cylindrical coordinate system, or a circular-sector-shaped coordinate system. The circular-sector-shaped coordinate system may include a circular-sector-shaped spherical coordinate system and a circular-sector-shaped cylindrical coordinate system. The process of projecting the positions of points according to the embodiments may be based on coordinates representing the positions of the points, a coordinate system of which is converted, and on a scale value. The scale value according to the embodiments is identical or similar to a scale value for each axis to be described later with reference to FIGS. 16 to 69.

In this specification, coordinate system conversion and projection may be described as distinct concepts but may be collectively referred to as projection for convenience of description. In addition, coordinate system conversion and projection may also be collectively referred to as data conversion. That is, projection or data conversion may comprehensively refer to a processing process of transforming point cloud data, including coordinate system conversion, projection, index adjustment, and scaling of the point cloud data.

The point cloud data transmission device according to the embodiments may transmit a bitstream including encoded point cloud data. The bitstream according to the embodiments may include signaling information about the projection process or the data conversion process.

Figure 16:
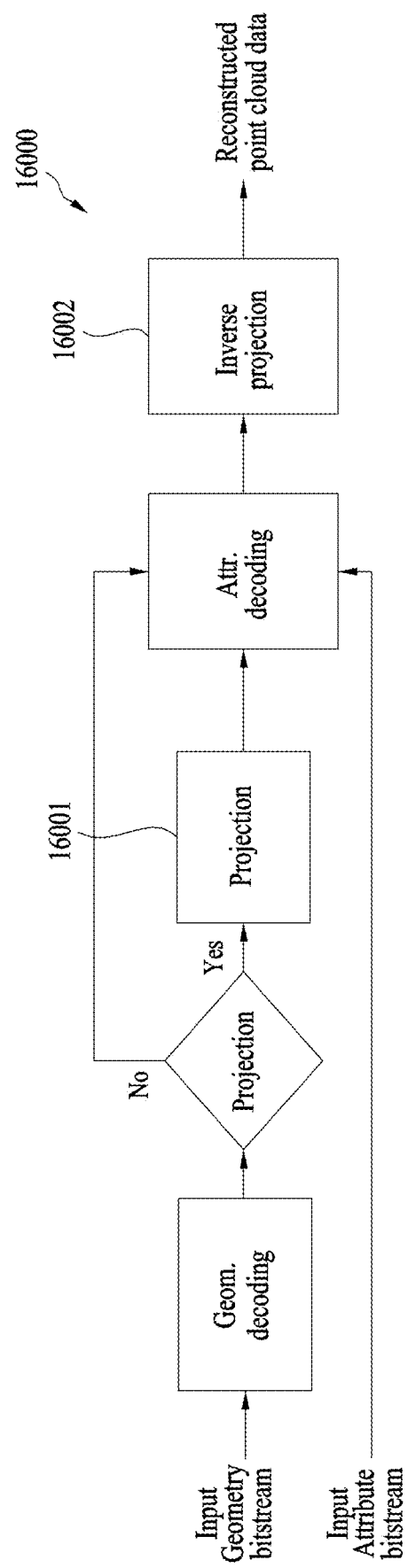
FIG. 16 is a block diagram illustrating a point cloud data reception device according to embodiments.

FIG. 16 is a block diagram illustrating a point cloud data reception method 16000 according to embodiments. The reception method 16000 includes decoding geometry information and then decoding attribute information. When projection is performed at a transmission side, a result of decoding the attribute information corresponds to information matched to the projected point cloud data. Therefore, as a preprocessing process of attribute decoding, projection may be performed on the decoded geometry information, and the decoded attribute information may be matched with the projected geometry information. In a projection space, point cloud data in which geometry and an attribute are matched may be converted into an original spatial position through an inverse projection process.

This figure illustrates a point cloud data reception method of a point cloud data reception device (e.g., the point cloud data reception device of FIG. 1, 2, 10, 13, or 66) according to the embodiments. The point cloud data reception device according to the embodiments may perform an identical or similar operation to the decoding operation described with reference to FIGS. 1 to 14.

The point cloud data reception method 16000 according to the embodiments includes receiving a bitstream including point cloud data. The bitstream according to the embodiments may include signaling information about a projection process and an inverse projection process.

The point cloud data reception method 16000 according to the embodiments includes decoding point cloud data. In more detail, the reception method 16000 includes decoding geometry information of the point cloud data and decoding attribute information of the point cloud data. In a process of decoding and reconstructing the point cloud data, the reception method 16000 may include an operation 16001 of projecting the geometry information and an operation 16002 of performing inverse projection. In this case, the projection operation 16001 and the inverse projection operation 16002 may be performed based on signaling information transmitted by the transmission device according to the embodiments.

The projection operation 16001 according to the embodiments corresponds to the projection operation 15001 according to the embodiments described with reference to FIG. 15 and projects the point cloud data. The projection operation 16001 according to the embodiments may correspond to an operation performed by a re-projector 66110 of a reception device 66000 according to the embodiments described with reference to FIG. 66.

The inverse projection operation 16002 according to the embodiments is a process of reconstructing the projected data to an original position. The inverse projection operation 16002 according to the embodiments may correspond to an operation performed by an inverse projector 66130 according to the embodiments described with reference to FIG. 66 or an inverse data converter described with reference to FIG. 60.

A description will now be given from the viewpoint of a device corresponding to the reception method 16000 according to the embodiments. The point cloud data reception device according to the embodiments may decode point cloud data. The point cloud data reception device according to the embodiments may include a geometry decoder that decodes geometry representing the positions of points of the point cloud data and an attribute decoder that decodes attributes of the points. The point cloud data reception device according to the embodiments may further include an inverse projector that inversely projects the positions of points for at least one of the geometry decoder or the attribute decoder.

The geometry decoder according to the embodiments may perform an identical or similar operation to the geometry decoding operation described with reference to FIGS. 1 to 14. The attribute decoder according to the embodiments may perform an identical or similar operation to the attribute encoding operation described with reference to FIGS. 1 to 14. The inverse projection operation 16002 according to the embodiments may include a process of inversely projecting the positions of points based on coordinates representing the positions of the points, that is, a process of converting the coordinates representing the positions of points expressed in a second coordinate system into coordinates of a first coordinate system. The inverse projector 66130 of FIG. 66 may perform a process of inversely projecting the positions of points based on coordinates indicating the positions of the points. The inverse projector 66130 of FIG. 66 may perform a process of converting coordinates representing the positions of points expressed in the second coordinate system into coordinates of the first coordinate system. The first coordinate system and the second coordinate system according to the embodiments may include a Cartesian coordinate system, a spherical coordinate system, a cylindrical coordinate system, or a circular-sector-shaped coordinate system. The circular-sector-shaped coordinate system may include a circular-sector-shaped spherical coordinate system and a circular-sector-shaped cylindrical coordinate system. The process of inversely projecting the positions of points according to the embodiments may be based on coordinates of points expressed in the second coordinate system and on a scale value.

Figure 17:
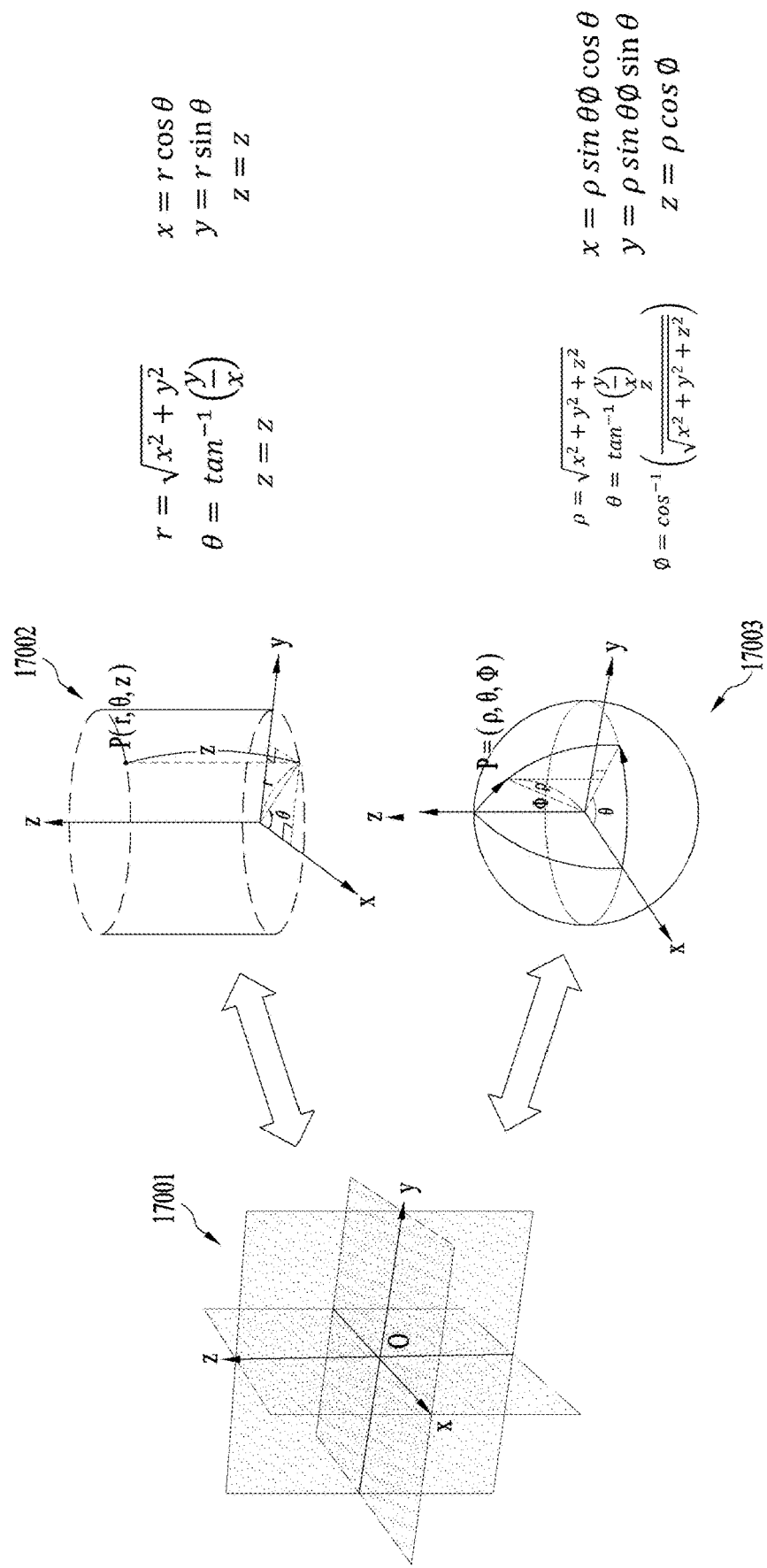
FIG. 17 illustrates an example of a coordinate system conversion process of point cloud data according to embodiments.

FIG. 17 illustrates an example of a coordinate system conversion process of point cloud data according to embodiments.

This figure is an example of the projection operation 15001 in the point cloud data transmission device (e.g., the point cloud video encoder 10002 in FIG. 1 or the transmission method 15000 in FIG. 15) according to the embodiments.

The point cloud data transmission device (e.g., the point cloud video acquirer 10001 in FIG. 1) according to the embodiments may acquire a point cloud video (e.g., the point cloud video in FIG. 1). The transmission device according to the embodiments may acquire the point cloud video using a LiDAR. The transmission device according to embodiments may acquire the point cloud video through an outward-facing method (e.g., the outward-facing method of FIG. 3) using the LiDAR.

Figure 18:
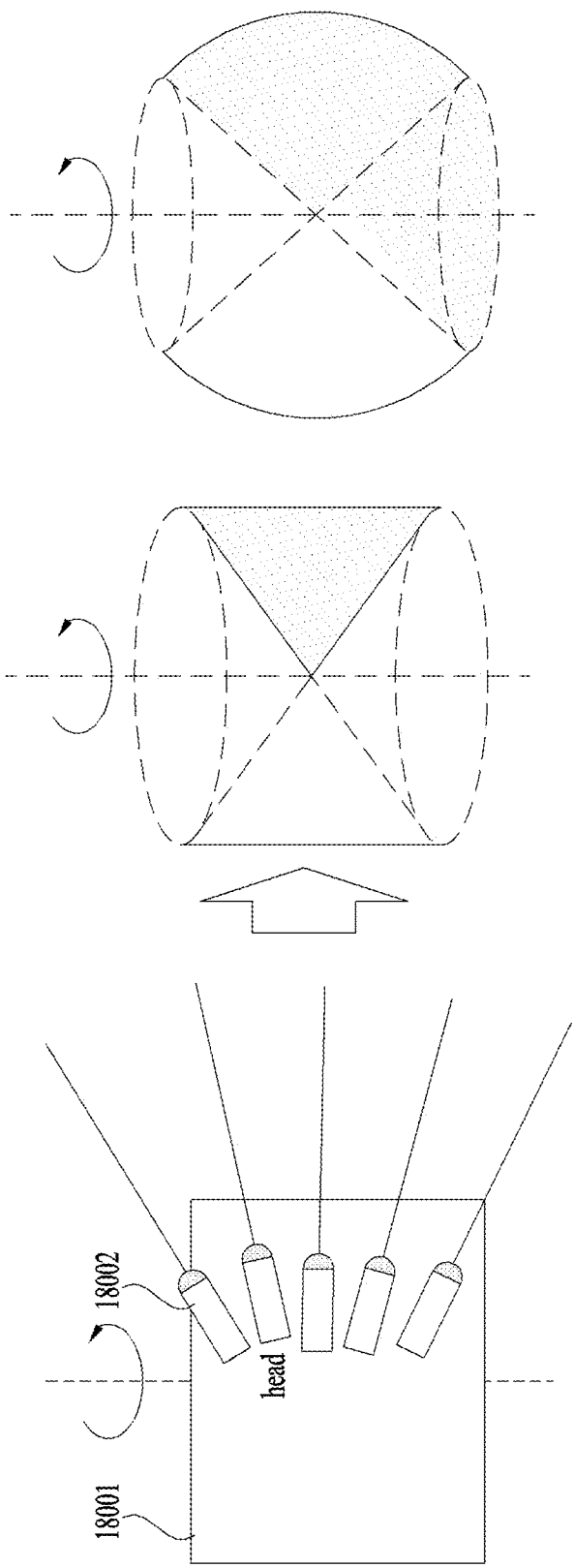
FIG. 18 illustrates an example of a circular-sector-shaped coordinate system according to embodiments.
Figure 23:
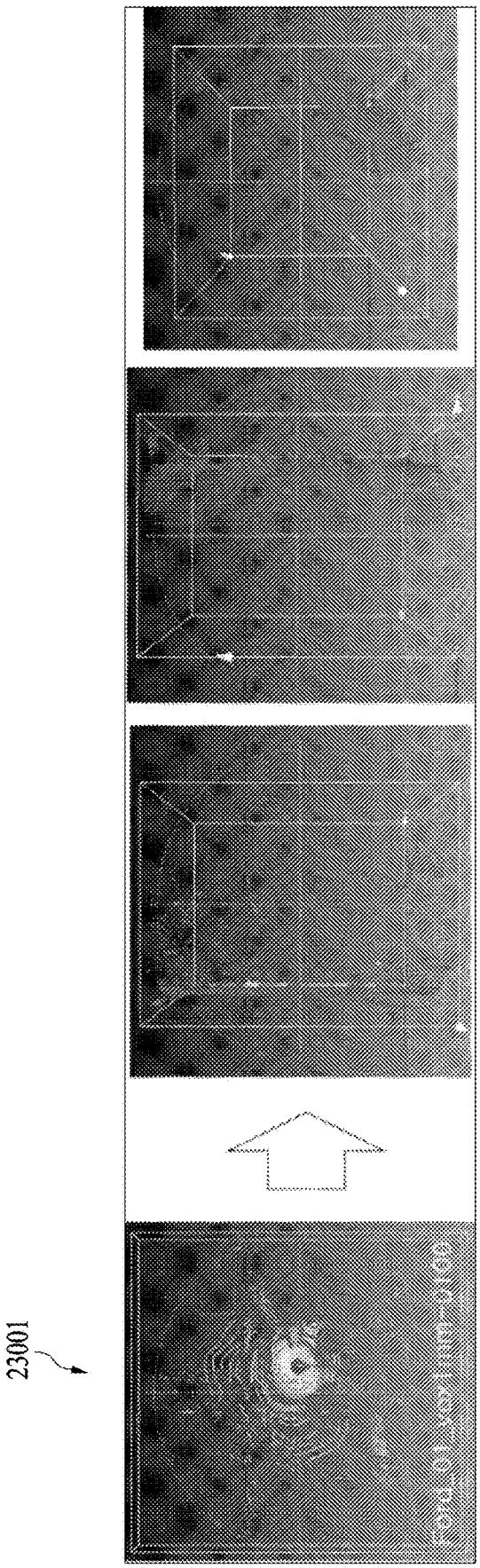
FIG. 23 illustrates projected point cloud data according to embodiments.

The point cloud data acquired through the LiDAR according to the embodiments may be referred to as LiDAR data or a LiDAR sequence. A diagram 23001 illustrated on the left side of FIG. 23 illustrates an example of the LiDAR data. The LiDAR according to the embodiments is schematically illustrated in FIG. 18 as a LiDAR 18001 and in FIGS. 21 and 22 as a LiDAR 22001. The LiDAR according to the embodiments may acquire the LiDAR data based on reflection of light emitted from one or more lasers arranged in a rotating LiDAR head. Accordingly, the LiDAR data according to the embodiments may have a cylindrical or spherical shape. The distance between light rays emitted by one or more lasers increases as the distance from the LiDAR increases. Therefore, the LiDAR data according to the embodiments may have a cylindrical shape in which points are sparsely distributed as the distance from the LiDAR head increases. When an encoding process is performed based on geometry in which points are unevenly distributed, coding efficiency may decrease. For example, when the encoding process is performed based on geometry in which the distribution of points is uneven, points distributed at a close distance from a specific point may not be detected.

Therefore, the transmission device according to the embodiments may project points of point cloud data (e.g., LiDAR data) (convert the positions of points) to make the distribution of points of the point cloud data uniform.

FIG. 17 illustrates converting a coordinate system to perform a projection process in the transmission device (e.g., FIG. 64) or the transmission method (FIG. 15) according to the embodiments. That is, FIG. 17 illustrates a process of converting coordinates representing the positions of points expressed in a first coordinate system (e.g., a Cartesian coordinate system 17001) into coordinates of a second coordinate system (e.g., a spherical coordinate system 17003 or a cylindrical coordinate system 17002). The positions of points of point cloud data (e.g., LiDAR data) acquired by the transmission device according to the embodiments may be expressed through the Cartesian coordinate system. Therefore, the positions of the points of the point cloud data obtained by the transmission device according to the embodiments may be expressed as parameters representing the Cartesian coordinate system (e.g., respective coordinate values of the x-axis, y-axis, and z-axis). The transmission device according to the embodiments may convert the coordinates representing the positions of points expressed in the Cartesian coordinate system into coordinates of the cylindrical coordinate system or the spherical coordinate system.

The transmission device according to the embodiments may convert coordinates representing the positions of points expressed in the Cartesian coordinate system into coordinates of the cylindrical coordinate system. That is, the transmission device according to the embodiments may convert coordinates representing the positions of points expressed as parameters (e.g., respective coordinate values of the x-axis, y-axis, and z-axis) representing the Cartesian coordinate system into parameters (e.g., an r value, a θ value, and a z value) representing the cylindrical coordinate system. For example, a process in which the transmission device converts values of the x-axis, the y-axis, and the z-axis of the Cartesian coordinate system into the r value, θ value, and z value of the cylindrical coordinate system is as follows.

$$r = \sqrt{x^2 + y^2}$$
$$\theta = \tan^{-1}\left(\frac{y}{x}\right)$$
$$z = z$$

The transmission device according to the embodiments may convert the coordinates representing the positions of points expressed in the Cartesian coordinate system into coordinates of the spherical coordinate system. That is, the transmission device according to the embodiments may convert coordinates representing the positions of points expressed as parameters (e.g., respective coordinate values of the x-axis, y-axis, and z-axis) representing the Cartesian coordinate system into parameters (e.g., a ρ value, a Φ value, and a θ value) representing the spherical coordinate system. For example, a process in which the transmission device converts the values of the x-axis, the y-axis, and the z-axis of the Cartesian coordinate system into the ρ value, the Φ value, and the θ value of the spherical coordinate system is as follows.

$$\rho = \sqrt{x^2 + y^2 + z^2}$$
$$\theta = \tan^{-1}\left(\frac{y}{x}\right)$$
$$\Phi = \cos^{-1}\left(\frac{y}{\sqrt{x^2 + y^2 + z^2}}\right)$$

The projection operation (15001 in FIG. 15) according to the embodiments may include a process of converting a coordinate system and a process of projecting the positions of points based on converted coordinates representing the positions of points. The projection operation according to the embodiments may be performed by the projector 64110 of the transmission device (FIG. 64) according to the embodiments.

FIG. 18 illustrates an example of a circular-sector-shaped coordinate system according to embodiments.

The circular-sector-shaped coordinate system according to the embodiments may be an additional option for coordinate system conversion in addition to the cylindrical coordinate system and the spherical coordinate system. The circular-sector-shaped coordinate system considers the characteristics of lasers arranged vertically in a LiDAR that acquire data while rotating horizontally. The lasers are arranged vertically at a certain angle on a LiDAR head and rotate horizontally about a vertical axis to acquire data. In order to widen a data acquisition range, the arranged lasers are often arranged to spread radially. The circular-sector-shaped coordinate system considering this case serves to perform conversion around a point on the central axis of a cylinder or sphere. The shape of the circular-sector-shaped coordinate system is formed by a portion overlapping a cylindrical or spherical shape while a circular-sector-shaped plane vertically erected with the origin of a circular sector on the vertical axis rotates horizontally about the vertical axis. In the circular-sector-shaped cylindrical coordinate system and the circular-sector-shaped spherical coordinate system, an elevation direction may be limited to a certain range.

Figure 19:
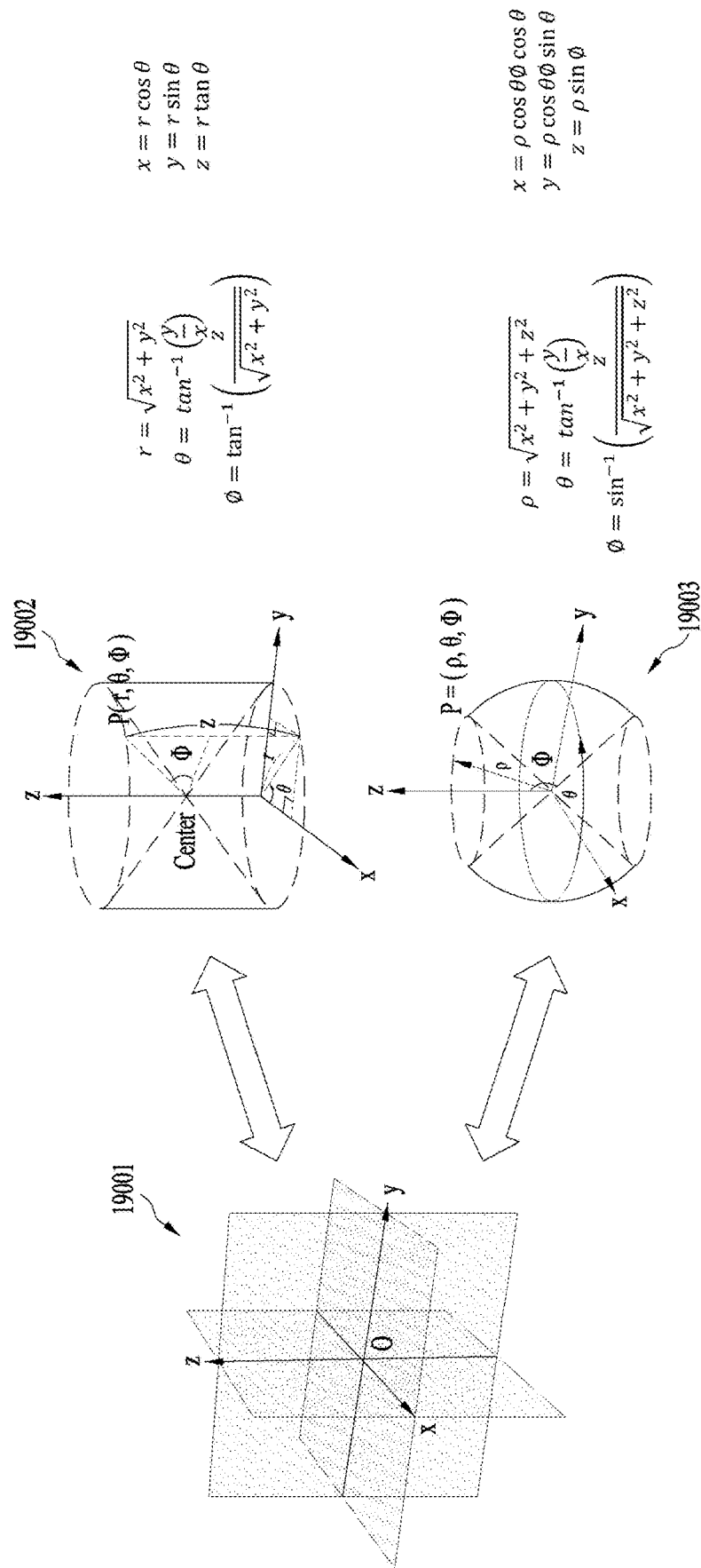
FIG. 19 illustrates an example of a conversion process of a coordinate system of point cloud data according to embodiments.

FIG. 19 illustrates an example of a conversion process of a circular-sector-shaped coordinate system of point cloud data according to embodiments. FIG. 19 illustrates conversion of a coordinate system in order for the transmission device (e.g., FIG. 64) or the transmission method (FIG. 15) according to the embodiments to perform a projection process. That is, FIG. 19 illustrates a process of converting coordinates representing the positions of points expressed in a first coordinate system (e.g., a Cartesian coordinate system 19001) into coordinates of a second coordinate system (e.g., a circular-sector-shaped spherical coordinate system 19003 or a circular-sector-shaped cylindrical coordinate system 19002). The positions of points of point cloud data (e.g., LiDAR data) acquired by the transmission device according to the embodiments may be expressed in the Cartesian coordinate system. Therefore, the positions of the points of the point cloud data obtained by the transmission device according to the embodiments may be expressed as parameters representing the Cartesian coordinate system (e.g., respective coordinate values of the x-axis, y-axis, and z-axis). The transmission device according to the embodiments may convert the coordinates representing the positions of points expressed in the Cartesian coordinate system into coordinates of the circular-sector-shaped cylindrical coordinate system or the circular-sector-shaped spherical coordinate system.

The transmission device according to the embodiments may convert the coordinates representing the positions of points expressed in the Cartesian coordinate system into the circular-sector-shaped cylindrical coordinate system. That is, the transmission device according to the embodiments may convert the coordinates representing the positions of points expressed as parameters (e.g., respective coordinate values of the x-axis, y-axis, and z-axis) representing the Cartesian coordinate system into parameters (e.g., an r value, a θ value, and a z value) representing the circular-sector-shaped cylindrical coordinate system. For example, a process in which the transmission device converts the values of the x-axis, the y-axis, and the z-axis of the Cartesian coordinate system into the r value, θ value, and Φ value of the circular-sector-shaped cylindrical coordinate system is as follows.

$$r = \sqrt{x^2 + y^2}$$

$$\theta = \tan^{-1}\left(\frac{y}{x}\right)$$

$$\Phi = \tan^{-1}\left(\frac{z}{\sqrt{x^2 + y^2}}\right)$$

The transmission device according to the embodiments may convert the coordinates representing the positions of points expressed in the Cartesian coordinate system into coordinates of the circular-sector-shaped spherical coordinate system. That is, the transmission device according to the embodiments may convert the coordinates representing the positions of points expressed as parameters (e.g., respective coordinate values of the x-axis, y-axis, and z-axis) representing the Cartesian coordinate system into parameters (e.g., a ρ value, a θ value, and a Φ value) representing the circular-sector-shaped spherical coordinate system. For example, a process in which the transmission device converts the values of the x-axis, the y-axis, and the z-axis of the Cartesian coordinate system into the ρ value, θ value, and Φ value of the cylindrical coordinate system is as follows.

$$\rho = \sqrt{x^2 + y^2 + z^2}$$

$$\theta = \tan^{-1}\left(\frac{y}{x}\right)$$

$$\Phi = \cos^{-1}\left(\frac{y}{\sqrt{x^2 + y^2 + z^2}}\right)$$

The projection operation (15001 in FIG. 15) according to the embodiments may include a process of converting a coordinate system and a process of projecting the positions of points based on converted coordinates representing the positions of points. The projection operation according to the embodiments may be performed by the projector 64110 of the transmission device (FIG. 64) according to the embodiments.

Conversion of the coordinate system may include a coordinate system selection operation and a coordinate system conversion application operation. The coordinate system selection operation derives coordinate system conversion information. The coordinate system conversion information may include information as to whether the coordinate system is converted or information about coordinate system information. The coordinate system conversion information may be signaled in units of sequences, frames, tiles, slices, or blocks. In addition, the coordinate system conversion information may be derived based on whether the coordinate system of a neighboring block is converted or based on the size of a block, the number of points, a quantization value, a block split depth, a location of a unit, or a distance between a unit and an origin.

The coordinate system conversion application operation is an operation of converting a coordinate system based on a coordinate system selected in the coordinate system selection operation. The coordinate system conversion application operation may perform coordinate system conversion based on the coordinate system conversion information. Alternatively, coordinate system conversion may not be performed based on the coordinate system conversion information.

FIG. 20 illustrates an example of coordinate system projection of point cloud data according to embodiments. FIG. 20 illustrates an example of point cloud data projection of the point cloud data transmission device (e.g., the point cloud video encoder 10002 in FIG. 1) according to the embodiments.

In order to compress point cloud data expressed in a converted coordinate system, projection in a compressible form is required. FIG. 20 illustrates a process of converting a coordinate system expressed in a circular-sector-shaped cylinder or a circular-sector-shaped sphere into a rectangular prism space according to embodiments. Coordinates (r, θ, Φ) or (ρ, θ, Φ) expressed in the circular-sector-shaped cylinder or the circular-sector-shaped sphere are converted into (X', Y', Z'). In the figure, (x_max, y_max, z_max) and (x_min, y_min, z_min) represent the maximum and minimum values of respective axes. (r, θ, Φ) or (ρ, θ, Φ) corresponds one-to-one with respective axes of X', Y', and Z', or separate conversion may be applied. In the case of the circular-sector-shaped cylinder coordinate system, the range of Φ is limited. Compression efficiency may be increased by collecting mapped values for the Z' axis using tangent.

If coordinates representing the positions of points expressed in the Cartesian coordinate system in FIG. 20 are converted into coordinates of a circular-sector-shaped cylindrical coordinate system 20001 or a circular-sector-shaped spherical coordinate system 20002, the transmission device according to the embodiments (e.g., the projector 64110)) may project the points (convert the positions) based on the converted coordinates. For example, the transmission device may convert the positions of points by causing each axis of the Cartesian coordinate system to each of the r value, θ value, and φ value of the coordinates expressed in the circular-sector-shaped cylindrical coordinate system. The transmission device according to the embodiments may express coordinates representing the positions of projected points as coordinates of a new coordinate system. For example, the transmission device may express the coordinates representing the positions of projected points as parameters representing a new Cartesian coordinate system (e.g., coordinate values of the X' axis, Y' axis, and Z' axis). The new Cartesian coordinate system according to the embodiments may be referred to as a third coordinate system. The new Cartesian coordinate system according to the embodiments may include an origin (0,0,0), a pole (r_max (e.g., the maximum value of r), 360° (e.g., a value corresponding to 2Π [rad]), z_max (e.g., the maximum value of z)), the X' axis, the Y' axis, and the Z' axis. The X' axis, Y' axis, and Z' axis of the new Cartesian coordinate system according to the embodiments may be orthogonal to each other at the origin (0,0,0). A process of projecting the points (converting the positions) in the transmission device according to the embodiments is as follows.

1) Projection 1 for Circular-Sector-Shaped Cylindrical Coordinate System $$f_x(r) = r = \sqrt{(x-x_c)^2 + (y-y_c)^2},$$

$$f_y(\theta) = \theta = \tan^{-1}\left(\frac{y-y_c}{x-x_c}\right),$$

$$f_z(\phi) = \phi = \tan^{-1}\left(\frac{z-z_c}{\sqrt{(x-x_c)^2 + (y-y_c)^2}}\right)$$

2) Projection 2 for Circular-Sector-Shaped Cylindrical Coordinate System

This method considers convenience of calculation by minimizing the calculation of a trigonometric function.

$$f_x(r) = r^2 = (x-x_c)^2 + (y-y_c)^2,$$

$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right]/2 = \frac{r+x-x_c}{2r},$$

$$f_z(\phi) = \tan\phi = \frac{z-z_c}{\sqrt{(x-x_c)^2 + (y-y_c)^2}} = \frac{z-z_c}{r}$$

Projection in the circular-sector-shaped spherical coordinate system is described below.

$$f_x(\rho) = \rho = \sqrt{(x-x_c)^2 + (y-y_c)^2 + (z-z_c)^2},$$

$$f_y(\theta) = \theta = \tan^{-1}\left(\frac{y-y_c}{x-x_c}\right),$$

-continued $$f_z(\phi) = \phi = \sin^{-1}\left(\frac{z-z_c}{\sqrt{(x-x_c)^2 + (y-y_c)^2 + (z-z_c)^2}}\right)$$

1) Projection 1 for Circular-Sector-Shaped Spherical Coordinate System $$f_x(\rho) = \rho^2 = (x-x_c)^2 + (y-y_c)^2 + (z-z_c)^2,$$

$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right]/2 = \frac{r+x-x_c}{2r},$$

$$f_z(\phi) = \sin\phi = \frac{z-z_c}{\sqrt{(x-x_c)^2 + (y-y_c)^2 + (z-z_c)^2}} = \frac{z-z_c}{\rho}$$

In the above equations, $(x_c, y_c, z_c)$ may represent a center position in a coordinate system before conversion and mean a head position of a LiDAR (e.g., XYZ coordinates in the global coordinate system).

In this specification, coordinate system conversion and projection may be described as distinct concepts but may be collectively referred to as projection or coordinate system conversion for convenience of description. In addition, coordinate system conversion and projection may also be collectively referred to as data conversion. That is, projection or data conversion may comprehensively refer to a processing process of transforming point cloud data, including coordinate system conversion, projection, index adjustment, and scaling of the point cloud data.

Hereinafter, projection correction considering the laser position of a LiDAR will be described.

Figure 64:
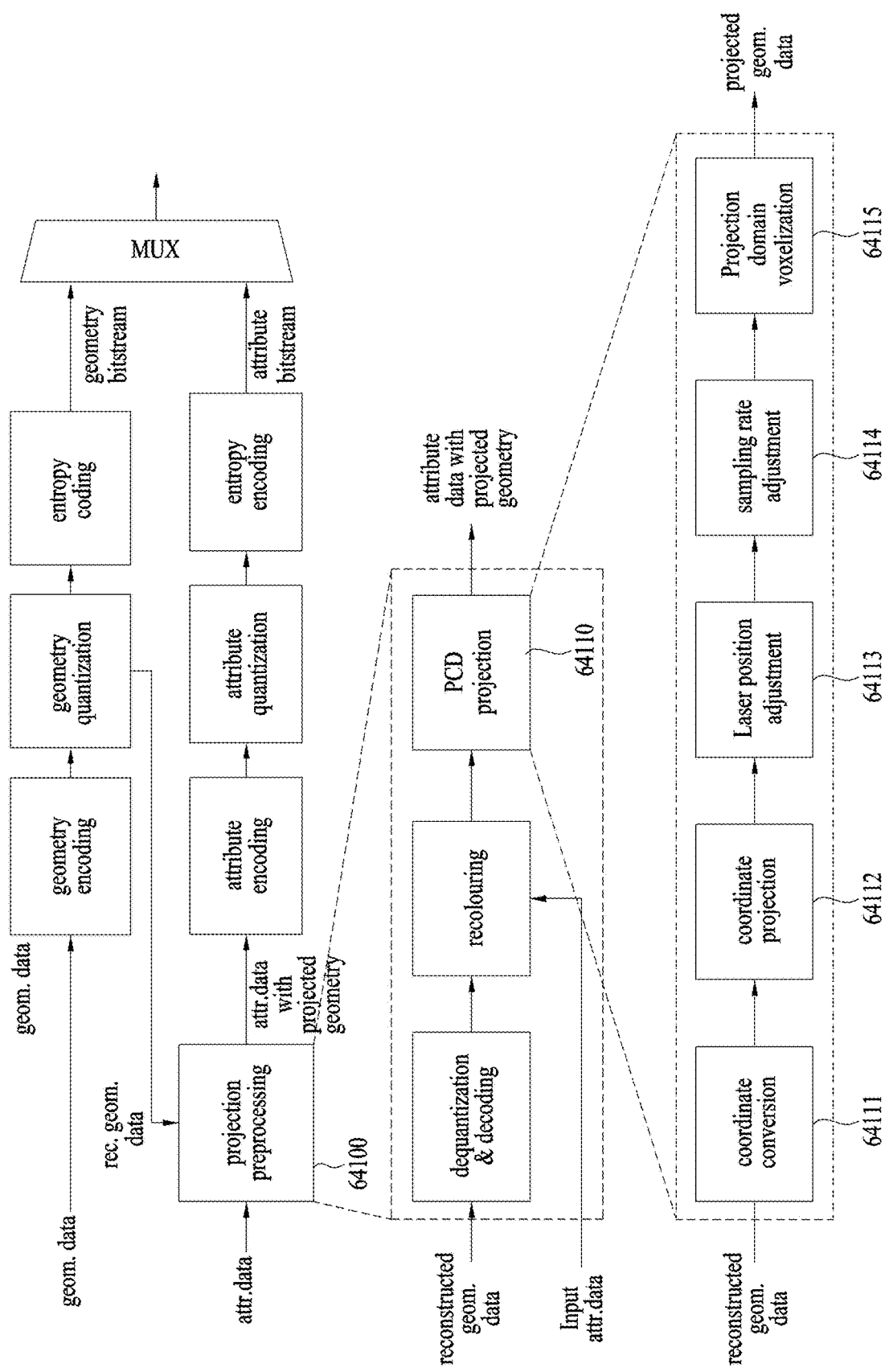
FIG. 64 is a block diagram illustrating a cloud data transmission device according to embodiments.

The projection correction considering the laser position may be performed by the transmission device 10000 in FIG. 1, the transmission device of FIG. 4, the transmission device of FIG. 12, the XR device 1430 in FIG. 14, the transmission device 15000 of FIG. 15, the transmission device 64000 of FIG. 64, and/or hardware including one or more processors or integrated circuits configured to communicate with one or more memories, software, firmware, or a combination of hardware, software, and firmware. More specifically, the projection correction may be performed by the projector 64110 of the transmission device 64000 according to the embodiments.

Figure 66:
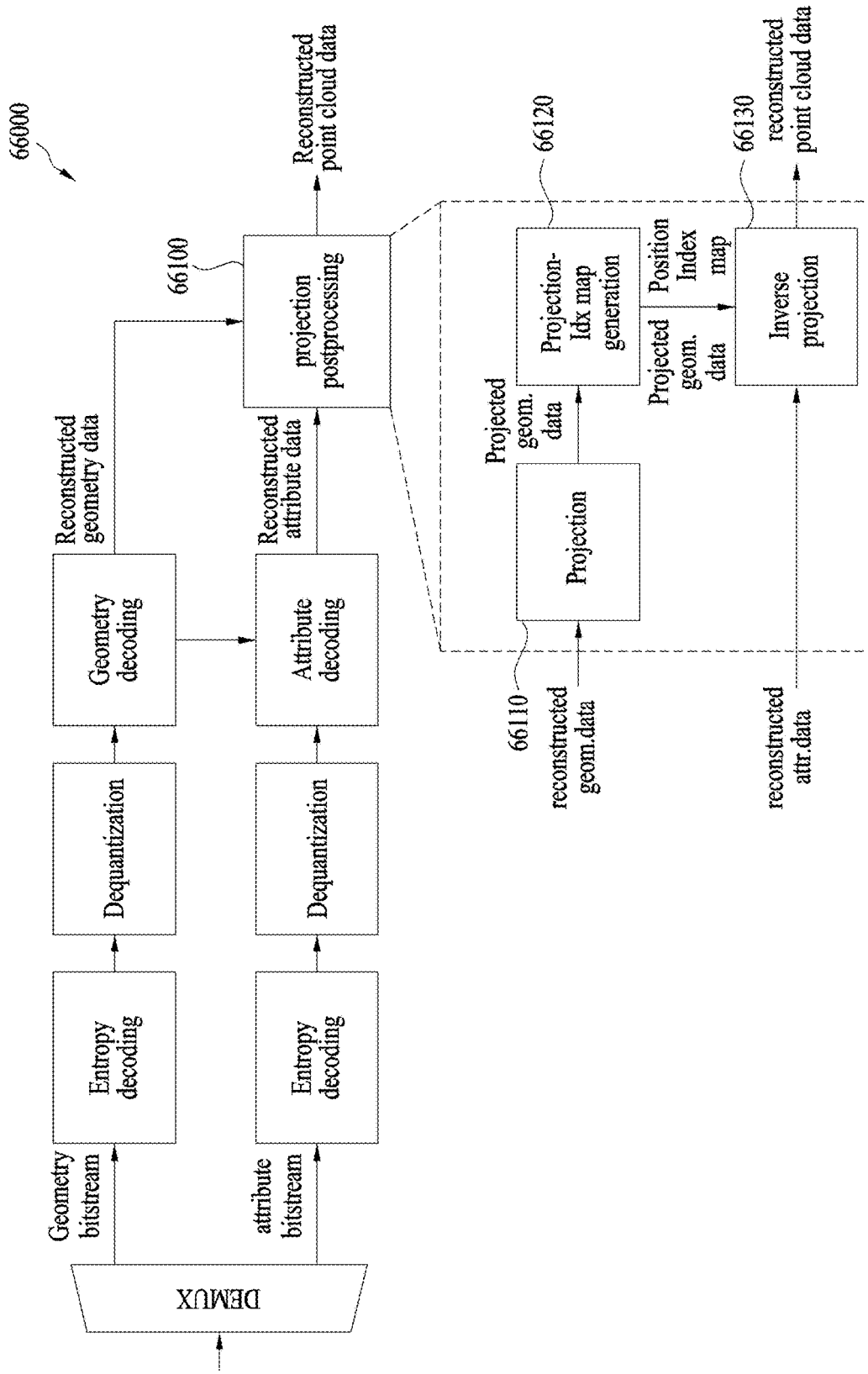
FIG. 66 is a block diagram illustrating a cloud data reception device according to embodiments.

In addition, the projection correction considering the laser position may be performed by the reception device 10004 in FIG. 1, the reception device of FIG. 11, the reception device of FIG. 13, the XR device 1430 in FIG. 14, the reception device 16000 of FIG. 16, the reception device 66000 of FIG. 66, and/or hardware including one or more processors or integrated circuits configured to communicate with one or more memories, software, firmware, or a combination of hardware, software, and firmware. More specifically, the projection correction may be performed by the re-projector 66110 of the reception device 66000 according to the embodiments.

FIG. 21 schematically illustrates a LiDAR structure for acquiring point cloud data according to embodiments. The LiDAR structure has a plurality of lasers arranged in a vertical direction on a LiDAR head. In addition, as illustrated in the left side of FIG. 21, lasers may be disposed at an upper part and a lower part of the LiDAR head, respectively, in order to acquire more point cloud data. In this case, a difference in position between the lasers occurs, which may cause a decrease in projection accuracy. Therefore, a method of correcting projection considering the position of the laser may be used.

FIG. 22 illustrates the position of a LiDAR head and the relative position of a laser according to embodiments. In FIG. 22, the positions of the vertically arranged lasers are distant from a head position $(x_c, y_c, z_c)$ by $r_L$ in a horizontal direction and by $z_L$ in a vertical direction. Assuming that the head position is (0, 0, 0), the laser is located at $(x_L, y_L, z_L)$ on the XYZ coordinate system, and $(x_L, y_L)$ may be obtained from relational equations with $r_L$ as follows.

$$x_L = r_L \cdot \cos\theta, \quad y_L = r_L \cdot \sin\theta$$

If the LiDAR structure is known, $(x_L, y_L, z_L)$ may be directly signaled or may be obtained.

As described above, when the relative position of the laser is considered, the position of each laser starts at the head position through the following equations below.

1) Conversion into the Circular-Sector-Shaped Cylindrical Coordinate System Considering the Position of the Laser $$r_L = \sqrt{(x - x_c - x_L)^2 + (y - y_c - y_L)^2} = \sqrt{(x - x_c)^2 + (y - y_c)^2} - r_L,$$

$$\theta_L = \tan^{-1}\left(\frac{y - y_c - y_L}{x - x_c - x_L}\right)$$

$$\phi_L = \tan^{-1}\left(\frac{z - z_c - z_L}{\sqrt{(x - x_c - x_L)^2 + (y - y_c - y_L)^2}}\right)$$

2) Conversion into the Circular-Sector-Shaped Spherical Coordinate System Considering the Position of the Laser $$\rho_L = \sqrt{(x - x_c - x_L)^2 + (y - y_c - y_L)^2 + (z - z_c - z_L)^2},$$

$$\theta_L = \tan^{-1}\left(\frac{y - y_c - y_L}{x - x_c - x_L}\right)$$

$$\phi_L = \sin^{-1}\left(\frac{z - z_c - z_L}{\sqrt{(x - x_c - x_L)^2 + (y - y_c - y_L)^2 + (z - z_c - z_L)^2}}\right)$$

Hereinafter, projection correction considering sampling characteristics of the LiDAR will be described.

The projection correction considering sampling characteristics may be performed by the transmission device 10000 in FIG. 1, the transmission device of FIG. 4, the transmission device of FIG. 12, the XR device 1430 in FIG. 14, the transmission device 15000 of FIG. 15, the transmission device 64000 of FIG. 64, and/or hardware including one or more processors or integrated circuits configured to communicate with one or more memories, software, firmware, or a combination of hardware, software, and firmware. More specifically, the projection correction may be performed by the projector 64110 of the transmission device 64000 according to the embodiments.

In addition, the projection correction considering sampling characteristics may be performed by the reception device 10004 in FIG. 1, the reception device of FIG. 11, the reception device of FIG. 13, the XR device 1430 in FIG. 14, the reception device 16000 of FIG. 16, the reception device 66000 of FIG. 66, and/or hardware including one or more processors or integrated circuits configured to communicate with one or more memories, software, firmware, or a combination of hardware, software, and firmware. More specifically, the projection correction may be performed by the re-projector 66110 of the reception device 66000 according to the embodiments.

Additional correction may be required to use projected point cloud data for point cloud compression. The point cloud compression assumes that X, Y, and Z data are all positive integers when Morton code sorting is used. Accordingly, all the projected point cloud data needs to be converted to have positive integer values, and for this, a voxelization process may be performed. In this case, if all points are distinguishable, ideal lossless compression may be performed, but if the distance between points is small, loss may occur in the voxelization process, so that correction is required to improve compression performance. In this case, a range of a point cloud projection value and characteristics of a data acquirer may be considered. Since r or ρ represents the distance from the center, r or ρ has a value greater than or equal to 0, and the frequency of data may be determined according to resolution based on the distance of the laser and to an interpretation capability of the acquirer. θ represents an azimuthal angle when a LiDAR rotates around a vertical axis and may range from 0 to 360 degrees in a typical case. The frequency of data is determined by the amount of data acquired per degree while the LiDAR rotates. φ represents an elevation angle in a vertical axis direction. Since φ is highly correlated with an angle of a single laser, φ may have a range of $-\Pi/2$ to $\Pi/2$, and the frequency of data depends on the number of lasers, the vertical positions of the lasers, and the accuracy of the lasers. Next, a method for correcting projection based on the above characteristics will be proposed. In this case, correction for each axis may be defined as a scaling factor. Hereinafter, scaling for r, θ, and φ will be described, and an application method therefor may be equally applied to ρ, θ, and φ or other projection methods.

$$f_s(r_L) = s_r \cdot f(r_L), f_s(\theta_s) = s_\theta \cdot f(\theta_L), f_s(\phi_s) = s_\phi \cdot f(\phi_L)$$

As an embodiment, the scaling factor may be defined based on mechanical characteristics of a point cloud data acquirer. For example, when a device in which N lasers are arranged vertically rotates in a horizontal direction, the following scaling factors may be defined as follows when M laser reflections are detected per degree and the radius of a spot generated by each laser light source is given as D. Here, $k_r$, $k_\theta$, and $k_\phi$ represent constants.

$$s_r = k_r, s_\theta = k_\theta M, s_\phi = k_\phi D$$

As an embodiment, when a minimum distance between data obtained per laser light source is known by a vertical direction, a horizontal direction, and a diameter direction, the following scaling factors may be defined. In this case, $d_r$, $d_\theta$, and $d_\phi$ denote a distance in a direction in which a radius increases, a rotational horizontal direction, and a vertical direction, respectively, and min( ) may denote a minimum value within point cloud data or a minimum value according to physical characteristics.

$$s_r = k_r/\min(d_r), s_\theta = k_\theta/\min(d_\theta), s_\phi = k_\phi/\min(d_\phi)$$

As an embodiment, a scaling factor may be defined as a function of the density of each axis. That is, a large scaling factor may be assigned to an axis having a high density per unit length, and a relatively small scaling factor may be assigned to an axis having a low density per unit length. For example, when the maximum number of points in a direction parallel to each axis is N and the length of each axis is D, scaling factors may be defined as follows.

$$s_r = k_r/g(r), s_\theta = k_\theta/g(\theta), s_\phi = k_\phi/g(\phi)$$

As an embodiment, different scaling factors may be defined according to importance. For example, information may be considered more important when the information is closer to the origin. In this way, different weights may be applied according to the distance from the origin (or center). In addition, a high weight may be applied to forward information with respect to an azimuthal angle or an elevation angle or information close to the horizon. In this case, the weight may be given in a stepped fashion or the reciprocal of an exponential according to the range of an important part.

$$s_r = k_r/g(r), s_\theta = k_\theta/g(\theta), s_\phi = k_\phi/g(\phi)$$

As an embodiment, each axis may be shifted to start from the origin so that the projected point cloud data has a positive number. Attribute coding may either use Morton code ordering (prediction-lifting) or use octree-based geometry information (RAHT). In order to evenly widen the distribution in the range of available positions, the length of each axis may be powers of 2. In addition, the lengths of the three axes may be set to be the same in order to increase compression efficiency. Correction reflecting such considerations may be expressed as follows.

$$f_s(r_L) = \frac{2^{nr}-1}{\max_r}[s_r \cdot f(r_L) - \min_r],$$

$$f_s(\theta_s) = \frac{2^{n\theta}-1}{\max_\theta}[s_\theta \cdot f(\theta_L) - \min_\theta],$$

$$f_s(\phi_s) = \frac{2^{n\phi}-1}{\max_\phi}[s_\phi \cdot f(\phi_L) - \min_\phi]$$

if sampling_adjustment_cubic_flag=1, $$f'_s(r_L) = \frac{\max}{\max_r} f_s(r_L), f'_s(\theta_L) = \frac{\max}{\max_\theta} f_s(\theta_L), f'_s(\phi_L) = \frac{\max}{\max_\phi} f_s(\phi_L),$$

In this case, max may mean max (max$_r$, max$_\theta$, max$_\phi$). Alternatively, max may be the nearest 2^n−1 of numbers greater than max(max$_r$, max$_\theta$, max$_\phi$).

As described above, the point cloud data transmission device according to the embodiments may change the positions of points in consideration of characteristics of acquired point cloud data (e.g., distribution characteristics of points). In addition, the transmission device according to the embodiments may change the positions of points based on a scale value for each axis according to distribution characteristics of the points. If the scale value for each axis according to the embodiments has a value greater than 1, the positions of projected points may be more sparsely distributed than the positions of the points before projection. Conversely, if the scale value for each axis according to the embodiments has a value smaller than 1, the positions of the projected points may be more densely distributed than the positions of points before projection. For example, if points of acquired point cloud data are densely distributed in x-axis and y-axis directions and sparsely distributed in a z-axis direction, the transmission device may uniformly project the positions of points based on an α value and a β value greater than 1 and a γ value less than 1.

The point cloud data transmission device according to the embodiments may perform coding based on the positions (or geometry) of the projected points. Therefore, the point cloud data transmission device according to the embodiments may secure higher coding gain by increasing coding efficiency using the projected geometry (e.g., geometry having uniform distribution).

Hereinafter, voxelization will be described.

The voxelization process may be performed by the transmission device 10000 in FIG. 1, the transmission device of FIG. 4, the transmission device of FIG. 12, the XR device 1430 in FIG. 14, the transmission device 15000 of FIG. 15, the transmission device 64000 of FIG. 64, and/or hardware including one or more processors or integrated circuits configured to communicate with one or more memories, software, firmware, or a combination of hardware, software, and firmware.

In addition, the voxelization process may be performed by the reception device 10004 in FIG. 1, the reception device of FIG. 11, the reception device of FIG. 13, the XR device 1430 in FIG. 14, the reception device 16000 of FIG. 16, the reception device 66000 of FIG. 66, and/or hardware including one or more processors or integrated circuits configured to communicate with one or more memories, software, firmware, or a combination of hardware, software, and firmware.

Point cloud data expressed in the XYZ coordinate system through the above-described process may be converted into a coordinate system that is efficient for compression, such as a distance and an angle. The converted data may be converted into location information of an integer unit for applying a point cloud compression technique through the voxelization process.

FIG. 23 illustrates projected point cloud data according to embodiments. The left part of FIG. 23 illustrates point cloud data before projection and the right parts thereof illustrate point cloud data after projection. The right parts of FIG. 23 illustrate projected point cloud data when looking at r-θ, φ-θ, and φ-r planes, respectively.

Hereinafter, inverse projection will be described.

Figure 24:
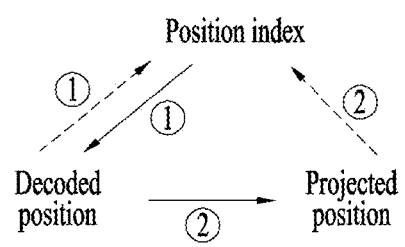
FIG. 24 illustrates a method of using position index information in inverse projection according to embodiments.

FIG. 24 illustrates a method of using position index information in inverse projection according to embodiments.

An inverse projection process may be performed by the reception device 10004 in FIG. 1, the reception device of FIG. 11, the reception device of FIG. 13, the XR device 1430 in FIG. 14, the reception device 16000 of FIG. 16, the reception device 66000 of FIG. 66, and/or hardware including one or more processors or integrated circuits configured to communicate with one or more memories, software, firmware, or a combination of hardware, software, and firmware. More specifically, the inverse projection process may be performed by the inverse projector 66130 of the reception device 66000 according to the embodiments.

The inverse projection process may be performed identically to the projection process of point cloud data. In inverse projection, point cloud data of a projected coordinate system may be converted into point cloud data of an existing coordinate system using inversely converted equations. When projection is applied to attribute coding, the point cloud data may be restored by connecting restored geometry information and corresponding attribute information to match the attribute information to an appropriate value.

As a method of connecting projected geometry information to geometry information before projection, geometry information may be indexed. That is, the reception device according to the embodiments may assign indexes to the restored geometry information according to order after ordering the restored geometry information in a certain way (e.g., Morton code order or x-y-z zigzag order).

As an example, an index-to-decoded position map and a decoded position-to-index map may be generated based on a relationship between a position before projection and an index as illustrated as number 1 in FIG. 24. Projection is performed on location information to which the index is assigned. In this case, a decoded position-to-projected position map may be generated and the projected position-to-index map may be generated by a relationship between a decoded position and an index, as illustrated as number 2 in FIG. 24.

After attribute decoding, projected points have attribute values and may be restored to original positions at projected positions through the projected position-to-index map and an index-to-position map. In this way, the reconstructed geometry information and the reconstructed attribute information may be mutually matched.

Figure 25:
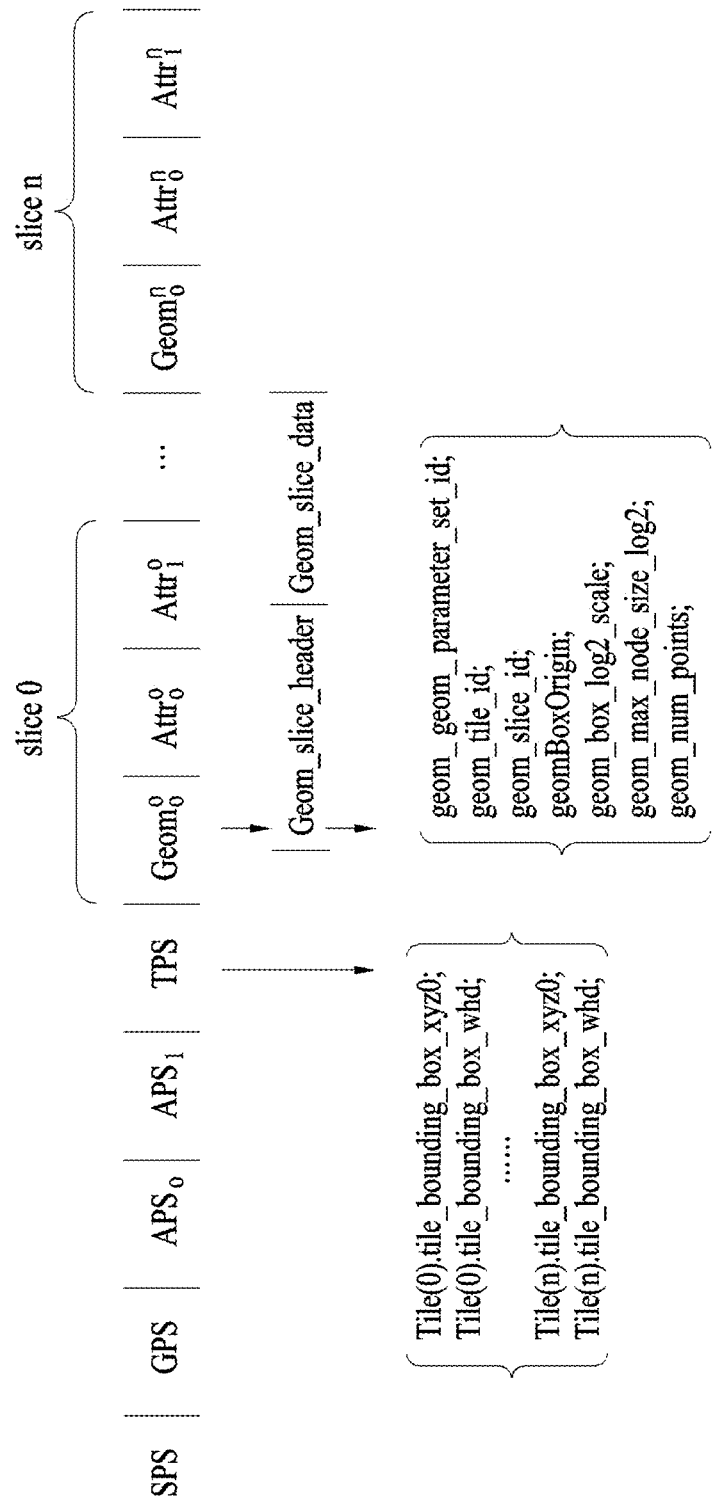
FIG. 25 illustrates an example of encoded point cloud data according to embodiments.

FIG. 25 illustrates an example of encoded point cloud data according to embodiments.

The point cloud video encoder 10002 according to the embodiments may encode point cloud data in the encoding process 20001, and the transmitter 10003 according to the embodiments may transmit a bitstream including the encoded point cloud data to the reception device 10004.

The encoded point cloud data (bitstream) according to the embodiments may be generated by the point cloud video encoder 10002 in FIG. 1, the encoding process 20001 in FIG. 2, the encoder of FIG. 4, the transmission device of FIG. 12, the XR device 1430 in FIG. 14, the transmission device of FIG. 64, and/or hardware including one or more processors or integrated circuits configured to communicate with one or more memories, software, firmware, or a combination of hardware, software, and firmware.

In addition, the decoded point cloud data (bitstream) according to the embodiments may be decoded by the point cloud video decoder 10006 in FIG. 1, the decoding process 20003 in FIG. 2, the decoder of FIG. 11, the reception device of FIG. 13, the XR device 1430 in FIG. 14, the reception device of FIG. 66, and/or hardware including one or more processors or integrated circuits configured to communicate with one or more memories, software, firmware, or a combination of hardware, software, and firmware.

The meanings of the abbreviations illustrated in FIG. 25 are as follows.

SPS: Sequence Parameter Set
 GPS: Geometry Parameter Sets
APS: Attribute Parameter Set
 TPS: Tile Parameter Set
 Geom: Geometry bitstream=Geometry slice header+Geometry slice data
 Attr: Attribute bitstream=Attribute brick header+Attribute brick data Referring to FIG. 25, projection-related information according to embodiments may be defined in an SPS, an APS, and an SEI message.

The SPS may indicate that projection is performed, and detailed information may be transmitted in projection information (projection_infoo) to the reception device according to the embodiments. In addition, all or part of related information is transmitted in the SPS, and some of the remaining information is transmitted in a GPS, an APS, a TPS, a slice header, or an SEI message to the reception device according to the embodiments.

Depending on an application or a system, an application range and application method of transmitted information may be differently set by defining a corresponding location or a separate location. In addition, when a defined syntax element is applied to a plurality of point cloud data streams as well as a point cloud data stream, related information may be transmitted in a parameter set of a higher level concept to the reception device.

Hereinafter, parameters (metadata, signaling information, etc.) according to the embodiments may be generated by the transmission device according to the embodiments or a processor in a transmission method and may be transmitted to the reception device according to the embodiments so as to be used in a point cloud data reconstruction process. For example, the parameters according to the embodiments may be generated by a metadata processor (or metadata generator) of the transmission device according to the embodiments and may be obtained by a metadata parser of the reception device according to the embodiments.

FIG. 26 illustrates an example of projection-related information defined in an SPS, and FIG. 27 illustrates an exemplary syntax of a tile inventory and a slice header. When projection is performed after a tile or a slice is partitioned, the projection-related information may be used, and projection may be applied to either geometry or attributes. Bounding box information etc. may be transmitted through each information or may use information in projection information (projection_info) defined according to embodiments.

FIG. 28 illustrates exemplary syntaxes of a general attribute slice bitstream and an attribute slice header according to embodiments, and FIGS. 29 and 30 illustrate an exemplary syntax of projection information (projection_info) according to embodiments.

When a projection flag (projection_flag) is 1, this indicates that data decoded in a post-processing process of a decoder needs to be re-projected or inverse-projected onto an XYZ coordinate space. When projection_flag is 1, the projection information may be transmitted so that the reception device may be aware of specific information for re-projection or inverse projection.

A projection information ID (projection_info_id) is an indicator representing the projection information.

A coordinate conversion type (coordinate_conversion_type) of 0 may represent a cylindrical coordinate system, a coordinate_conversion_type of 1 may represent a spherical coordinate system, a coordinate_conversion_type of 2 may represent a circular-sector-shaped cylindrical coordinate system from which triangular pyramids are removed, and a coordinate_conversion_type of 3 may represent a circular-sector-shaped spherical coordinate system in which a circular sector shape is rotated.

A projection type (projection_type) indicates the type of projection used for a coordinate conversion type (coordinate_conversion_type). For example, when projection_type used for coordinate_conversion_type of 2 is 0, x, y, z may be defined to be matched to r, θ, ϕ for, and when projection_type is 1, x, y, z may be defined to be matched to $$r^2, \cos^2\frac{\theta}{2}, \tan\phi.$$

If necessary, projection_type may be individually defined for each axis.

When a laser position adjustment flag (laser_position_adjustment_flag) is 1, this may represent projection correction considering a laser position. The number of lasers (num_laser) represents the total number of lasers. An r laser (r_laser) represents a horizontal distance from a central axis of a laser. A z laser (z_laser) represents a vertical distance from a horizontal center of a laser. A theta laser (theta_lase) represents an elevation angle of a laser. In this way, position information of a laser may be provided by r_laser, z_laser, and theta_laser or by x_laser, y_laser, and z_laser.

When a sampling adjustment cubic flag (sampling_adjustment_cubic_flag) is 1, the lengths of three axes are adjusted to be equal when performing correction considering sampling characteristics.

When a sampling adjustment spread bounding box flag (sampling_adjustment_spread_bbox_flag) is 1, a method of uniformly widening distribution within a bounding box may be used during sampling adjustment.

A sampling adjustment type (sampling_adjustment_type) represents a sampling adjustment method. If sampling_adjustment_type is 0, this may be defined as an adjustment method based on mechanical characteristics. If sampling_adjustment_type is 1, this may be defined as an adjustment method based on minimum axial-direction distance between points. If sampling_adjustment_type is 2, this may be defined as an adjustment method based on density of each axis. If sampling_adjustment_type is 3, this may be defined as an adjustment method based on importance of points.

When a geometry projection enable flag (geo_projection_enable_flag) and an attribute projection enable flag (att_projection_enable_flag) are set to 1, this indicates that a converted coordinate system is used during geometry or attribute coding.

A bounding box x offset, a bounding box y offset, and a bounding box z offset (bounding_box_x_offset, bounding_box_y_offset, bounding_box_z_offset) represent starting points of ranges including coordinate-converted point cloud data. For example, if projection_type is 0, bounding_box_x_offset, bounding_box_y_offset, and bounding_box_z_offset may have values of (0, 0, 0), and if projection_type is 1, bounding_box_x_offset, bounding_box_y_offset, and bounding_box_z_offset may have values of (−r_max1, 0, 0).

A bounding box x length, a bounding box y length, and a bounding box z length (bounding_box_x_length, bounding_box_y_length, bounding_box_z_length) may indicate ranges including coordinate-converted point cloud data. When projection_type is 0, r_max, 360, and z_max may be matched to bounding_box_x_length, bounding_box_y_length, and bounding_box_z_length, and when projection_type is 1, r_max1+r_max2, 180, and z_max may be matched to bounding_box_x_length, bounding_box_y_length, and bounding_box_z_length.

An origin bounding box x offset, an origin bounding box y offset, and an origin bounding box z offset (orig_bounding_box_x_offset, orig_bounding_box_y_offset, orig_bounding_box_z_offset) may represent starting points of ranges including point cloud data before coordinate conversion.

An origin bounding box x length, an origin bounding box y length, and an origin bounding box z length (orig_bounding_box_x_length, orig_bounding_box_y_length, orig_bounding_box_z_length) may represent ranges including point cloud data before coordinate conversion.

A rotation yaw, a rotation pitch, and a rotation roll (rotation_yaw, rotation_pitch, rotation_roll) represent rotation information used in coordinate system conversion.

A cylinder center x, a cylinder center y, and a cylinder center z (cylinder_center_x, cylinder_center_y, cylinder_center_z) indicate the positions of a center of a cylindrical column in an original XYZ coordinate system.

A maximum cylinder radius, a maximum cylinder degree, and a maximum cylinder z (cylinder_radius_max, cylinder_degree_max, cylinder_z_max) represent maximum values of the radius, degree, and height of a cylindrical column in the original XYZ coordinate system.

A reference vector x, a reference vector y, and a reference vector z (ref_vector_x, ref_vector_y, ref_vector_z) represent directionalities of a vector, which is a reference when projecting a cylindrical column, in a (x, y, z) direction from the center.

A normal vector x, a normal vector y, and a normal vector z (normal_vector_x, normal_vector_y, normal_vector_z) represent directionalities of a normal vector of the cylindrical column in the (x, y, z) direction from the center.

A clockwise degree flag (clockwise_degree_flag) represents the directionality for obtaining a cylindrical angle. If clockwise_degree_flag is 1, this indicates a clockwise direction from a top view, and if clockwise_degree_flag is 0, this indicates a counterclockwise direction in a top view. clockwise_degree_flag may correspond to directionality of a y-axis of a converted bounding box (this embodiment is the case in which clockwise_degree_flag is 0.)

An angular granularity (granurality_angular), a radius granularity (granurality_radius), and a normal granularity (granurality_normal) are parameters representing an angle, a distance from a center in a circular plane, and resolution for a distance from a center in the direction of a normal vector. granurality_angular, granurality_radius, and granurality_normal may correspond to the scaling factors $\alpha$, $\beta$, and $\gamma$ used during conversion in the cylindrical coordinate system.

Coordinate conversion may be proposed to improve the performance of G-PCC attribute coding for LiDAR acquisition data. In this method, the position of each point distributed in a cylindrical coordinate system may be converted into a rectangular coordinate system, an axis of which is a function of a radius, an azimuthal angle (horizontal angle), and an elevation angle (vertical angle). Given point positions (x, y, z) in the XYZ coordinate system, corresponding positions in the cylindrical coordinate system are derived as follows.

$$r_L = \sqrt{(x - x_c - x_L)^2 + (y - y_c - y_L)^2},$$

$$\theta_L = \tan^{-1}\left(\frac{y - y_c - y_L}{x - x_c - x_L}\right),$$

$$\phi_L = \tan^{-1}\left(\frac{z - z_c - z_L}{\sqrt{(x - x_c - x_L)^2 + (y - y_c - y_L)^2}}\right).$$

$(x_c, y_c, z_c)$ and $(X_L, Y_L, Z_L)$ indicate a center position of a head of a LiDAR and a relative position of a laser, respectively. Coordinate conversion may be performed as follows using $(r_L, \theta_L, \phi_L)$.

$$x' = s_r \cdot r_L, y' = s_\theta \cdot \theta_L, z' = s_\phi \cdot \tan \phi_L,$$

Here, parameters $s_r$, $s_\theta$, and $s_\phi$ are derived as maximum lengths of bounding box edges normalized to the lengths of the bounding box edges of respective axes.

FIGS. 31a and 31b illustrate summaries BD speed and a BD peak signal-to-noise ratio (PSNR) of coordinate conversion for a prediction-lifting coding scheme. Total averages of reflectance gain are 5.4%, 4.0%, 1.4%, and 2.7% for C1, C2, CW, and CY conditions, respectively.

The proposed coordinate conversion may also be applied to an RAHT attribute coding scheme, and FIG. 32 illustrates summary results thereof. In the case of the RAHT attribute coding scheme, the average performance improvement of Cat3-frame data has increased significantly by 15.3% and 12.5% in C1 and C2 conditions, respectively.

FIG. 33 illustrates an exemplary syntax of an attribute parameter set according to embodiments.

If an attribute coordinate conversion flag (attr_coord_conv_enable_flag) is 1, this indicates that point cloud conversion is performed in an attribute coding process. If attr_coord_conv_enable_flag is 0, this indicates that no point cloud conversion is performed in the attribute coding process.

If a coordinate conversion scale present flag (coord_conv_scale_present_flag) is 1, this indicates that coordinate conversion scale factors scale_x, scale_y, and scale_z are present. If coord_conv_scale_present_flag is 0, this indicates that no coordinate conversion scale factors are present. scale_x, scale_y, and scale_z are maximum distances for all axes normalized to maximum distances of the X, Y, and Z axes.

An attribute coordinate conversion scale (attr_coord_conv_scale) specifies the scale ratio of a coordinate conversion axis in units of 2 to 8.

In a scale axis array, ScaleAxis[i] for i ranging from 0 to 2 is derived as follows.

ScaleAxis[0]=attr_coord_conv_scale[0]
ScaleAxis[1]=attr_coord_conv_scale[1]
ScaleAxis[2]=attr_coord_conv_scale[2]

If an attribute coordinate conversion flag (attr_coord_conv_enabled_flag) is 1, a coordinate conversion process is derived as pre-processing for attribute decoding, and output PointPos is used in a subsequent attribute decoding process. After performing an attribute decoding process, a coordinate conversion post-processing process is derived to match a point position and an attribute in the Cartesian coordinate system.

Hereinafter, coordinate conversion pre-processing for attribute decoding will be described.

Input in this process is as follows.

A PointPos array that designates the position of a point expressed in the Cartesian coordinate system An attribute coordinate conversion enable flag (attr_coord_conv_enabled_flag) which is an indicator designating the use of coordinate conversion in an attribute coding process The number of lasers (num_lasers) which is a parameter designating the number of lasers A laser angle (LaserAngle) which is a parameter designating the tangent of an elevation angle of a laser A geometry angle origin (geomAngularOrigin) which is a parameter designating (x, y, z) coordinates of the origin of a laser A scale axis (ScaleAxis) which is a parameter designating a scale factor for coordinate system conversion of each axis laser correction (LaserCorrection) which is a parameter correcting the position of a laser relative to a geometry angle origin (geomAngularOrigin).

The output of this process is modified array PointPos, and PointPosCart may designate connection between positions before and after coordinate conversion.

Hereinbelow, a laser index determination process will be described.

This process is applied when the attribute coordinate conversion enable flag (attr_coord_conv_enabled_flag) is 1. This process determines laserIndex[pointIdx] having pointIdx in the range of 0 to PointCount-1 for a point for which coordinate conversion is performed.

First, estimated laserIndexEstimate[pointIdx] is calculated by determining a node angle PointTheta. The process may be described as follows.

$s$Point=(PointPos[pointIdx][0]−geomAngularOrigin[0])<<8

$t$Point=(PointPos[pointIdx][1]−geomAngularOrigin[1])<<8

$r$2=$s$Point×$s$Point+$t$Point×$t$Point $r$InvLaser=1÷Sqrt($r$2)

PointTheta=((PointPos[pointIdx][2]−geomAngularOrigin[2])×$r$InvLaser)>>14

Then, a laser angle LaserAngle[laserIndexEstimate[pointIdx]] closest to this point is determined. The process may be described as follows.

```
start = 0
end = number_lasers − 1
for (int t = 0; t <= 4; t++) {
    mid = (start + end) >> 1
    if (LaserAngle[mid] > PointTheta)
        end = mid
    else
        start = mid
}
minDelta = Abs(LaserAngle[start] − PointTheta)
laserIndex[pointIdx] = start
for (j = start + 1; j <= end; j++) {
    delta = Abs(LaserAngle[j] − PointTheta)
    if (delta < minDelta) {
        minDelta = delta
        laserIndex[pointIdx] = j
    }
}
```

Hereinafter, the coordinate system conversion process will be described.

At the beginning of the process, the position of a point position array in the Cartesian coordinate system is copied to PointPosCart[pointIdx], and the range of pointIdx is 0 to PointCount-1. The process may be described as follows.

PointPosCart[pointIdx][0]=PointPos[pointIdx][0]

PointPosCart[pointIdx][1]=PointPos[pointIdx][1]

PointPosCart[pointIdx][2]=PointPos[pointIdx][2]

The following process is applied to points to convert a coordinate axis from a Cartesian coordinate system to a cylindrical coordinate system. Here, ConvPointPos[pointIdx] designates the point position of the converted cylindrical coordinate system, and pointIdx ranges from 0 to PointCount-1. The process may be described as follows.

ConvPointPos[pointIdx][0]=Sqrt($r$2)>>8;

ConvPointPos[pointIdx][1]=(a tan2($t$Point,$s$Point)+3294199)>>8;

ConvPointPos[pointIdx][2]=((PointPos[pointIdx][2]−geomAngularOrigin[2]−LaserCorrection[laserIndex[pointIdx]])×$r$InvLaser)>>22.

Updated PointPos may be specified as a multiple of a scale factor for each axis. If ScaleAxis is a non-zero positive value, updated PointPos may be derived as follows, PointPos$I$[pointIdx][0]=((ConvPointPos$I$[pointIdx][0]−MinPointPos[0])×ScaleAxis[0])>>8

PointPos[pointIdx][1]=((ConvPointPos[pointIdx][1]−MinPointPos[1])×ScaleAxis[1])>>8

PointPos[pointIdx][2]=((ConvPointPos[pointIdx][2]−
MinPointPos[2])×ScaleAxis[2])>>8

Here, MinPointPos is a minimum point position of ConvPointPos[pointIdx], and the range of pointIdx is 0 to pointCount-1.

If at least one of elements of ScaleAxis is zero, ScaleAxis is derived by a bounding box. The length of a bounding box according to an axis LegnthBbox in which MaxPointPos is a maximum point position for given ConvPointPos may be defined as follows.

LengthBbox[0]=MaxPointPos[0]−MinPointPos[0]

LengthBbox[1]=MaxPointPos[1]−MinPointPos[1]

LengthBbox[2]=MaxPointPos[2]−MinPointPos[2]

A maximum length of the three bounding boxes is defined.

MaxLengthBbox=Max(LengthBbox[0],Max(LengthBbox[1],LengthBbox[2]))

Then, ScaleAxis may be derived as follows.

ScaleAxis[0]=MaxLengthBbox+LengthBbox[0]

ScaleAxis[1]=MaxLengthBbox+LengthBbox[1]

ScaleAxis[2]=MaxLengthBbox+LengthBbox[2]

Hereinafter, a post-processing process for attribute decoding will be described.

Input of this process is as follows.

An attribute coordinate conversion enable flag (attr_coord_conv_enabled_flag) which is an indicator designating the use of coordinate conversion in an attribute coding process A PointsAttr array having a PointsAttr[pointIdx][cIdx] element. pointIdx ranges from 0 to PointCount-1, and cIdx ranges from 0 to AttrDim-1.

A PointPosCart array having a PointPosCart[pointIdx] element. pointIdx ranges from 0 to PointCount-1.

The output from this process is the PointAttr array with the PointAttr[pointIdx] [cIdx] element. Here, each element with the index pointIdx of PointAttr is associated with a position given by the PointPosCart array with the same index pointIdx.

In a process of performing projection according to the embodiments, a projection type (projection_type) for each axis may be defined if necessary. In this case, the projection type defined for each axis may be represented by a projection type x (projection_type_x), a projection type y (projection_type_y), and a projection type z (projection_type_z).

If projection_type_x is 0, this represents the case in which projection is not performed (i.e., the x value is used without conversion). If projection_type_x is 1, this represents a first conversion value of a coordinate system (e.g., the radius of a cylindrical coordinate system) indicated by a coordinate conversion type (coordinate_conversion_type), and if projection_type_x is 2, this represents a simplified conversion value (e.g., simplified x*x+y*y value by removing a square root from the radius of the cylindrical coordinate system). If projection_type_x is 3, this may represent the simplified sum of distances (e.g., the sum of positional information of each axis, i.e., x+y or x+y+z), and if projection_type_x is 4, this may indicate a conversion value (e.g., log_2(x)) by a promised function.

If projection_type_y is 0, this indicates no projection (i.e., a y value is used without conversion). If projection_type_y is 1, this represents a second conversion value of the coordinate system (e.g., an azimuthal angle of the cylindrical coordinate system) indicated by coordinate_conversion_type. If projection_type_y is 2, this may indicate a simplified conversion value (e.g., a tangent value may be obtained as an angular value to reduce inverse tangent calculation for obtaining an angle. In this case, it may be assumed that tan_phi=phi). If projection_type_y is 3, this may represent a simplified distance (e.g., a difference in positional information of each axis, i.e., x-y or y-x-z). If projection_type_y is 4, this may indicate a conversion value (e.g., log_2 (y)) by a promised function.

If projection_type_z is 0, this indicates no projection (i.e., a z value is used without conversion). If projection_type_z is 1, this represents a third conversion value of the coordinate system (e.g., an elevation angle of the cylindrical coordinate system) indicated by coordinate_conversion_type. If projection_type_z is 2, this may indicate a simplified conversion value (e.g., a tangent value may be obtained as an angular value to reduce inverse tangent calculation for obtaining an angle. A laser index may be used as a simplified conversion value by deriving a laser that has been used for data acquisition based on the number of lasers and positions of uniformly distributed lasers). If projection_type_z is 3, this may represent a simplified distance (e.g., a difference in positional information of each axis, x-y or y-x-z). If projection_type_z is 4, this may indicate a conversion value (e.g., log_2(z)) by a promised function.

A projection type (projection_type) applied to each axis may be defined for one coordinated conversion, and a different coordinated conversion type (coordinate_conversion_type) may be signaled for each axis. That is, this indicates that different projection is applied to each axis and may be used as a method of signaling a different conversion method. An example is explained below.

When coordinate_conversion_type is 1, projection_type_x=1, projection_type_y=1, and projection_type_z=1, this may indicate the radius, azimuthal angle, and elevation angle of the cylindrical coordinate system.

When coordinate_conversion_type is 2, and projection_type_x=1, projection_type_y=1, and projection_type_z=1, this may indicate the radius, azimuthal angle, and elevation angle of the spherical coordinate system.

When coordinate_conversion_type is 1, and projection_type_x=0, projection_type_y=0, and projection_type_z=0, this may indicate that no projection occurs (there is only a scaling change of each axis by granularity_radius, granularity_angular, and granularity_normal).

When the coordinate_conversion_type is 2, and projection_type_x=0, projection_type_y=0, and projection_type_z=1, this may represent conversion into the x and y axes and the elevation angle of the spherical coordinate system.

When coordinate_conversion_type is 1, and projection_type_x=0, projection_type_y=0, and projection_type_z=2, this may indicate conversion into the x and y axes and a laser index.

When coordinate_conversion_type is 1, and projection_type_x=2, projection_type_y=2, and projection_type_z=2, this may indicate conversion into a simplified radius, a simplified azimuthal angle, and a laser index in consideration of hardware implementation in the cylindrical coordinate system.

coordinate_conversion_type and projection_type may be used to designate a coordinated conversion type according to sequence characteristics. For example, for a sequence of type A, the projection type may use a radius, an azimuthal angle, and a laser index while cylindrical coordinate conversion is used. For a sequence of type B, the projection type may use (x, y, laser index) while cylindrical coordinate conversion is used. For a sequence of type C, the projection type may use (radius, azimuthal angle, elevation angle) while spherical coordinate conversion is used.

Figure 34:
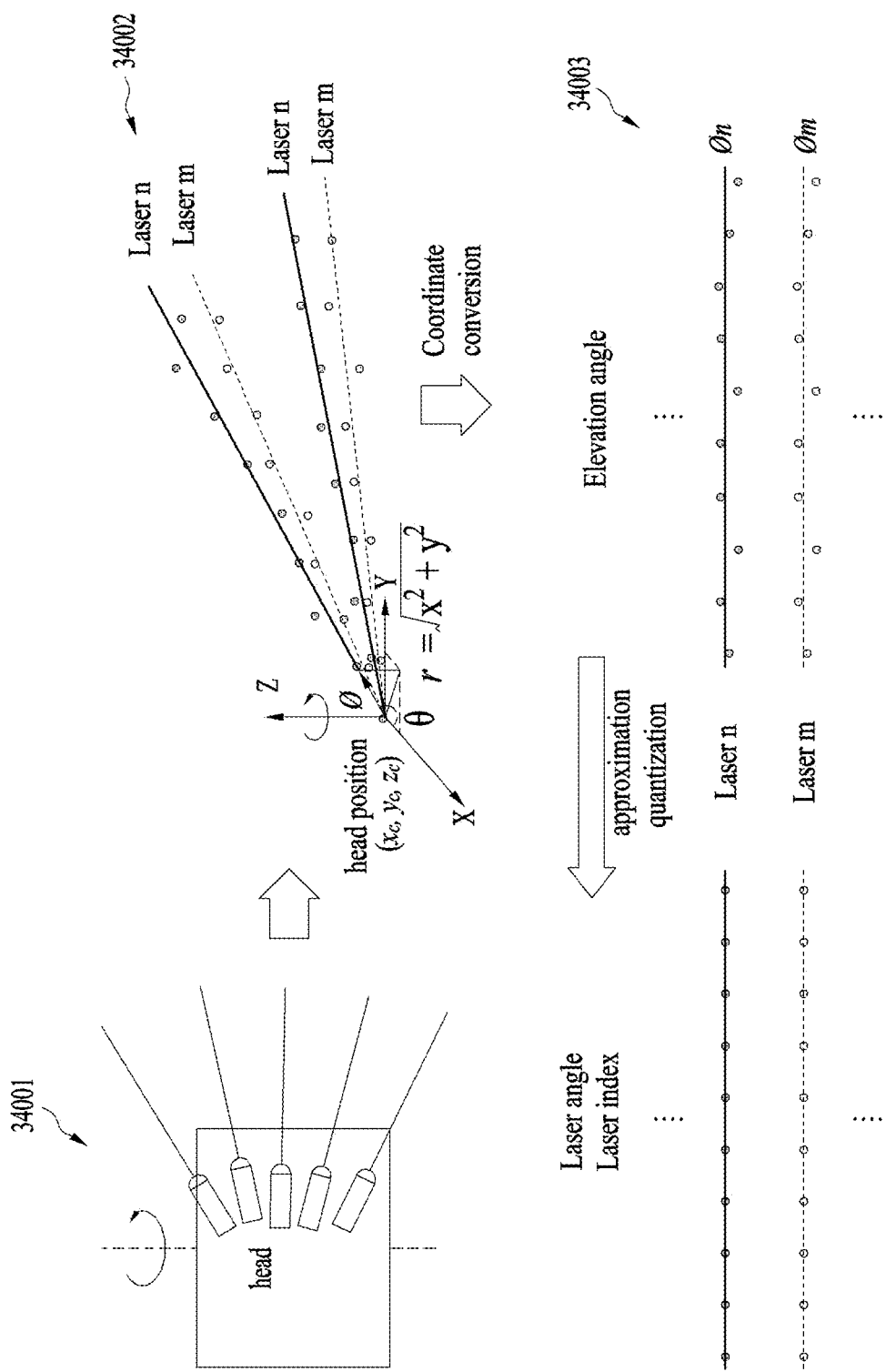
FIG. 34 illustrates an example of conversion of point cloud data into an index according to embodiments.

FIG. 34 illustrates an example of conversion of point cloud data into an index according to embodiments. When projection_type_z is 2, an elevation angle may be expressed as a laser index. The index may be a constant designated to increase encoding or decoding efficiency. Converting an elevation angle or an azimuthal angle of point cloud data into an index according to embodiments may be expressed as "adjusting the index".

As illustrated in FIG. 34, a LiDAR rotates horizontally around a head (34001). When light emitted from a laser is reflected onto and received by an object, the position of the object may be estimated based on the difference in transmission and reception times. In this case, acquired points are located on the trajectory of the laser, and due to the influence of noise, the points are located slightly higher or lower than the laser trajectory (34002). That is, the elevation angle of each point has a value slightly larger or smaller than a laser angle. Therefore, when approximating or adjusting the elevation angles of points, the elevation angles of respective points may be considered as laser angles or laser indexes associated therewith. That is, it is considered that the points are located on the laser without the difference between the elevation angles and the laser angles. Therefore, the elevation angle of each point is the same as the laser angle and may be considered as being aligned according to the laser index.

Figure 35:
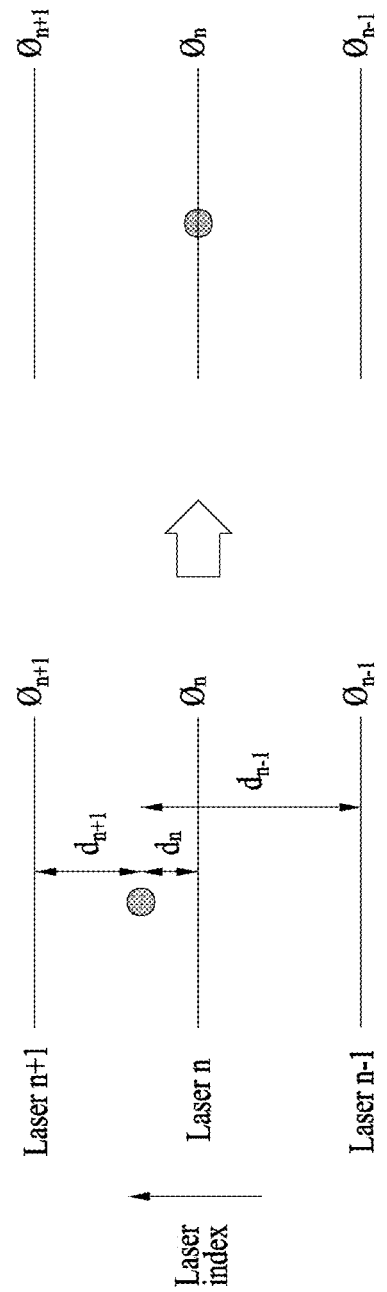
FIG. 35 illustrates an example of a method of approximating point cloud data according to embodiments.

FIG. 35 illustrates an example of a method of adjusting point cloud data according to embodiments. Referring to FIG. 35, a laser angle corresponding to an n-th laser is $\phi_n$, and laser angles of adjacent lasers are $\phi_{n-1}$ and $\phi_{n+1}$. In this case, a condition that an elevation angle $\phi$ of an arbitrary point matches a laser n may be as follows.

$$0.5*\phi_n+0.5*\phi_{n-1} \leq \phi < 0.5*\phi_n+0.5*\phi_{n+1}$$

In addition, differences between elevation angles of a current point and each laser may be calculated as $d_n=|\phi-\phi_n|$, $d_{n+1}=|\phi-\phi_{n+1}|$, and $d_{n-1}=|\phi-\phi_{n-1}|$, and a laser with which the difference value is minimized may be defined as a laser that has acquired the corresponding point.

If the total number of lasers is N, points matched with adjacent lasers through the above process may be divided into N groups. That is, it may be understood that the points are adjusted as laser angles or laser indexes, divided into N groups, and quantized. In this case, scaling factors for respective axes expressed as granularity_radius, granularity_angular, and granularity_normal may have another meaning. That is, the scaling factors may serve as separators for distinguishing between the N quantized groups. For example, if the scaling factor is 1 for conversion of a coordinate system consisting of (radius, azimuthal angle, laser index), this indicates that distance 1 of a radius and distance 1 of a laser have the same meaning and the possibility that cross-laser index points are searched as neighbor points increases because it is determined that adjacent laser indexes are excessively closer than actual laser indexes upon searching for the neighbor points. Therefore, the distance between laser indexes may be kept constant by using a signal represented as granularity_normal, so that points having different laser indexes may be prevented from being searched. That is, when searching for neighbor points in the process of encoding point cloud data, the search probability of similar points may be increased.

When using a laser index or a laser angle, granularity_normal >= minimum inter-laser distance >= maximum $k-th$ neighbor distance in a laser plane:

$$\left(\sqrt{(x_k(n)-x_l(n))^2+(y_k(n)-y_l(n))^2+(z_k(n)-z_l(n))^2}\right)$$

In this case, $(x_k(n), y_k(n), z_k(n))$ and $(x_l(n), y_l(n), z_l(n))$ denote the xyz positions of arbitrary adjacent points belonging to a laser n.

In this case, a laser plane may mean a plane to which points associated with one laser belong or a plane scanned by one laser. A maximum neighbor distance in a laser plane may mean the farthest distance among k-th neighbors when obtaining k neighbors for points in the laser plane. A scaling factor corresponding to granularity_normal may be defined based on a maximum value with respect to the maximum k-th neighbor distance in a laser plane for respective laser planes, and different scaling factors may be adaptively defined according to respective planes. The maximum neighbor distance in a laser plane may be measured according to each sequence in the encoder according to the embodiments, or a predetermined value may be signaled as the maximum neighbor distance to the decoder according to the embodiments through experiments. This helps achieve independent compression or discern peripheral characteristics in each laser plane by spacing the distance between lasers. Alternatively, the maximum neighbor distance in a laser plane may use a value predetermined in the decoder according to the embodiments.

A minimum laser distance may be equally applied to all lasers, and different distances may be used for lasers or for the same laser depending on the distance from the center according to the characteristics of the lasers.

Figure 36:
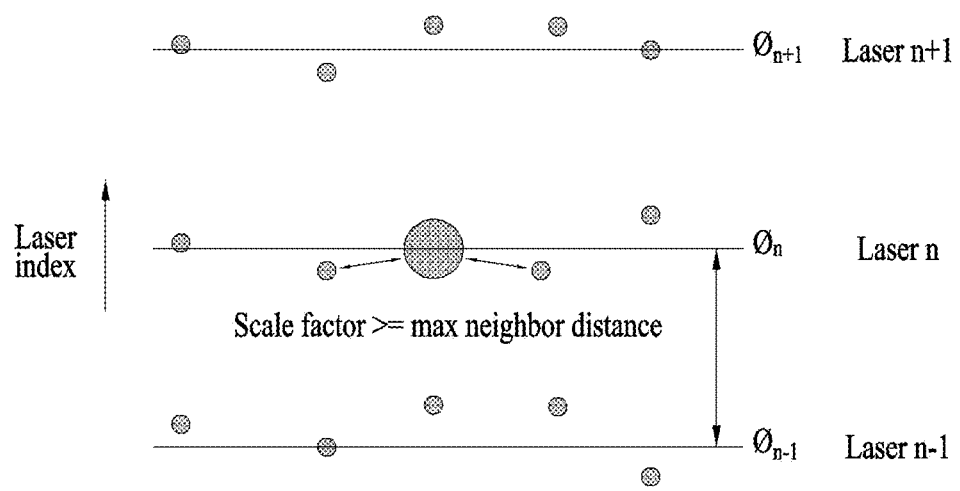
FIG. 36 illustrates an example of a method of maintaining an index spacing based on a scaling factor for point cloud data according to embodiments.

FIG. 36 illustrates an example of a method of maintaining an index spacing based on a scaling factor for point cloud data according to embodiments. That is, FIG. 36 illustrates that a neighbor search error is prevented by maintaining a spacing between laser indexes based on the scaling factor. A maximum neighbor distance for determining the scaling factor may use a value defined through experiments or may be defined and signaled according to a sequence characteristic after measuring a neighbor distance within a laser index in the encoder according to the embodiments.

Meanwhile, a coordinate system converted into a laser index may be efficiently used without signaling. When searching for neighbor points, only points having the same laser index or the same laser angle may be searched or only points within a certain range of laser indexes or laser angles may be searched.

Nearest Neighbor=minimum distance point within the same laser index

Figure 37:
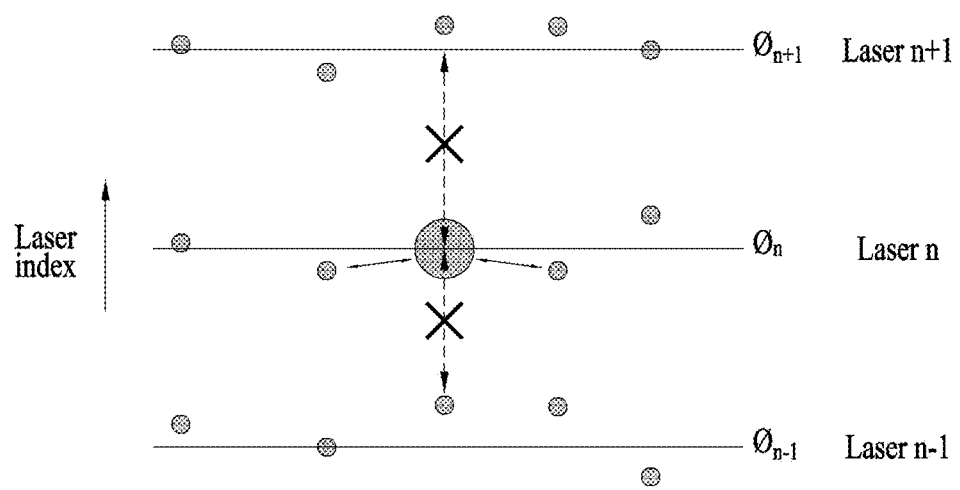
FIG. 37 illustrates an example of a neighbor point search method based on a laser index in point cloud data according to embodiments.

FIG. 37 illustrates an example of a neighbor point search method based on a laser index in point cloud data according to embodiments. In FIG. 36, point cloud data is listed vertically along laser indexes in a radius/azimuth plane when coordinates of point cloud data according to embodiments are converted into a radius, an azimuthal angle, and a laser index. Search for neighboring points may be performed based on a distance with respect to points belonging to an n-th laser by considering only points included in the same laser without considering points having different laser indexes or laser angles.

This index-based neighbor point search may be applied to nearest neighbor search of predictive-lifting attribute coding or to predictive attribute coding. In addition, the index-based neighbor point search may be used as a condition for collecting points obtained by a single laser by giving priority to aligning points having the same laser index as a group in a point sorting process.

When a laser index or a laser angle is used, corresponding information for each point may be included. That is, laser index or laser angle information may be added to previously included XYZ location information or may be used by substituting or converting one or more axis values. If acquired data does not include the laser index or laser angle information, a laser index or laser angle of each point may be derived based on related information (laser angle, laser head position, and/or laser position information of an image acquirer).

The aforementioned laser index or laser angle may be used to adjust sampled points according to an elevation angle in a cylindrical coordinate system or a spherical coordinate system.

Figure 38:
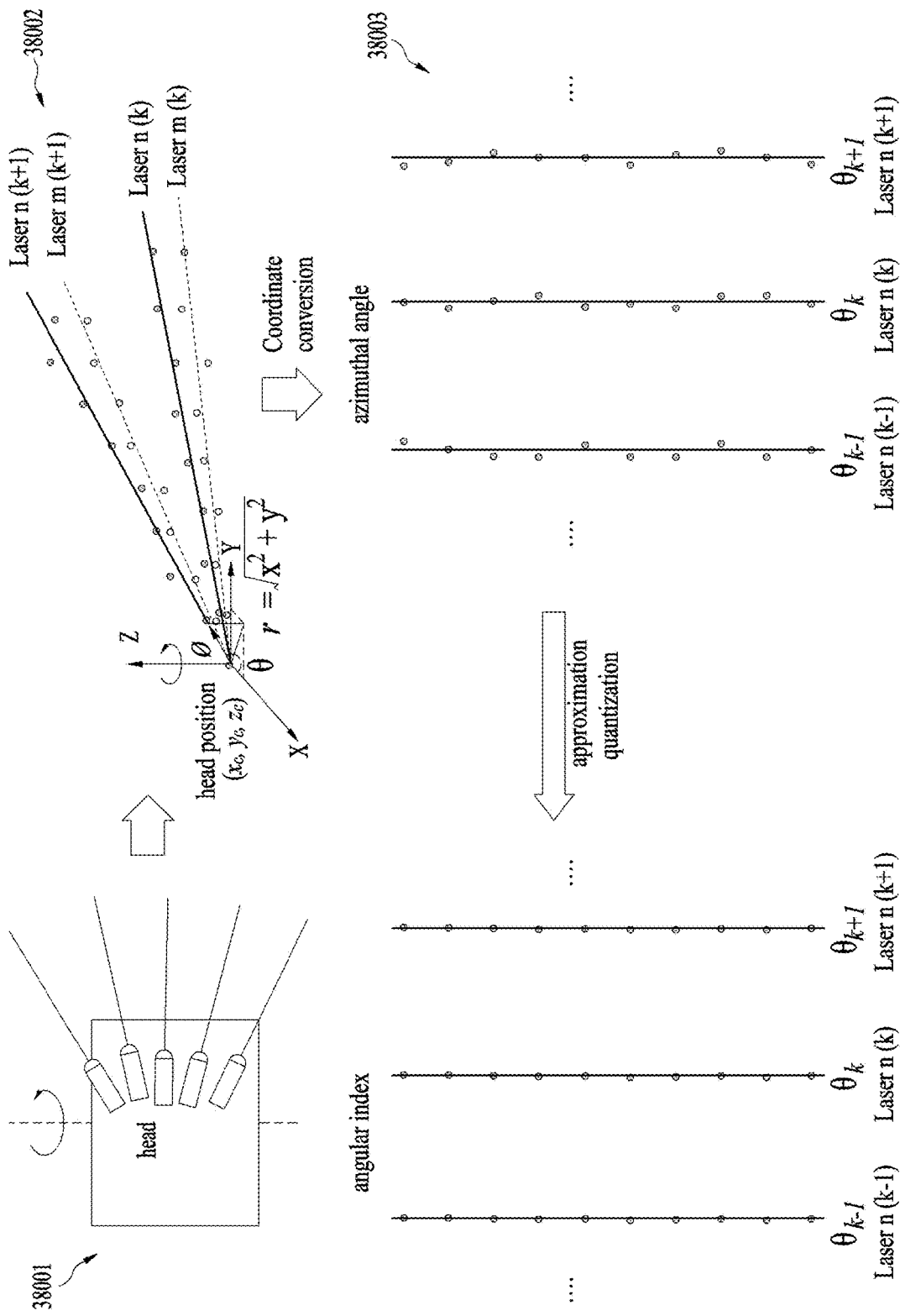
FIG. 38 illustrates an example of converting point cloud data into an index according to embodiments.

FIG. 38 illustrates an example of adjusting point cloud data by converting an azimuthal angle into an index according to embodiments. An azimuthal index may be used for sampling adjustment for an azimuthal angle in a cylindrical coordinate system, a spherical coordinate system, or a circular-sector-shaped coordinate system. The index may be a constant designated to increase encoding or decoding efficiency. Converting an elevation angle or an azimuthal angle of point cloud data into an index according to the embodiments may be expressed as "adjusting an index".

Referring to FIG. 38, while a plurality of lasers arranged in a vertical direction rotate horizontally (38001), point cloud data is acquired. If positions sampled by each laser are expressed as a line, sampled points should theoretically be located on the line, but the points may be sampled at positions deviating from the line due to sampling noise, quantization errors, and/or laser interference (38002). FIG. 38 illustrates k-th sampling points of an n-th laser among a plurality of lasers arranged in a vertical direction and sampling points ((k−1)-th and (k+1)-th sampling points) adjacent thereto (38003). The positions of points sampled by the k-th laser and the (k+1)- and (k+1)-th lasers are distributed with errors around the trajectory of laser rays. In this way, the positions of points having an error in the azimuthal angle may be approximated to indexes and adjusted so as to be located on the line trajectory of a laser.

Figure 39:
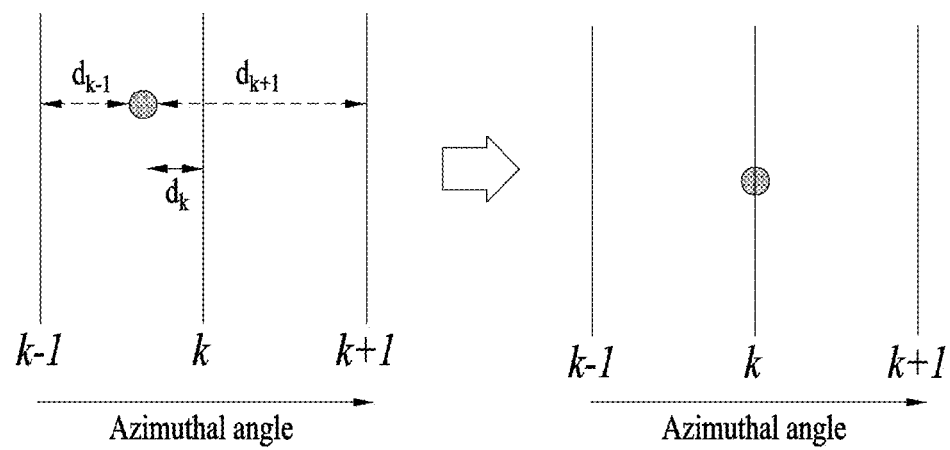
FIG. 39 illustrates an example of a method of adjusting an azimuthal angle of point cloud data according to embodiments.

FIG. 39 illustrates an example of a method of adjusting an azimuthal angle of point cloud data according to embodiments.

When a k-th azimuthal angle sampled by an n-th laser is $\theta_k$, and (k−1)-th and (k+1)-th sampled azimuthal angles adjacent to the k-th sampled azimuthal angle are $\theta_{k-1}$ and $\theta_{k+1}$, respectively, a condition that an azimuthal angle $\theta$ of a corresponding point matches the k-th sampled angle of the n-th laser is as follows.

$$0.5*\theta_k+0.5*\theta_{k-1} \leq \theta < 0.5*\theta_k+0.5*\theta_{k+1}$$

That is, when $\theta$ is within the range of the above equation condition, the azimuthal angle $\theta$ of the corresponding point may be adjusted to the k-th sampling azimuthal angle $\theta_k$ of the n-th laser.

In addition, the azimuthal angle of a laser at which the differences $d_k=|\theta-\theta_k|$, $d_{k+1}=|\theta-\theta_{k+1}|$, and $d_{k-1}=|\theta-\theta_{k-1}|$ between the azimuthal angle $\theta$ of the point and azimuthal angles $\theta_k$, $\theta_{k-1}$, and $\theta_{k+1}$ sampled by the laser are minimized may be approximated and adjusted to an azimuthal angle of the corresponding point.

Referring to FIG. 39, the position of a point close to a k-th laser beam is adjusted to be located on the trajectory of the k-th laser beam. In this case, information $\theta_k$, $\theta_{k-1}$, and $\theta_{k+1}$ about azimuthal angles sampled by a laser may be directly transmitted as parameters or may be transmitted in a form capable of being calculated by the transmission device or the reception device according to the embodiments. Assuming that the rotational speed of a LiDAR is constant, information about the azimuthal angle may be calculated as follows through the number of times of sampling per turn (N: number_phi_per_turn) and a sampling start position ($\Delta\theta_0$: offset) of an n-th laser (unit: radian).

$$\theta_k = k/N*2\pi+\Delta\theta_0$$

The offset may have the same value for all laser indexes, a similar value within an error range, or a different value depending on a laser index. If the horizontal positions of lasers are different, the lasers may be accurately grouped in consideration of the offset.

Figure 40:
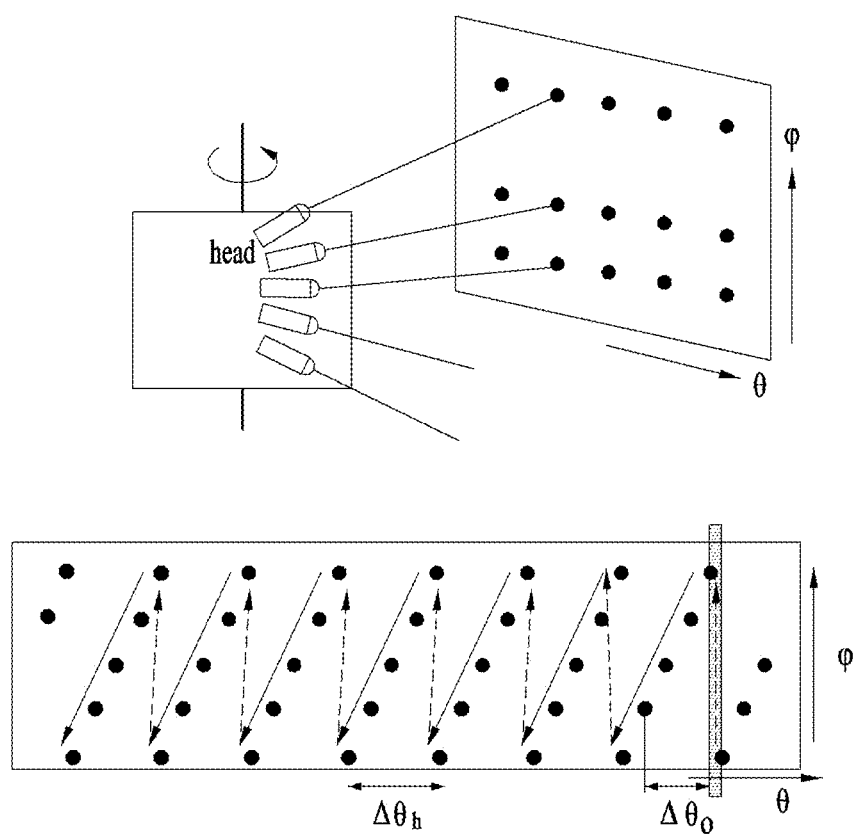
FIG. 40 illustrates a state in which lasers included in a LiDAR have different azimuthal angles according to embodiments.

FIG. 40 illustrates a state in which lasers included in a LiDAR have different azimuthal angles according to embodiments.

Figure 41:
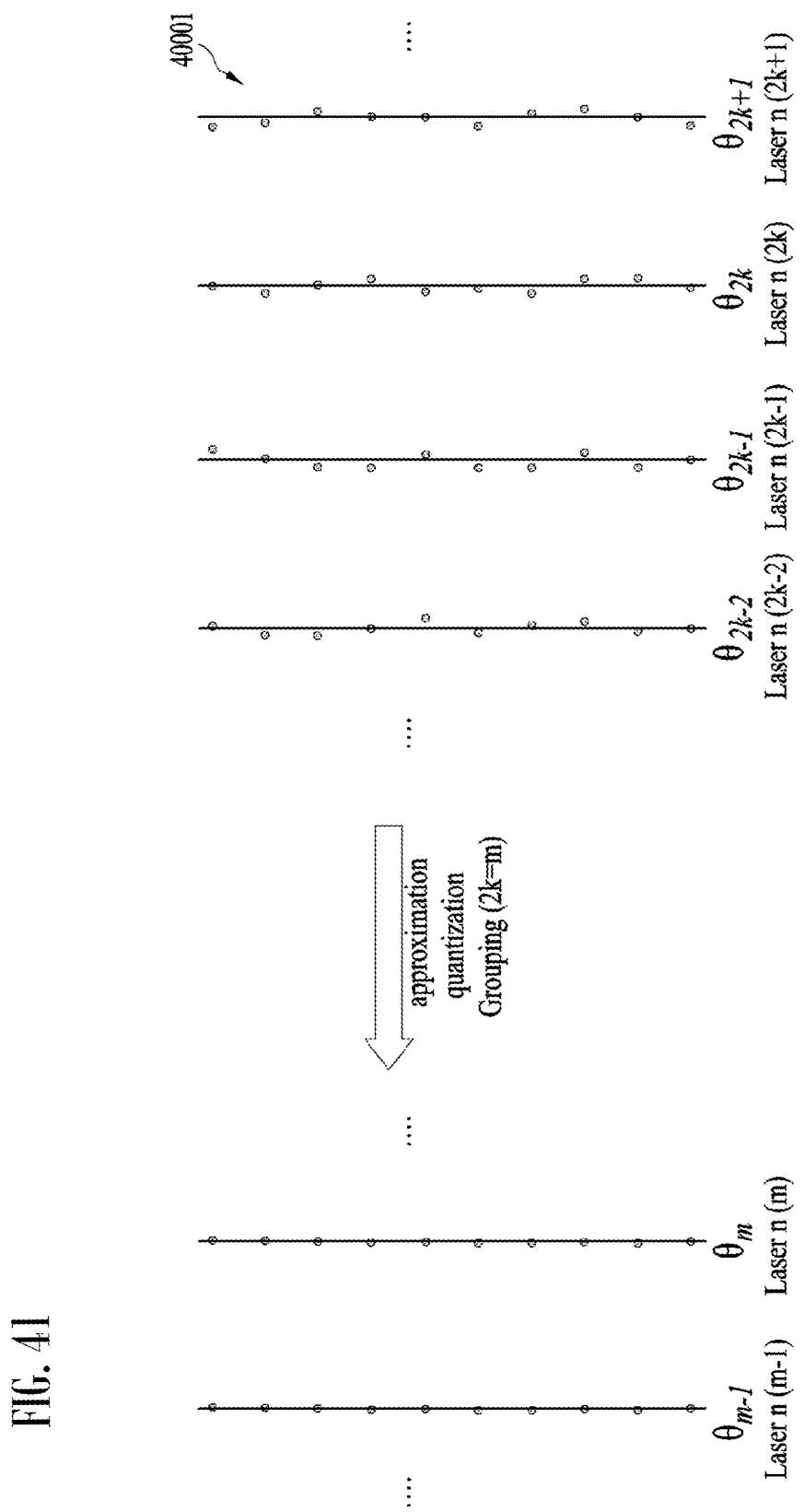
FIG. 41 illustrates an example of a method of grouping point cloud data according to embodiments.

FIG. 41 illustrates an example of a method of grouping point cloud data according to embodiments. FIG. 41 illustrates that two horizontally adjacent sampling positions are grouped into one position. That is, (2k−2)-th and (2k−1)-th sampled points are grouped into m−1, and the (2k)-th and (2k+1)-th sampled points are grouped into m. When horizontal direction sampling is dense, similarity between adjacent points may be further considered by lowering a sampling rate.

FIG. 42 illustrates an exemplary syntax of an SPS according to embodiments. The point cloud data transmission device and method according to the embodiments may signal projection-related information to the reception device according to the embodiments.

As a diagram related to FIG. 42, FIG. 43 illustrates an exemplary syntax of a geometry parameter set (GPS) according to embodiments. FIG. 44 illustrates an exemplary syntax of an attribute parameter set (APS) according to embodiments, and FIG. 45 illustrates exemplary syntaxes of a general geometry slice bitstream and a geometry slide header according to embodiments. FIG. 46 illustrates exemplary syntaxes of a general attribute slice bitstream and an attribute slice header according to embodiments, and FIGS. 47 to 49 illustrate an exemplary syntax of projection information according to embodiments.

Information related to coordinate axis conversion (projection) may be defined in a parameter set and an SEI message. In addition, an SPS, a GPS, an APS, and a slice header indicate whether independent projection is performed, and detailed information about projection may be included in projection information (projection_info( )) and transmitted.

Whether projection may be performed may be transmitted through a projection flag (projection_flag) in the SPS, the GPS, and the APS and, at the same time, may be transmitted in units of slices by defining projection_flag in units of slices. In addition, all or part of related information may be transmitted in the SPS, and the remaining information may be transmitted in the GPS, the APS, a TPS, the slice header, or the SEI message.

Signaling information (parameters, metadata, etc.) has different meanings according to delivered positions. If the signaling information is defined in the SPS, this indicates that the signaling information is applied to the entire sequence. If the signaling information is defined in the GPS, this indicates that the signaling information is used to reconstruct geometry (positions). If the signaling information is defined in the APS, this indicates that the signaling information is applied to attribute (attribute) reconstruction. If the signaling information is defined in the TPS, this indicates that corresponding signaling is applied to a point within a tile. When the signaling information is defined in units of slices, this indicates that the signaling information is applied to a corresponding slice. The signaling information may be defined in a corresponding position or a separate position depending on an application or a system, and an application range and an application method thereof may be different. In addition, when a defined syntax element is applied not only to a current point cloud data stream but also to a plurality of point cloud data streams, the signaling information may be transmitted through a parameter set of a higher level concept.

Hereinafter, parameters (metadata, signaling information, etc.) according to the embodiments may be generated during a process of the transmission device according to the embodiments described later and may be transmitted to the reception device according to the embodiments and used in a reconfiguration process. For example, the parameters according to the embodiments may be generated by a metadata processor (or metadata generator) of the transmission device according to the embodiments to be described later and may be obtained by a metadata parser of the reception device according to the embodiments.

Hereinafter, related syntaxes will be described. A description of the syntax overlapping with that of FIG. 26 will be omitted.

If an SPS projection parameter present flag (sps_projection_param_present_flag), a GPS projection parameter present flag (gps_projection_param_present_flag), and an APS projection parameter present flag (aps_projection_param_present_flag) are 1, this indicates that projection-related parameters are transmitted in the SPS, GPS, and APS. If sps_projection_param_present_flag, gps_projection_param_ present_flag, and aps_projection_param_present_ flag are 0, this indicates that parameters are transmitted in units of slices.

An SPS sequence parameter set ID (sps_seq_parameter_set_id) and a GPS sequence parameter set ID (gps_seq_parameter_set_id) indicate indicators of corresponding parameter sets when coordinate system projection is performed and related parameters are transmitted to an SPS and a GPS.

For example, when coordinate conversion is used for attribute coding, a related parameter may be transmitted in the GPS (when a parameter used for coordinate conversion is commonly used in a coding scheme used for geometry coding). In this case, a parameter set indicator that may reference the corresponding parameter may be directly transmitted. When the corresponding parameter is defined in the SPS to indicate that the corresponding parameter is applied to all point cloud data sequences or simultaneously to geometry and attributes, the parameter may directly indicate an SPS indicator. Therefore, among a plurality of parameter sets, a parameter set including a required parameter may be referred to. When a parameter defined in the APS is used for geometry (position) reconstruction, an APS indicator may be defined in the GPS.

If an elevation index enable flag (elevation_index_enable_flag) and an azimuthal index enable flag (azimuthal_index_enable_flag) are 1, this indicates whether the index of an elevation angle or the index of an azimuthal angle is used for a coordinate-converted point position.

If(elevation_index_enable_flag==0,azimuthal_index_
enable_flag==0)

(x,y,z)->(radius,azimuthal angle,elevation angle)

else If(elevation_index_enable_flag==0,azimuthal_
index_enable_flag==1)

(x,y,z)->(radius,angular index,elevation angle)

else If(elevation_index_enable_flag==1,azimuthal_
index_enable_flag==0)

(x,y,z)->(radius,azimuthal angle,laser index)

else if(elevation_index_enable_flag==1,azimuthal_in-
dex_enable_flag==1)

(x,y,z)->(radius,angular index,laser index)

laser_phi_per_turn[i] represents the number of times of sampling per turn in a horizontal direction for an i-th laser. laser_phi_per_turn[i] may use a default value for a specific value such as −1,0,1 (e.g., if the default value is 200 when sampling of 800 times is performed, 4 samples may be grouped into one) or represent azimuthal_index_enable_flag=0 indicating that an azimuthal index is not used.

A laser angle offset (laser_angle_offset[i]) represents a horizontal sampling position difference of an i-th laser to adjust a sampling position difference between a plurality of lasers. For example, laser_angle_offset[i] may indicate the angle of the first sample.

A laser sampling angle (laser_sampling_angle[i][j]) represents a j-th horizontal sampling angle of an i-th laser. If the sampling position of a laser is not uniform, laser_sampling_angle[i][j] may be used to indicate each sampling angle.

A grouping rate grouping_rate may represent a frequency of grouping horizontal indexes. When grouping_rate is 1, this indicates the same number of times of sampling equal to laser_phi_per_turn. When grouping_rate is greater than 1, this indicates that a plurality of laser sampling positions is grouped and considered as one. If grouping_rate is less than 1, this may indicate that a virtual laser sampling position is added. grouping_rate may be used as the meaning of a scale in terms of widening a spacing between laser sampling positions.

Meanwhile, a coordinate system conversion method may be adopted to improve the performance of attribute coding. In this method, the position of each point distributed in a cylindrical coordinate system may be converted into a rectangular coordinate system in which each axis is a function of radius, an azimuthal angle, and a laser index. For a point position given as (x,y,z), a corresponding position in the cylindrical coordinate system may be derived as follows.

$$r_L = \sqrt{(x - x_c - x_L)^2 + (y - y_c - y_L)^2},$$

$$\theta_L = \tan^{-1}\left(\frac{y - y_c - y_L}{x - x_c - x_L}\right),$$

$$\phi_L = \tan^{-1}\left(\frac{z - z_c - z_L}{\sqrt{(x - x_c - x_L)^2 + (y - y_c - y_L)^2}}\right)$$

$(x_c, y_c, z_c)$ and $(x_L, y_L, z_L)$ represent a center position of a LiDAR head and a relative position of a laser, respectively. Coordinate system conversion for $(r_L, \theta_L, \phi_L)$ may be performed as follows.

$x' = s_r \cdot r_L, y' = s_\theta \cdot \theta_L, z' = s_{idx} \cdot idx_L,$ $idx_L$ denotes a laser index that samples a point with an elevation angle $\phi_L$, and scaling parameters $s_r$, $s_\theta$, and $s_{idx}$ may be derived by dividing maximum point distribution lengths of three axes by point distribution lengths of respective axes.

For further improvement, an angular index $idx_\theta$ may be used instead of an azimuthal angle $\theta_L$. The positions of coordinate conversion output are as follows.

$$x'=s_r \cdot r_L, y'=s_{idx\theta} \cdot idx_\theta, z'=s_{idx} \cdot idx_L$$

Here, $idx_\theta$ denotes an index between 0 and num_phi_per_turn−1, and $s_{idx\theta}$ denotes a scaling parameter corresponding to an angular index. The angular index may be calculated as follows.

$$idx_\theta = \theta_L/2\pi \times \text{num\_phi\_per\_turn} + \text{offset}$$

Here, offset ranges from 0 to 1 and may be used to adjust the starting position of a laser.

Hereinafter, code for a process of performing conversion from the Cartesian coordinate system into the spherical coordinate system is provided.

The output of this process is an array AttrPos[idx][axis], which specifies a position after conversion into the spherical coordinate system from idx=0 to PointCount−1. The range of an axis is 0 to 2.

Arrays r2[idx], tPoint[idx], sPoint[idx], and PointTheta [idx] (with idx=PointCount−1) are derived as follows.

```
for(idx=0; idx<PointCount; idx++){
    sPoint[idx] = (PointPos[idx][0] − GeomAngularOrigin[0]) << 8
    tPoint[idx] = (PointPos[idx][1] − GeomAngularOrigin[1]) << 8
    r2[idx] = sPoint × sPoint + tPoint × tPoint
    rInvLaser = invSqrt(r2[idx])
    pointTheta[idx] = ((PointPos[idx][2] − GeomAngularOrigin[2]) ×
    rInvLaser) >> 14
}
A laser index array laserIndex[ idx ] (idx = 0..PointCount − 1) may be
derived as
follows.
for(idx=0; idx<PointCount; idx++){
    for (i = 1; i < number_lasers_minus1; i++)
        if (LaserAngle[i] > pointTheta[idx])
            break
    if (pointTheta[idx]−LaserAngle[i−1] <= LaserAngle[i] −
    pointTheta[idx])
        i−−
    laserIndex[idx]= i
}
```

An azimuthal angular index array (azimuthIndex[idx]) (idx=0 . . . PointCount−1) may be derived as follows.

```
When LaserPhiPerTurn[laserIndex[idx]] > 0
for(idx=0; idx<PointCount; idx++){
    phi[idx] = (iAtan2hp(tPoint[idx], sPoint[idx]) + 3294199) >> 8
    if(LaserPhiPerTurn[laserIndex[idx]] <= 0)
        azimuthIndex[idx]= phi[idx]
    else {
    azimuthIndex[idx] = divApprox(phi *
    LaserPhiPerTurn[laserIndex[idx]] * (1 <<
    8) + spherical_coord_azimuth_offset * 2 * (3294199 >> 8), 2 *
    (3294199 >> 8) * (1 << 8), 8)
        if (azimuthIndex[idx] >= LaserPhiPerTurn[laserIndex[idx]])
    azimuthIndex[idx] −= LaserPhiPerTurn[laserIndex[idx]]
        else if (azimuthIndex[idx] < 0)
    azimuthIndex[idx] += LaserPhiPerTurn[laserIndex[idx]]
    }
}
```

An array convPointPos[idx][axis] specifies a point position of the cylindrical coordinate system (foridx=0 . . . PointCount−1), and the range of an axis is 0 to 2 and may be derived as follows.

```
for(idx=0; idx<PointCount; idx++){
    convPointPos[idx][0] = iSqrt(r2[idx]) >> 8
    convPointPos[idx][1] = azimuthIndex[idx]
    convPointPos[idx][2] = laserIndex[idx]
}
```

An array minPointPos[axis] (with axis=0 . . . 2) may be derived as follows.

```
for (axis=0; axis<3; axis++){
    minPointPos[axis] = convPointPos[0][axis]
    for(idx=1; idx<PointCount; idx++){
        if(minPointPos[axis]> convPointPos[idx][axis])
            minPointPos[axis] = convPointPos[idx][axis]
    }
}
```

An array AttrPos[idx][axis] may be derived as follows.

```
for (axis=0; axis<3; axis++)
    for (idx=0; idx<PointCount; idx++)
        AttrPos[idx][axis] = ((convPointPos[idx][axis] −
        minPointPos[axis])×attr_spherical_coord_conv_scale[k]) >> 8
```

Meanwhile, as described below, conversion into a radius, an angular index, and a laser index may be applied to predictive geometry coding.

That is, for the azimuthal angle (Phi or angle), an angular index may be used instead of a radian value. Accordingly, point cloud data expressed as (x, y, z) may be converted into (radius, angular index, laser index) and expressed. In this case, the angular index may be calculated using the laser index and Num_phi_per_turn. Num_phi_per_turn means the number of times of sampling performed by a laser when a LiDAR head rotates once.

Meanwhile, in predictive geometry coding, a prediction error, that is, a residual, may be set to be in the range of 0 to $2\pi$ by applying a circular difference. For example, if a prediction mode is 1, Phi(n−1) is 0, and phi(n) is $7\pi/4$, then phi_index(n−1) is 0 and phi_index(n) is 7*Num_phi_per_turn/8.

Here, a prediction error res(n) is calculated by phi_index (n)−phi_index(n−1)=7*Num_phi_per_turn/8, which may be transferred as a smaller residual. That is, the encoder according to the embodiments may transmit−Num_phi_per_turn/8, which is equal to the calculated residual value 7*Num_phi_per_turn/8, as a new residual value res_new(n). The decoder according to the embodiments may be adjusted such that the range of phi_pred(n)+res_new(n) falls within the range of 0 to 27.

Figure 50:
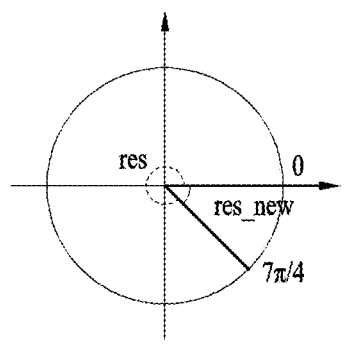
FIG. 50 illustrates a residual between indexes according to embodiments.

FIG. 50 is a diagram illustrating a principle of transmitting a smaller residual in index residual values of converted point cloud data according to embodiments. As illustrated in FIG. 50, even if the value of an angle indicating a direction is large, the angle indicates the same direction at a cycle of $2\pi$. Therefore, the angle may be adjusted to a residual value within $2\pi$ even when the residual value is large.

Hereinafter, code related to the conversion of a coordinate system will be described.

```
1. (radius, angular index, laser index) -> (x, y, z) inverse projection
SphericalToCartesian(const GeometryParameterSet& gps)
    : log2ScaleRadius(gps.geom_angular_radius_inv_scale_log2)
    , log2ScalePhi(gps.geom_angular_azimuth_scale_log2)
    , tanThetaLaser(gps.geom_angular_theta_laser.data( ))
    , zLaser(gps.geom_angular_z_laser.data( ))
        , laser_phi_per_turn(gps.geom_angular_num_phi_per_turn.data( ))
{ }
    Vec3<int32_t> operator( )(Vec3<int32_t> sph)
    {
        int64_t r = sph[0] << log2ScaleRadius;
        int64_t z = divExp2RoundHalfInf(
            tanThetaLaser[sph[2]] * r << 2, log2ScaleTheta - log2ScaleZ);
        sph[1] = findAngle2(sph[1], laser_phi_per_turn[sph[2]], log2ScalePhi);
        return Vec3<int32_t>(Vec3<int64_t>{
            divExp2RoundHalfInf(r * icos(sph[1], log2ScalePhi), kLog2ISineScale),
            divExp2RoundHalfInf(r * isin(sph[1], log2ScalePhi), kLog2ISineScale),
            divExp2RoundHalfInf(z - zLaser[sph[2]], log2ScaleZ)});
    }
2. (x, y, z) -> (radius, angular index, laser index) conversion
CartesianToSpherical(const GeometryParameterSet& gps)
    : sphToCartesian(gps)
    , log2ScaleRadius(gps.geom_angular_radius_inv_scale_log2)
    , scalePhi(1 << gps.geom_angular_azimuth_scale_log2)
    , numLasers(gps.geom_angular_theta_laser.size( ))
    , tanThetaLaser(gps.geom_angular_theta_laser.data( ))
    , zLaser(gps.geom_angular_z_laser.data( ))
        , laser_phi_per_turn(gps.geom_angular_num_phi_per_turn.data( ))
{ }
    Vec3<int32_t> operator( )(Vec3<int32_t> xyz)
    {
        int64_t r0 = int64_t(std::round(hypot(xyz[0], xyz[1])));
        int32_t thetaIdx = 0;
        int32_t minError = std::numeric_limits<int32_t>::max( );
        for (int idx = 0; idx < numLasers; ++idx) {
            int64_t z = divExp2RoundHalfInf(
                tanThetaLaser[idx] * r0 << 2, log2ScaleTheta - log2ScaleZ);
            int64_t z1 = divExp2RoundHalfInf(z - zLaser[idx], log2ScaleZ);
            int32_t err = abs(z1 - xyz[2]);
            if (err < minError) {
                thetaIdx = idx;
                minError = err;
            }
        }
        Vec3<int32_t> sphPos{ int32_t(divExp2RoundHalfUp(r0, log2ScaleRadius)),
                int32_t(findTurn2(xyz, laser_phi_per_turn[thetaIdx])),
thetaIdx };
        // local optimization
        auto minErr = (sphToCartesian(sphPos) - xyz).getNorm1( );
   int32_t dr0 = 0;
   for (int32_t dr = -2; dr <= 2; ++dr) {
            auto sphPosCand = sphPos + Vec3<int32_t>{dr, 0, 0};
            auto err = (sphToCartesian(sphPosCand) - xyz).getNorm1( );
            if (err < minErr) {
                minErr = err;
   dr0 = dr;
            }
        }
        sphPos[0] += dr0;
        return sphPos;
    }
```

In the code above, parts below/Local optimization describe a process of reconverting a converted coordinate sphPos into the Cartesian coordinate system and then adjusting a radius in order to minimize an error with an original coordinate.

```
3. Calculation of angular index from azimuthal angle
inline int
CartesianToSpherical::findTurn2(Vec3<int> point, const int laser_phi_per_turn)
    {
        int turn_idx = (int)std::round(((atan2(point[1], point[0]) + M_PI) *
laser_phi_per_turn) / (2.0 * M_PI));
        if (turn_idx >= laser_phi_per_turn)       turn_idx -= laser_phi_per_turn;
        else if (turn_idx < 0)                    turn_idx += laser_phi_per_turn;
        return turn_idx;
```

```
}
4. Calculate azimuthal angle from angular index
inline int
SphericalToCartesian::findAngle2(int turn_idx, const int laser_phi_per_turn,
const int log2ScalePhi)
{
    double scalePhi = (double)(1 << log2ScalePhi);
    double angle = std::round((turn_idx * 2.0 - laser_phi_per_turn) * scalePhi / (2.0
* laser_phi_per_turn));
    if (angle >= scalePhi / 2)          angle -= scalePhi;
    else if (angle < -scalePhi / 2)     angle += scalePhi;
    return (int)angle;
}
```

Code related to generation of a predictive tree is described below.

```
int
PredGeomEncoder::encodeTree(
    const Vec3<int32_t>* srcPts,
    Vec3<int32_t>* reconPts,
    const GNode* nodes,
    int numNodes,
    int rootIdx,
    int* codedOrder)
{
    QuantizerGeom quantizer(_sliceQp);
    int nodesUntilQpOffset = 0;
    int processedNodes = 0;
    _stack.push_back(rootIdx);
    while (!_stack.empty()) {
        const auto nodeIdx = _stack.back();
        _stack.pop_back();
        const auto& node = nodes[nodeIdx];
        const auto point = srcPts[nodeIdx];
        struct {
            float bits;
            GPredicter::Mode mode;
            Vec3<int32_t> residual;
            Vec3<int32_t> prediction;
        } best;
        if (_geom_scaling_enabled_flag && !nodesUntilQpOffset--) {
            int qp = qpSelector(node);
            quantizer = QuantizerGeom(qp);
            encodeQpOffset(qp - _sliceQp);
            nodesUntilQpOffset = _qpOffsetInterval;
        }
        // mode decision to pick best prediction from available set
        int qphi;
        for (int iMode = 0; iMode < 4; iMode++) {
            GPredicter::Mode mode = GPredicter::Mode(iMode);
            GPredicter predicter = makePredicter(
                nodeIdx, mode, [=](int idx) { return nodes[idx].parent; });
            if (!predicter.isValid(mode))
                continue;
            auto pred = predicter.predict(&srcPts[0], mode);
/* if (_geom_angular_mode_enabled_flag) {
            if (iMode == GPredicter::Mode::Delta) {
                int32_t phi0 = srcPts[predicter.index[0]][1];
                int32_t phi1 = point[1];
                int32_t deltaPhi = phi1 - phi0;
                qphi = deltaPhi >= 0
                    ? (deltaPhi + ( geom_angular_azimuth_speed >> 1))
                        / _geom_angular_azimuth_speed
                    : -(-deltaPhi + ( _geom_angular_azimuth_speed >>
                        1))
                        / _geom_angular_azimuth_speed;
                pred[1] += qphi * _geom_angular_azimuth_speed;
            }
}*/
            // The residual in the spherical domain is losslessly coded
            auto residual = point - pred;
            ///////////////////////////
            if (_geom_angular_mode_enabled_flag) {
                if (abs(residual[1]) > abs(residual[1] +
                    _num_phi_per_turn[point[2]]))
                    residual[1] += _num_phi_per_turn[point[2]];
                else if (abs(residual[1]) > abs(residual[1] -
                    _num_phi_per_turn[point[2]])) residual[1] -=
                    _num_phi_per_turn[point[2]];
            }
            for (int i = 0; i < 3; i++) {
                if (max[i] < residual[i]) max[i] = residual[i];
                else if (min[i] > residual[i]) min[i] = residual[i];
            }
            ///////////////////////////
            if (!_geom_angular_mode_enabled_flag)
                for (int k = 0; k < 3; k++)
                    residual[k] = int32_t(quantizer.quantize(residual[k]));
            // Check if the prediction residual can be represented with the
            // current configuration. If it can't, don't use this mode.
            bool isOverflow = false;
            for (int k = 0; k < 3; k++) {
                if (residual[k])
                    if ((abs(residual[k]) - 1) >>
                        _maxAbsResidualMinus1Log2[k])
                        isOverflow = true;
            }
            if (isOverflow)
                continue;
            auto bits = estimateBits(mode, residual);
            if (iMode == 0 || bits < best.bits) {
                best.prediction = pred;
                best.residual = residual;
                best.mode = mode;
                best.bits = bits;
            }
        }
        assert(node.childrenCount <= GNode::MaxChildrenCount);
        if (!_geom_unique_points_flag)
            encodeNumDuplicatePoints(node.numDups);
        encodeNumChildren(node.childrenCount);
        encodePredMode(best.mode);
/* if (
    _geom_angular_mode_enabled_flag && best.mode ==
GPredicter::Mode::Delta)
        encodePhiMultiplier(qphi);*/
        encodeResidual(best.residual);
        // convert spherical prediction to cartesian and re-calculate residual
        if (_geom_angular_mode_enabled_flag) {
            best.prediction = origin + _sphToCartesian(point);
            best.residual = reconPts[nodeIdx] - best.prediction;
            for (int k = 0; k < 3; k++)
                best.residual[k] =
                    int32_t(quantizer.quantize(best.residual[k]));
            encodeResidual2(best.residual);
        }
        // write the reconstructed position back to the point cloud
        for (int k = 0; k < 3; k++)
            best.residual[k] = int32_t(quantizer.scale(best.residual[k]));
        reconPts[nodeIdx] = best.prediction + best.residual;
        for (int k = 0; k < 3; k++)
            reconPts[nodeIdx][k] = std::max(0, reconPts[nodeIdx][k]);
        // NB: the coded order of duplicate points assumes that the
        duplicates
        // are consecutive -- in order that the correct attributes are coded.
        codedOrder[processedNodes++] = nodeIdx;
```

```
        for (int i = 1; i <= node.numDups; i++)
            codedOrder[processedNodes++] = nodeIdx + i;
        for (int i = 0; i < node.childrenCount; i++) {
            _stack.push_back(node.children[i]);
        }
    }
    return processedNodes;
}
```

Referring to the above code, when an angular index or the laser index is used for an azimuthal angle (or Phi) or an elevation angle according to the embodiments, since it is unnecessary to transmit the value of qphi related to quantization, and the commented code part (part written from "/*" to "*/") may be omitted, the transmission and reception efficiency of point cloud data increases.

FIGS. 51 to 54 illustrate tables illustrating improvement in coding performance according to a coordinate system conversion method according to embodiments. C1 represents lossy compression, CW represents lossless compression, and Cat3-frame represents LiDAR sequence data. Referring to FIGS. 51 to 54, when compressing LiDAR sequence data, data compression efficiency in lossy compression is improved.

Figure 55:
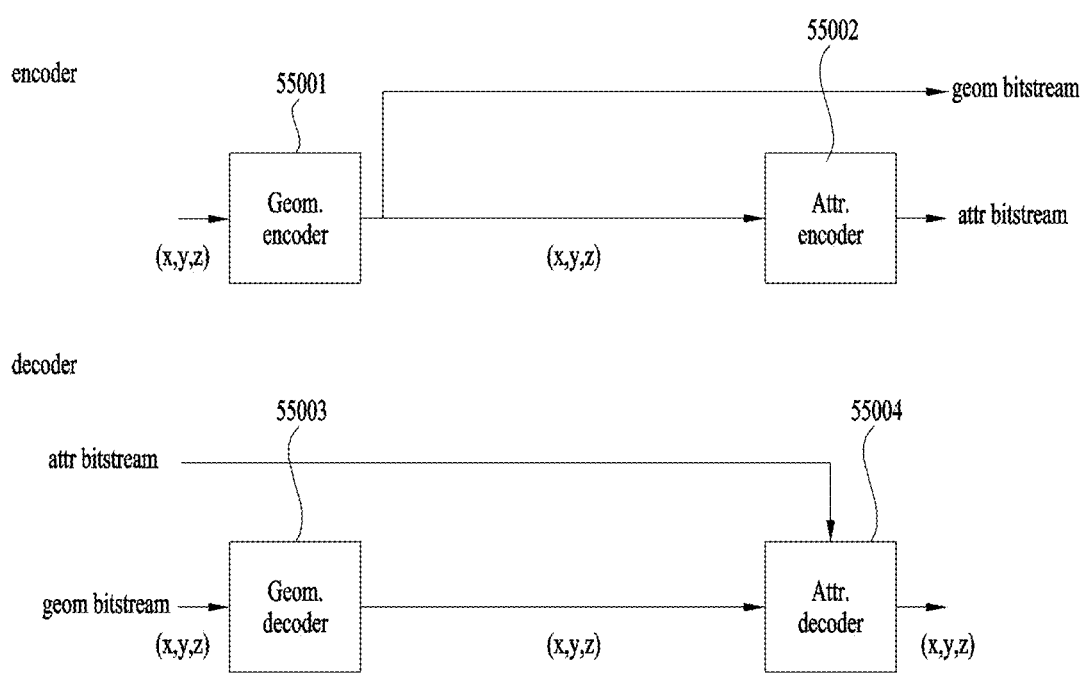
FIG. 55 illustrates coordinate system conversion in a point cloud data transmission device and reception device according to embodiments.

Meanwhile, FIG. 55 illustrates coordinate system conversion in a point cloud data transmission device and reception device according to embodiments. The upper side of FIG. 55 illustrates a data flow and coordinate conversion in the point cloud data transmission device according to the embodiments (e.g., encoder according to the embodiments), and the lower side of FIG. 55 illustrates a data flow and coordinate conversion in the reception device according to the embodiments (e.g., decoder according to the embodiments).

In FIG. 55, each of encoders 55001 and 55002 according to the embodiments may correspond to the encoder 10002 in FIG. 1, the encoding process 20001 in FIG. 2, the transmission device of FIG. 4, the transmission device of FIG. 12, the transmission device of FIG. 15, the transmission device of FIG. 64, or configurations thereof. In FIG. 55, each of decoders 55003 and 55004 according to the embodiments may correspond to the decoder 10006 in FIG. 1, the decoding process 20003 in FIG. 2, the reception device of FIG. 11, the reception device of FIG. 13, the reception device of FIG. 16, the reception device of FIG. 66, or configurations thereof.

When processing point cloud data, a coordinate system of input data, a coordinate system used for geometry coding (a geometry coding coordinate system), a coordinate system used for attribute coding (an attribute coding coordinate system), and a coordinate system of output data (an output coordinate system) may be different. Whether to convert a coordinate system and how to convert the coordinate system may differ depending on each coordinate system.

FIG. 55 illustrates processing of point cloud data defined in a Cartesian coordinate system. Input data and output data are defined in the Cartesian coordinate system, and output of geometry coding and output of attribute coding are also defined in the Cartesian coordinate system. Since geometry coding and attribute coding are performed in the same coordinate system, data may be processed without a separate coordinate system conversion process.

When a different coordinate system is used in each data processing process to improve compression performance according to the characteristics of data, a coordinate system of data may be converted before and after geometry coding or attribute coding. In this case, the point cloud data transmission device or reception device according to the embodiments may include a data converter as a component that performs coordinate system conversion of data.

The data converter may convert data into a coordinate system used in geometry coding or attribute coding or convert data into a coordinate system required in output data, by performing coordinate system conversion, index adjustment, or scaling of data. The transmission device or the reception device according to the embodiments may include an appropriate number of data converters according to data conversion conditions in a data processing process. In the data converter, a coordinate system may be converted into the Cartesian coordinate system, the cylindrical coordinate system, the spherical coordinate system, or the circular-sector-shaped coordinate system. The data converter may convert a coordinate system into a modified coordinate system by adjusting a coordinate-converted data value using an index or multiplying a scaling factor by the data value.

The data converter according to embodiments may correspond to the projector 64110 according to the embodiments described with reference to FIG. 64. That is, the data converter according to the embodiments may perform coordinate conversion, index adjustment, and scaling performed by the projector 64110.

Figure 56:
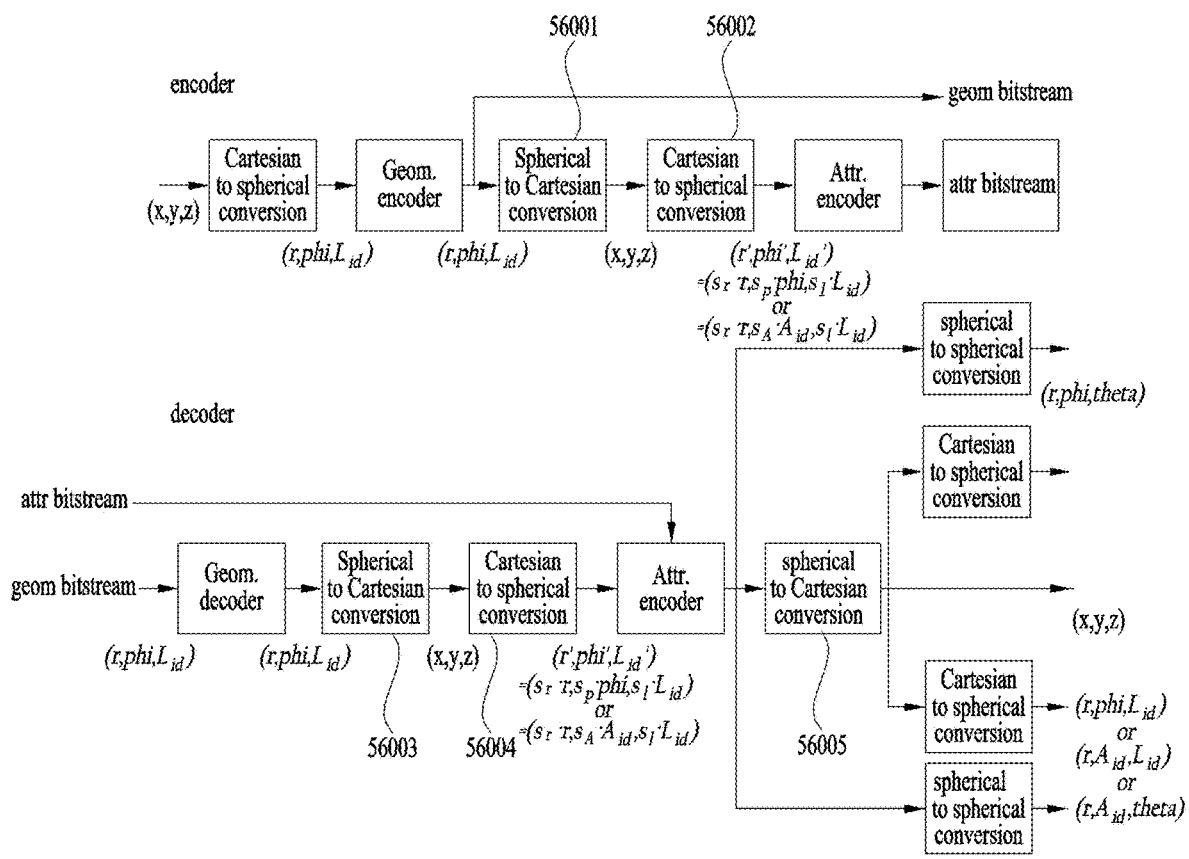
FIG. 56 illustrates coordinate system conversion in a point cloud data transmission device and reception device according to embodiments.

FIG. 56 illustrates coordinate system conversion in a point cloud data transmission device and reception device according to embodiments. That is, when a coordinate system of input data, a geometry coding coordinate system, an attribute coding coordinate system, and an output coordinate system are different from each other, FIG. 56 illustrates coordinate system conversion of data in the transmission device and reception device according to the embodiments.

The upper side of FIG. 56 illustrates a data flow and coordinate conversion in the point cloud data transmission device according to the embodiments (e.g., an encoder according to the embodiments), and the lower side of FIG. 56 illustrates a data flow and coordinate conversion in the point cloud data reception device according to the embodiments (e.g., a decoder according to the embodiments).

In FIG. 56, the encoder according to the embodiments may correspond to the encoder 10002 in FIG. 1, the encoding process 20001 in FIG. 2, the transmission device of FIG. 4, the transmission device of FIG. 12, the transmission device of FIG. 15, the transmission device of FIG. 64, or configurations thereof. In FIG. 56, the decoder according to the embodiments may correspond to the decoder 10006 in FIG. 1, the decoding process 20003 in FIG. 2, the reception device of FIG. 11, the reception device of FIG. 13, the reception device of FIG. 16, the reception device of FIG. 66, or configurations thereof.

Referring to FIG. 56, geometry coding may use a modified spherical coordinate system expressed as (r, phi, laser id), and attribute coding may use another modified spherical coordinate system expressed as scaled values.

When geometry coding and attribute coding are performed on the same coordinate system, coordinate system conversion may not be performed, but when coordinate system conversion is performed in the transmission device according to the embodiments, the reception device according to the embodiments performs the same coordinate system conversion.

Therefore, as illustrated in FIG. 56, the spherical coordinate system is converted into the Cartesian coordinate system with respect to the output of a geometry decoder (56003), and the Cartesian coordinate system is converted into the spherical coordinate system with respect to the input of an attribute decoder (56004). For reconstructed data, conversion into the Cartesian coordinate system again may be added (56005). However, such a processing process may be inefficient because the processing process includes a process of unnecessarily converting data into the Cartesian coordinate system regardless of an output result of requested data.

On the other hand, if there is a requirement for output data in the reception device according to the embodiments, data conversion into a coordinate system that meets the requirement may be performed. For example, when considering (s*r, s*A_id, s*L_id) as an output coordinate system, if a coordinate system used by the reception device according to the embodiments is (r, phi, theta), data needs to be converted into the output coordinate system. Here, s denotes each scaling factor multiplied by each coordinate value, and scaling factors multiplied by respective coordinate values may be different. A_id denotes an angular index and may be referred to as a horizontal direction index or an azimuthal index. L_id denotes a laser index and may be referred to as a vertical direction index or an elevation index.

In FIG. 56, blocks 56001, 56002, 56003, 56004, and 56005 in which coordinate system conversion or data conversion is performed may be referred to as data converters.

The data converter according to the embodiments may correspond to the projector 64110 according to the embodiments described with reference to FIG. 64. That is, the data converter according to the embodiments may perform coordinate system conversion, index adjustment, and scaling that the projector 64110 performs.

As another embodiment, a case of compressing input point cloud data defined in the spherical coordinate system may be considered. In this case, when geometry coding and attribute coding are defined in the same spherical coordinate system, compression may be performed without converting the coordinate system. However, when at least one of the geometry coding process or the attribute coding process uses a different coordinate system or a modified coordinate system, a coordinate system conversion process is required.

Figure 57:
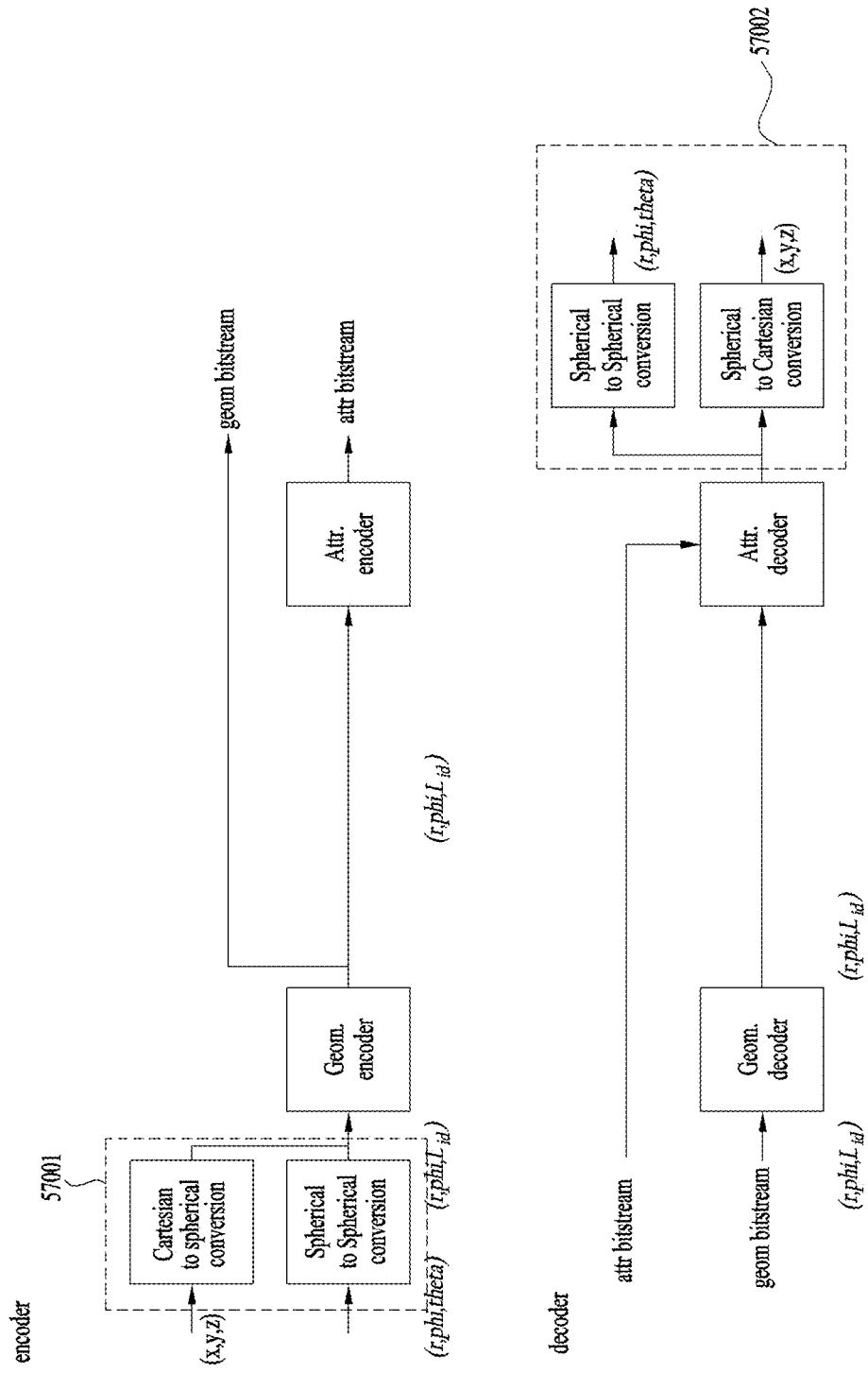
FIG. 57 illustrates coordinate system conversion in a point cloud data transmission device and reception device according to embodiments.

FIG. 57 illustrates coordinate system conversion in a point cloud data transmission device and reception device according to embodiments. The upper side of FIG. 57 illustrates a data flow and coordinate conversion in the point cloud data transmission device according to the embodiments (e.g., an encoder according to the embodiments), and the lower side of FIG. 57 illustrates a data flow and coordinate conversion in the point cloud data reception device according to the embodiments (e.g., a decoder according to the embodiments).

In FIG. 57, the encoder according to the embodiments may correspond to the encoder 10002 in FIG. 1, the encoding process 20001 in FIG. 2, the transmission device of FIG. 4, the transmission device of FIG. 12, the transmission device of FIG. 15, the transmission device of FIG. 64, or configurations thereof. In FIG. 57, the decoder according to the embodiments may correspond to the decoder 10006 in FIG. 1, the decoding process 20003 in FIG. 2, the reception device of FIG. 11, the reception device of FIG. 13, the reception device of FIG. 16, the reception device of FIG. 66, or configurations thereof.

FIG. 57 illustrates the case in which the same coordinate system (r, phi, L_id) is used in geometry coding and attribute coding. Therefore, input data ((r, phi, theta) or (x, y, z)) of a geometry encoder may be converted into (r, phi, L_id) (57001), and an output coordinate system (r, phi, L_id) of an attribute decoder may be converted into a spherical coordinate system (r, phi, theta) or a Cartesian coordinate system (x, y, z) (57002). Referring to FIG. 57, since the same coordinate system (r, phi, L_id) is used in geometry coding and attribute coding, an unnecessary coordinate system conversion process is not included, thereby increasing encoding or decoding efficiency. In FIG. 57, the output coordinate system of the decoder according to the embodiments may be the spherical coordinate system, the Cartesian coordinate system, the cylindrical coordinate system, or the circular-sector-shaped coordinate system. The output coordinate system of the decoder may include a value converted into an index or may be a scaled modified coordinate system. In FIG. 57, blocks 57001 and 57002 in which data is converted may be referred to as data converters.

The data converter according to embodiments may correspond to the projector 64110 according to the embodiments described with reference to FIG. 64. That is, the data converter according to the embodiments may perform coordinate system conversion, index adjustment, and scaling performed by the projector 64110.

Figure 58:
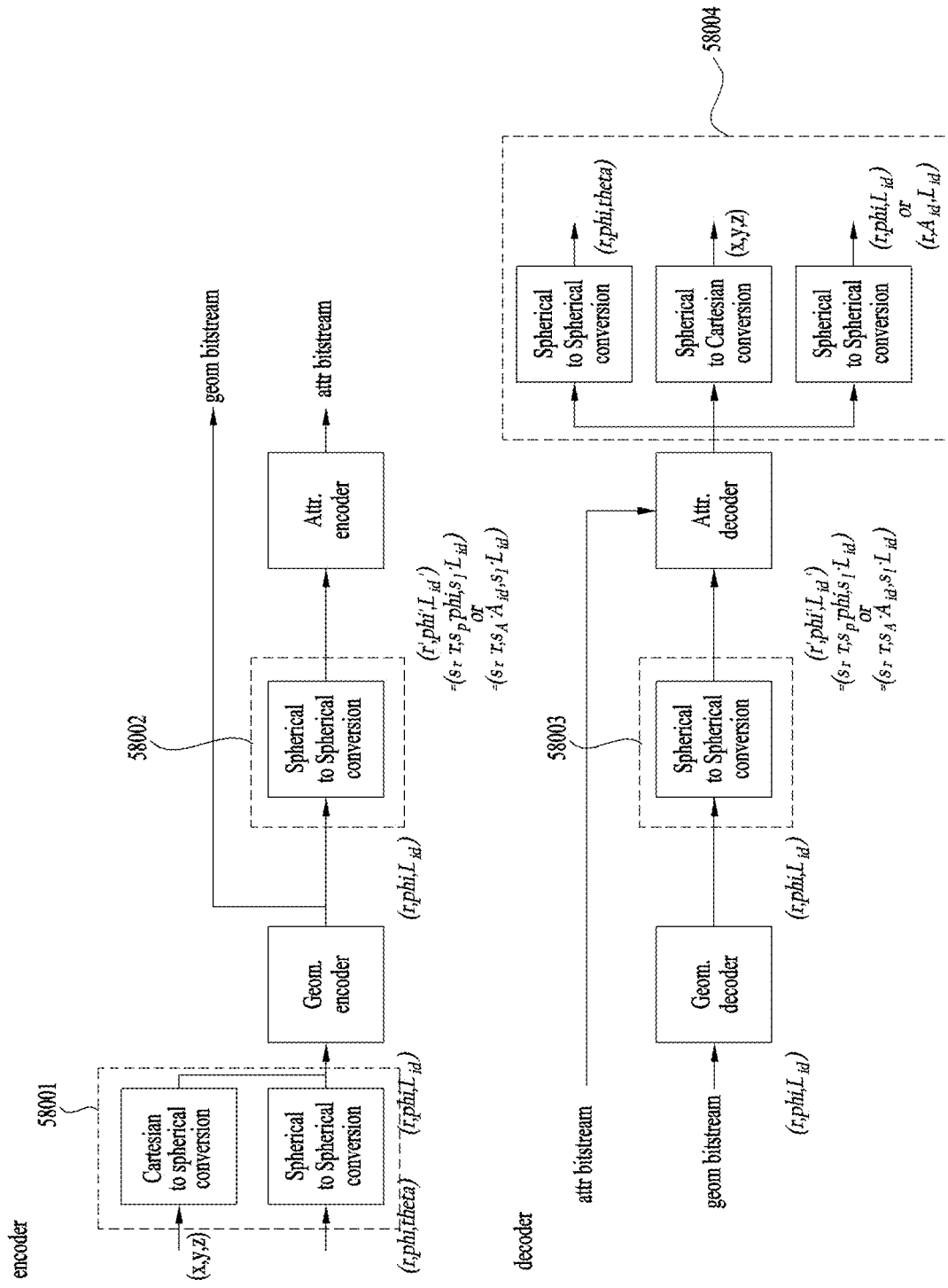
FIG. 58 illustrates coordinate system conversion in a point cloud data transmission device and reception device according to embodiments.

As another embodiment, FIG. 58 illustrates coordinate system conversion in a point cloud data transmission device and reception device according to embodiments. The upper side of FIG. 58 illustrates a data flow and coordinate conversion in the point cloud data transmission device according to the embodiments (e.g., an encoder according to the embodiments), and the lower side of FIG. 58 illustrates a data flow and coordinate conversion in the point cloud data reception device according to the embodiments (e.g., a decoder according to the embodiments).

In FIG. 58, the encoder according to the embodiments may correspond to the encoder 10002 in FIG. 1, the encoding process 20001 in FIG. 2, the transmission device of FIG. 4, the transmission device of FIG. 12, the transmission device of FIG. 15, the transmission device of FIG. 64, or configurations thereof. In FIG. 58, the decoder according to the embodiments may correspond to the decoder 10006 in FIG. 1, the decoding process 20003 in FIG. 2, the reception device of FIG. 11, the reception device of FIG. 13, the reception device of FIG. 16, the reception device of FIG. 66, or configurations thereof.

FIG. 58 illustrates an additionally required coordinate system conversion process when different coordinate systems are used in geometry coding and attribute coding. Referring to FIG. 58, a geometry encoder uses an (r, phi, L_id) coordinate system, and an attribute encoder uses an (r, phi, L_id) or (r, A_id, L_id) coordinate system to which scaling is applied. In this case, considering the coordinate system of attribute coding, conversion (58002) from the (r, phi, L_id) coordinate system to the (r, phi, L_id) or (r, A_id, L_id) coordinate system to which scaling is applied may be performed with respect to the output of geometry coding. In this way, when various coordinate systems are used in a data processing process, information about each coordinate system needs to be transmitted. When various coordinate systems are used, a conversion process of a coordinate system may be simplified by supporting various output coordinate systems. In FIG. 58, blocks 58001, 58002, 58003, and 58004 in which data conversion or coordinate system conversion is performed may be referred to as data converters and may be referred to as inverse data converters in the case of inverse projection.

The data converter according to embodiments may correspond to the projector 64110 according to the embodiments described with reference to FIG. 64. That is, the data converter according to the embodiments may perform coordinate system conversion, index adjustment, and scaling that the projector 64110 performs.

When using various coordinate systems for data processing, the point cloud data transmission device and reception device according to the embodiments support coordinate system information signaling and an output coordinate system, thereby efficiently performing the coordinate system conversion process.

Figure 59:
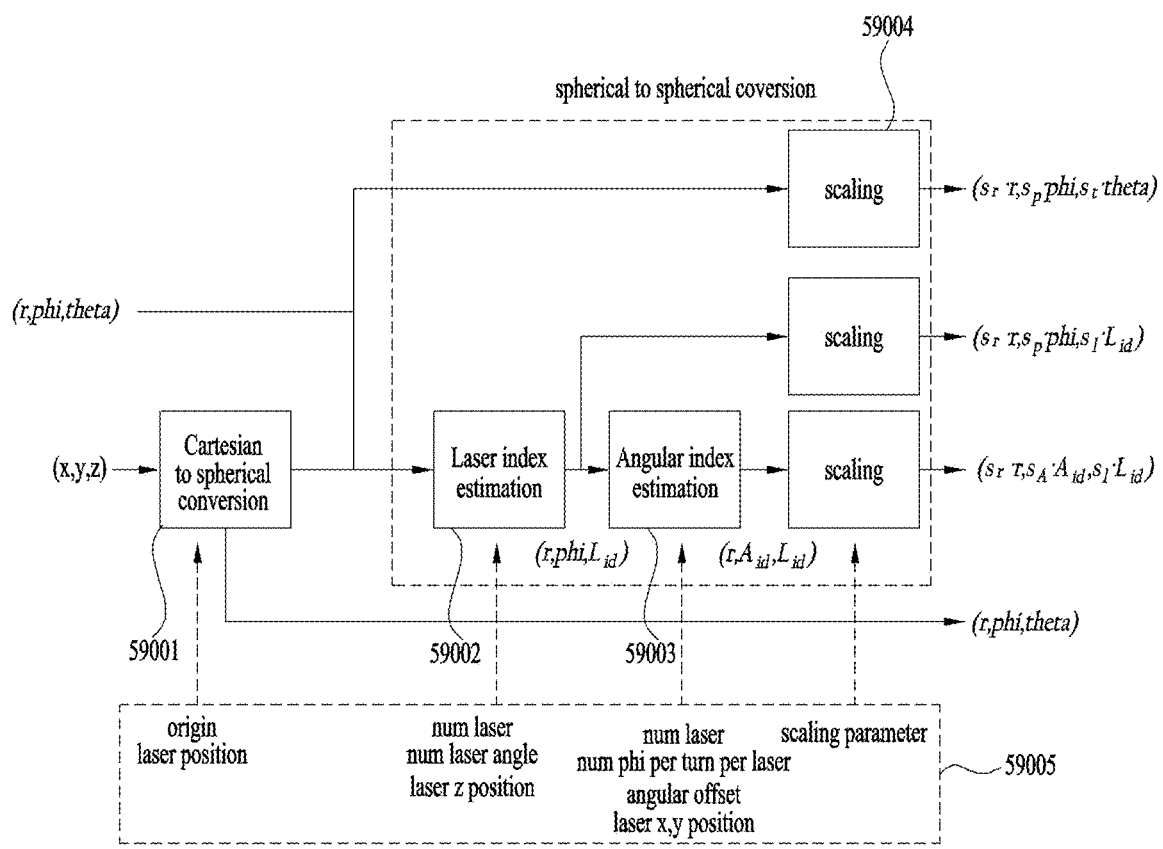
FIG. 59 illustrates an exemplary process of converting a coordinate system of point cloud data according to embodiments.

FIG. 59 illustrates an exemplary process of converting a coordinate system of point cloud data according to embodiments. FIG. 59 is a block diagram illustrating the data converters described with reference to FIGS. 55 to 58 in more detail. Coordinate system conversion (or data conversion) illustrated in FIG. 59 may be performed by the data converter according to the embodiments.

Conversion of a coordinate system according to the embodiments includes converting the coordinate system into a coordinate system of (r, phi, theta), (s*r, s*phi, s*laser index), or (s*r, s*angular index, s*laser index) with respect to input data represented as (x, y, z) or (r, phi, theta). In FIG. 59, "Cartesian to spherical conversion" indicates converting the coordinate system from (x, y, z) to (r, phi, theta).

The data converter includes a coordinate converter 59001, a laser index estimator 59002, an angular index estimator 59003, and a scaler 59004. The laser index estimator 59002 may estimate a laser index based on an elevation angle, theta, and on a laser angle. The angular index estimator 59003 may estimate an angular index based on phi or an azimuthal angle and num_phi_per_turn. The scaler 59004 may apply scaling to a data value corresponding to each axis. The coordinate converter 59001 may perform data conversion between various coordinate systems such as the Cartesian coordinate system, the spherical coordinate system, the cylindrical coordinate system, and the circular-sector-shaped coordinate system.

Meanwhile, FIGS. 22 and 34 to 41 illustrate scaling and index adjustment of an elevation angle or an azimuthal angle. The laser index estimator 59002, the angular index estimator 59003, and the scaler 59004 may perform index adjustment or scaling of data as described with reference to FIGS. 22 and 34 to 41. FIGS. 15 to 20 illustrate coordinate system conversion and projection of point cloud data according to the embodiments. The coordinate converter 59001 may convert data by converting the coordinate system as described with reference to FIGS. 15 to 20.

When the data converter is applied to geometry coding and attribute coding, some configurations of the data converter may be used. For example, if a coordinate system used for geometry coding is (r, phi, laser index) and a coordinate system used for attribute coding is (s*r, s*angular index, s*laser index), the (r, phi, laser index) coordinate system may be converted into the (s*r, s*angular index, s*laser index) coordinate system through the angular index estimator and the scaler of the data converter. The laser index may be referred to as L_id or a laser id. The angular index may be referred to as A_id or an angular id.

The coordinate converter 59001, the laser index estimator 59002, the angular index estimator 59003, and the scaler 59004 according to the embodiments may generate information 59005 related to the execution of each operation or perform each operation based on the related information.

The coordinate converter 59001, the laser index estimator 59002, the angular index estimator 59003, and the scaler 59004 according to the embodiments are not limited in operation to an order illustrated in FIG. 59 and may operate in various orders as needed.

The data converter according to embodiments may correspond to the projector 64110 according to the embodiments described with reference to FIG. 64. That is, the data converter according to the embodiments may perform coordinate system conversion, index adjustment, and scaling performed by the projector 64110.

Figure 60:
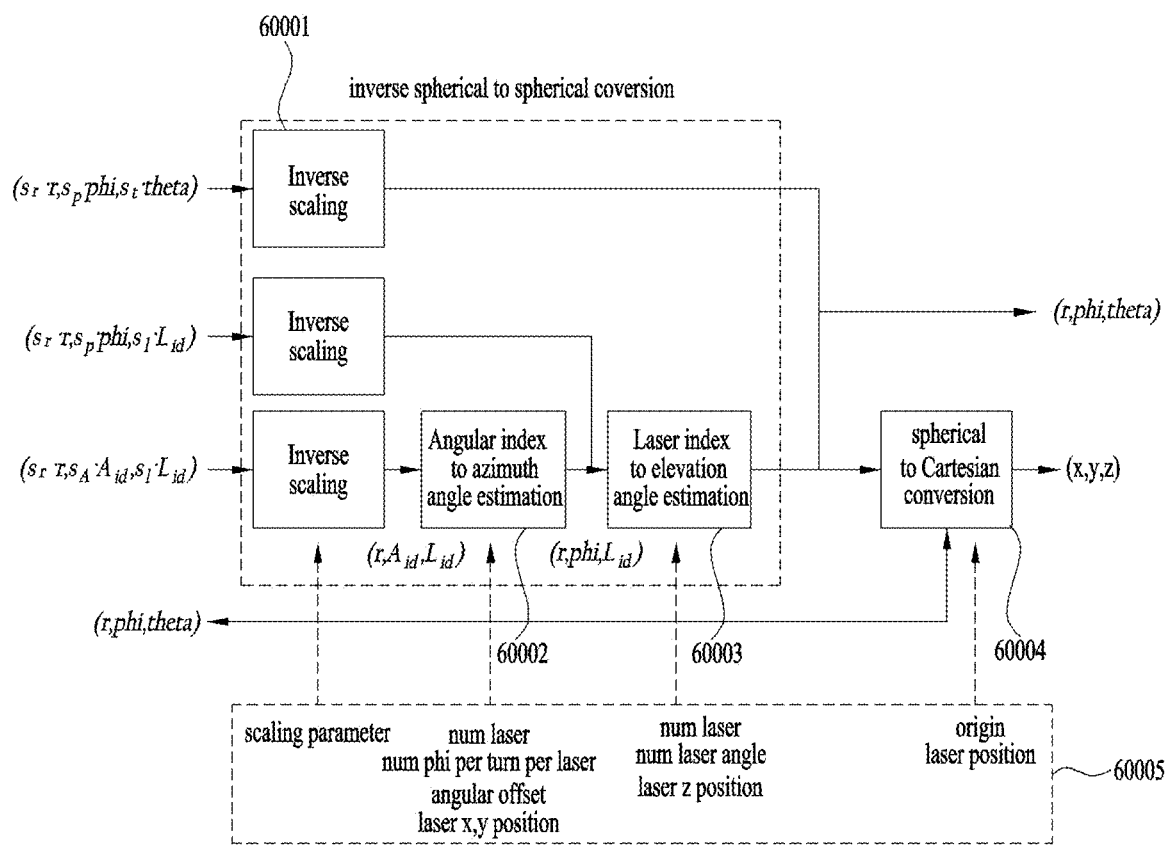
FIG. 60 illustrates an exemplary process of inversely converting a coordinate system of point cloud data according to embodiments.

FIG. 60 illustrates an exemplary process of inversely converting a coordinate system of point cloud data according to embodiments. This process is an inverse process of the process performed by the data converter and includes converting a scaled or index-adjusted data value to an original state. The process of inversely converting point cloud data according to the embodiments may be performed by an inverse data converter.

The inverse data converter may include an inverse scaler 60001, an azimuthal angle estimator 60002, an elevation angle estimator 60003, and a coordinate converter 60004. As illustrated in FIG. 60, the inverse scaler 60001 removes a scaling parameter from a coordinate value, and the azimuthal angle estimator 60002 and the elevation angle estimator 60003 convert an index-adjusted value (an angular index or a laser index) into an angle value. The coordinate converter 60004 may convert a coordinate system between the Cartesian coordinate system, the spherical coordinate system, the cylindrical coordinate system, and the circular-sector-shaped coordinate system.

On the other hand, the inverse scaler 60001, the azimuthal angle estimator 60002, the elevation angle estimator 60003, and the coordinate converter 60004 according to the embodiments may generate information 60005 related to the execution of each operation or perform each operation based on corresponding information.

In addition, the inverse scaler 60001, the azimuthal angle estimator 60002, the elevation angle estimator 60003, and the coordinate converter 60004 according to the embodiments are not limited in operation to an order illustrated in FIG. 60 and may operate in various orders as needed.

Meanwhile, the point cloud data transmission device according to the embodiments may transmit information about a geometry coding coordinate system, an attribute coding coordinate system, and an output coordinate system through signaling parameters as follows. The signaling parameters may be used independently or together with the signaling parameters defined above. Parameters may be defined in different locations depending on the range of application. When the parameters are equally applied to all sequences, the parameters may be defined in an SPS. When the parameters are equally applied to the entire geometry, the parameters may be defined in a GPS. When the parameters are equally applied to all attributes, the parameters may be defined in an APS. When the parameters are differently applied to respective frames, the parameters may be defined in a geometry data unit header or an attribute data unit header.

The parameters (metadata, signaling information, etc.) according to the embodiments may be generated by the transmission device according to the embodiments or a processor in a transmission method and may be transmitted to the reception device according to the embodiments so as to be used in a point cloud data decoding process or an output process. For example, the parameters according to the embodiments may be generated by the metadata processor (or metadata generator) of the transmission device according to the embodiments and may be obtained by the metadata parser of the reception device according to the embodiments.

FIG. 61 illustrates an exemplary syntax of an SPS according to embodiments. FIG. 62 illustrates an exemplary syntax of a GPS according to embodiments. FIG. 63 illustrates an exemplary syntax of an APS according to embodiments.

If an SPS output coordinate present flag (sps_output_coordinate_present_flag), an SPS geometry coding coordinate present flag (sps_geom_coding_coordinate_present_flag), and an SPS attribute coding coordinate present flag (sps_attr_coding_coordinate_present_flag) are 1, this indicates that information about an output coordinate system, a geometry coding coordinate system, and an attribute coding coordinate system is transmitted. If sps_output_coordinate_present_flag, sps_geom_coding_coordinate_present_flag, and sps_attr_coding_coordinate_present_flag are 0, this indicates that information about the output coordinate system, the geometry coding coordinate system, and the attribute coding coordinate system is not transmitted and may indicate that a default coordinate system defined in standard or in a system is used. If necessary, the default coordinate system may be signaled separately.

An output coordinate number (num_output_coordinate) may support a plurality of output coordinate systems when signaling an output coordinate system.

The output coordinate system may be a Cartesian coordinate system. If a coding coordinate system is a spherical coordinate system, thee output coordinate system may support both the Cartesian coordinate system and the spherical coordinate system.

If only the Cartesian coordinate system is supported as the output coordinate system and the spherical coordinate system is used by a renderer of the receiver, data should be converted from the Cartesian coordinate system to the spherical coordinate system. In this case, a data error may occur due to coordinate system conversion. However, when a coding coordinate system is the spherical coordinate system, coding output on the spherical coordinate system may be used to reduce the data error and coding efficiency may be increased by reducing unnecessary coordinate system conversion (spherical to Cartesian coordinate conversion in the decoder or Cartesian to spherical coordinate conversion in the renderer).

An SPS output coordinate type (sps_output_coordinate_type), a geometry coding coordinate type (geom_coding_coordinate_type), and an attribute coding coordinate type (attr_coding_coordinate_type) may indicate the types of coordinate systems used for output, geometry coding, and attribute coding, respectively. For sps_output_coordinate_type, geom_coding_coordinate_type, and attr_coding_coordinate_type of 0, a Cartesian coordinate system of (x, y, z) may be used. For sps_output_coordinate_type, geom_coding_coordinate_type, and attr_coding_coordinate_type of 1, a spherical coordinate system of (radius, phi, theta) may be used. For sps_output_coordinate_type, geom_coding_coordinate_type, and attr_coding_coordinate_type of 2, (r, phi, laser index) may be used. For sps_output_coordinate_type, geom_coding_coordinate_type, and attr_coding_coordinate_type of 3, (r, angular index, laser index) may be used. For sps_output_coordinate_type, geom_coding_coordinate_type, and attr_coding_coordinate_type of 4, (x, y, laser index) may be used. For sps_output_coordinate_type, geom_coding_coordinate_type, and attr_coding_coordinate_type of 5, scaled (r, phi, laser index) may be used. For sps_output_coordinate_type, geom_coding_coordinate_type, and attr_coding_coordinate_type of 6, scaled (r, angular index, laser index) may be used. For sps_output_coordinate_type, geom_coding_coordinate_type, and attr_coding_coordinate_type of 7, scaled (x, y, laser index) may be used. Here, sps_output_coordinate_type, geom_coding_coordinate_type, and attr_coding_coordinate_type of 2 and 3 represent coordinate systems having coordinate values of index adjusted values. sps_output_coordinate_type, geom_coding_coordinate_type, and attr_coding_coordinate_type of 5, 6, and 7 represent coordinate systems having scaled coordinate values. The scaled coordinate values indicate coordinate values multiplied by scaling factors.

As such, the type of a coordinate system includes various coordinate systems including at least one of an index-adjusted coordinate value or a scaled coordinate value. Accordingly, coordinate system conversion for efficient compression of data may be performed, data may be output in various forms, and data may be efficiently converted during data processing.

If the SPS output coordinate system type (sps_output_coordinate_type), the geometry coding coordinate system type (geom_coding_coordinate_type), and the attribute coding coordinate system type (attr_coding_coordinate_type) are not signaled, any one of the coordinate systems listed above may be defined as a default output coordinate system, a default geometry coding coordinate system, or a default attribute coding coordinate system, and if necessary, the default coordinate system may be delivered.

Coordinate system conversion coefficients required for each coordinate system may be transmitted through projection information (projection_info ( )). The coefficients may include an input/output coordinate system type, a scaling factor, a laser origin, the number of turns of a laser, the number of lasers, the position of a laser, and an elevation angle of a laser.

For example, if the SPS output coordinate system type (sps_output_coordinate_type) is 1, the geometry coding coordinate system type (geom_coding_coordinate_type) is 2, and the attribute coding coordinate system type (attr_coding_coordinate_type) is 6, this may indicate that the output coordinate system is a spherical coordinate system, the geometry coding coordinate system is (r, phi, laser id), and the attribute coding coordinate system is scaled (r, angular id, laser id). In this case, the reception device according to the embodiments needs to perform coordinate system conversion for converting a geometry decoding result from (r, phi, laser id) to scaled (r, angular id, laser id) prior to attribute decoding, and parameter information for this purpose (the number of turns of a laser, the number of lasers, and a scaling parameter) may be transmitted. In addition, coordinate system conversion should be performed to generate an output after attribute coding. In this case, information (a scaling factor, the number of turns of a laser, the number of lasers, the position of a laser, and an elevation angle of a laser) for generating (r, phi, theta) from scaled (r, angular id, laser id) may be delivered. In this way, according to the information about the output coordinate system, the geometry coding coordinate system, and the attribute coding coordinate system, the reception device according to the embodiments may perform coordinate system conversion suitable for each process, and the parameters required for this purpose may be simultaneously delivered at one position when information is present in an SPS, a GPS, and an APS or overlapping information is present therein.

FIG. 64 is a block diagram illustrating a cloud data transmission device 64000 according to embodiments.

The transmission device 64000 according to the embodiments may acquire point cloud data by the transmission device 10000 in FIG. 1, the transmission device of FIG. 4, the transmission device of FIG. 12, the XR device 1430 in FIG. 14, the transmission device 15000 of FIG. 15, and/or hardware including one or more processors or integrated circuits configured to communicate with one or more memories, software, firmware, or a combination of hardware, software, and firmware and encode and then transmit the point cloud data.

The transmission device 64000 includes an encoder that encodes point cloud data and a transmitter that transmits a bitstream including the encoded point cloud data. The encoder may include a geometry encoder that encodes geometry representing the positions of points of the point cloud data, and an attribute encoder that encodes attributes of the points.

In addition, the encoder may include a projector 64110 that projects the points of the point cloud data. The projector 64110 of the transmission device 64000 may convert coordinate values indicating the positions of the points into coordinate values of another coordinate system and project the points based on the converted coordinate values of the points. For example, the projector 64110 may convert coordinate values of a point expressed in a Cartesian coordinate system or an XYZ Cartesian coordinate system (a first coordinate system) into coordinate values of at least one of a cylindrical coordinate system, a spherical coordinate system, or a circular-sector-shaped coordinate system (a second coordinate system) (see FIG. 20). The projector 64110 projects the point on the Cartesian coordinate system (20003 in FIG. 20) having X', Y', and Z' axes based on the coordinate values of the point expressed in the second coordinate system. As a result, while the point is located in the Cartesian coordinate system (X', Y', Z') based on values (e.g., r, theta, phi) converted into the second coordinate system, a position in the existing spatial coordinate system of the point and a position in an X', Y', Z' spatial coordinate system are different. The first coordinate system or the second coordinate system may include at least one of the Cartesian coordinate system, the cylindrical coordinate system, the spherical coordinate system, or the circular-sector-shaped coordinate system.

Geometry information projected by the projector 64110 may be delivered to the attribute encoder. That is, geometry information used for attribute coding may have been projected. Additionally, attribute data which is sub-sampled based on a sub-sampled geometry may be encoded. The projector 64110 may generate related information (e.g., geo_projection_enable_flag or attr_projetion_enable_flag) according to a projection application range and transmit the generated information to the reception device according to the embodiments. Projection of the point cloud data may be applied to geometry coding and/or attribute coding.

The projector 64110 according to the embodiments corresponds to the data converter according to the embodiments described with reference to FIGS. 55 to 60. The projector 64110 may perform coordinate system conversion, index adjustment, and scaling performed by the data converter.

The projector 64110 according to the embodiments is described in more detail as follows. The projector 64110 according to the embodiments may include a coordinate converter 64111, a coordinate projector 64112, a laser position adjuster 64113, a sampling rate adjustor 64114, or a voxelizer 64115.

The coordinate converter 64111 converts coordinate values representing a position of input point cloud data. For example, the coordinate converter 64111 may convert the positions of points expressed in the XYZ rectangular coordinate system (e.g., Cartesian coordinate system) into positions of the cylindrical coordinate system, the spherical coordinate system, or the circular-sector-shaped coordinate system. In this case, the coordinate converter 64111 may generate information about a distribution range of the input point cloud data (e.g., orig_bounding_box_x_offset, orig_bounding_box_y_offset, orig_bounding_box_z_offset, orig_bounding_box_x_length, orig_bounding_box_y_length, and orig_bounding_box_z_length) and transmit the information to the reception device according to the embodiments. In addition, as information about the converted coordinate system, the coordinate converter 64111 may generate information about a center position and a distribution range of data (e.g., cylinder_center_x/y/z, cylinder_radius_max, cylinder_degree_max, cylinder_z_max, ref_vector_x/y/z, normal_vector_x/y/z, and clockwise_degree_flag) in the converted coordinate system and transmit the information to the reception device according to the embodiments.

The coordinate converter 64111 of FIG. 64 according to the embodiments corresponds to the coordinate converter 59001 of FIG. 59 according to the embodiments and may perform coordinate conversion between the Cartesian coordinate system, the spherical coordinate system, the cylindrical coordinate system, and the circular-sector-shaped coordinate system.

The coordinate projector 64112 is a component that projects points of point cloud data expressed through coordinate conversion. The coordinate projector 64112 may generate information about the range and scaling of the projected point cloud data (e.g., bounding_box_x/y/z_length and granularity_radius/angular/normal) and transmit the generated information to the reception device according to the embodiments.

FIGS. 15 to 20 illustrate conversion and projection of a coordinate system, and the related operation may be performed by the coordinate converter 64111 or the coordinate projector 64112 described above.

The laser position adjustor 64113 performs an adjustment process based on characteristics according to the position of a laser in a LiDAR structure. When a laser position adjustment flag (laser_position_adjustment_flag) is 1, the laser position adjustor 64113 may generate information necessary for correction, such as the number of lasers (num_laser), an r laser (r_laser), a z laser (z_laser), and a theta laser (theta_laser) and transmit the information to the reception device according to the embodiments. FIGS. 21 and 22 illustrate projection adjustment in consideration of the position of a laser, and a related operation may be performed by the laser position adjustor 64113.

The sampling rate adjustor 64114 may perform sampling rate adjustment for each axis. The sampling rate adjustor 64114 may generate sampling adjustment-related information (e.g., sampling_adjustment_cubic_flag, sampling_adjustment_spread_bbox_flag, and sampling_adjustment_type) and transmit the information to the reception device according to the embodiments. In addition, the sampling rate adjustor 64114 may convert an azimuthal angle or phi or an elevation angle into an azimuthal index or angular index or a laser index. That is, the sampling rate adjustor may perform adjustment by approximating or quantizing the azimuthal angle or the elevation angle of points.

FIGS. 34 to 39 describe adjustment through index conversion, approximation, or quantization of an azimuthal angle or elevation angle of a point of point cloud data, and the sampling rate adjustor 64114 according to the embodiments may perform a relation operation. That is, the projector 64110 according to the embodiments may perform sampling adjustment through coordinate system conversion, projection and index conversion, approximation, or quantization of point cloud data.

A description will be given from the viewpoint of the data converter (FIG. 59) corresponding to the above-described projector 64110. The encoder of the point cloud data transmission device according to the embodiments may include a data converter that converts point cloud data.

The data converter includes a coordinate converter that converts the point cloud data expressed in a first coordinate system into data of a second coordinate system. In this case, in the second coordinate system, at least one of coordinate values may be expressed as an azimuthal angle or an elevation angle. In addition, the first coordinate system and the second coordinate system may include at least one of the Cartesian coordinate system, the spherical coordinate system, the cylindrical coordinate system, or the circular-sector-shaped coordinate system.

In addition, the data converter may adjust at least one of the azimuthal angle or the elevation angle of the point cloud data to an index and scale the point cloud data. The index adjustment of the data converter may refer to the description of the angular index estimator and the laser index estimator of FIG. 59. For scaling of the data converter, reference may be made to the description of the scaler of FIG. 59.

Meanwhile, for the transmitter that transmits the bitstream, the bitstream includes information about a geometry coding coordinate system, an attribute coding coordinate system, and an output coordinate system. In addition, the information about the output coordinate system may include information about a coordinate system including at least one of an index-adjusted coordinate value or a scaled coordinate value.

The transmission device according to the embodiments may rearrange data based on distribution characteristics of the point cloud data through conversion of the point cloud data. Accordingly, the transmission device may arrange inefficiently distributed data (e.g., data having a lower density with increasing distance from the center) to have uniform distribution through projection and then transmit the data through compression with higher efficiency. In addition, the transmission device may efficiently compress data by performing coordinate system conversion and projection, and/or index adjustment considering sampling characteristics, based on the characteristics of the acquirer.

In addition, the transmission device according to the embodiments transmits information about conversion of point cloud data and information about a geometry coding coordinate system, an attribute coding coordinate system, and an output coordinate system, thereby reducing unnecessary coordinate system conversion in processing the point cloud data and increasing coding efficiency.

Figure 65:
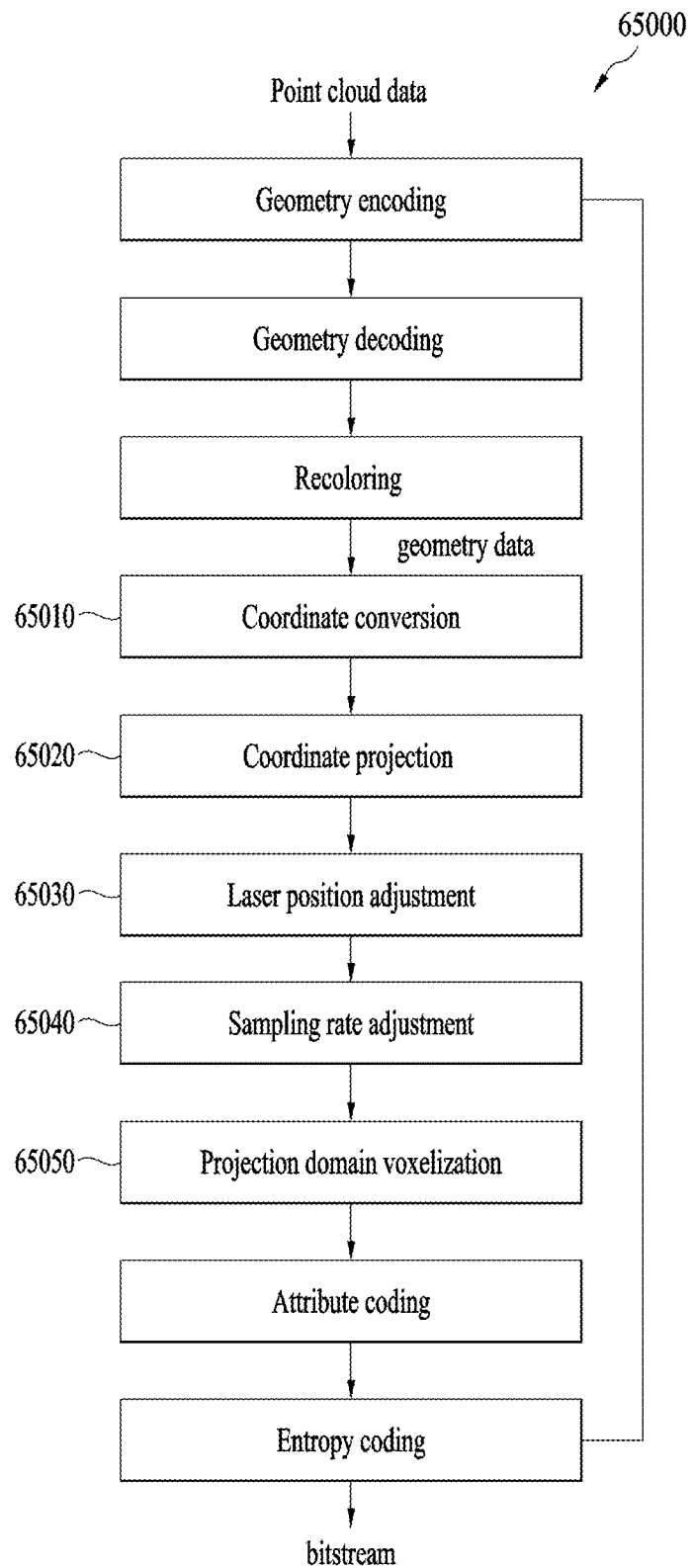
FIG. 65 illustrates an example of a point cloud data transmission method according to embodiments.
Figure 68:
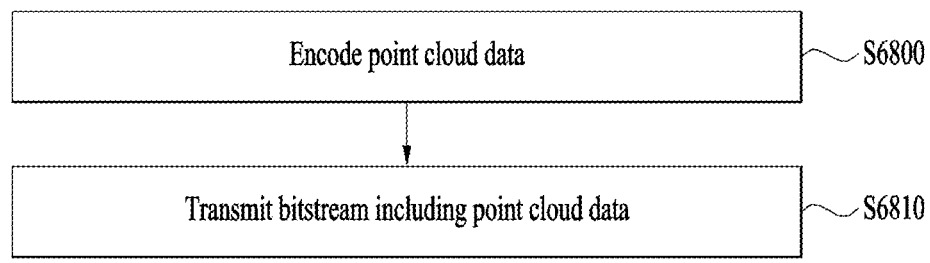
FIG. 68 illustrates an example of a point cloud data transmission method according to embodiments.

FIGS. 65 and 68 illustrate examples of point cloud data transmission methods according to embodiments. A point cloud data transmission method according to the embodiments includes encoding point cloud data (S6800) and transmitting a bitstream including the encoded point cloud data (S6810).

The point cloud data transmission method according to the embodiments may correspond to an operation of acquiring point cloud data by the transmission device 10000 in FIG. 1, the transmission device of FIG. 4, the transmission device of FIG. 12, the XR device 1430 in FIG. 14, the transmission device 15000 of FIG. 15, the transmission device 64000 of FIG. 64, and/or hardware including one or more processors or integrated circuits configured to communicate with one or more memories, software, firmware, or a combination of hardware, software, and firmware and encoding and then transmitting the point cloud data.

The operation S6800 of encoding the point cloud data may correspond to an operation of encoding the point could data by the point cloud video encoder 10002 in FIG. 1, the encoding process 20001 in FIG. 2, the encoder of FIG. 4, the transmission device of FIG. 12, the XR device 1430 in FIG. 14, the transmission device 1500 of FIG. 15, the transmission device 64000 of FIG. 64, and/or hardware including one or more processors or integrated circuits configured to communicate with one or more memories, software, firmware, or a combination of hardware, software, and firmware.

The operation S6810 of transmitting the bitstream including the point cloud data may correspond to an operation of transmitting the point could data by the transmitter 10003 in FIG. 1, the transmission processor 12012 in FIG. 12, the XR device 1430 in FIG. 14, the transmission device 15000 of FIG. 15, the transmission device 64000 of FIG. 64, and/or hardware including one or more processors or integrated circuits configured to communicate with one or more memories, software, firmware, or a combination of hardware, software, and firmware.

FIG. 65 illustrates the operation S6800 of encoding the point cloud data in more detail. The operation of encoding the point cloud data includes encoding geometry of a point of the point cloud data and encoding an attribute of the point of the point cloud data.

The operation of encoding the point cloud data includes converting the point cloud data. The operation of converting the point cloud data includes converting coordinates representing a position of a point expressed in a first coordinate system into coordinates of a second coordinate system (65010) and projecting the point based on the coordinates of the point expressed in the second coordinate system (65020).

The operation 65010 of converting a coordinate system corresponds to an operation performed by the coordinate converter 64111 according to the embodiments, and the operation 65020 of projecting the point corresponds to an operation performed by the coordinate projector 64112 according to the embodiments. In addition, the operation of converting the data may further include adjusting the point cloud data based on a position of a laser (65030) and adjusting a sampling rate (65040). The operation 65030 of adjusting the point cloud data based on the position of the laser may correspond to an operation performed by the laser position adjustor 64113 according to the embodiments, and the operation 65040 of adjusting the sampling rate may correspond to an operation performed by the sampling rate adjustor 64114 according to the embodiments. An operation performed in each procedure may correspond to an operation performed by each of components of the transmission device 64000, and the operation performed by each component has been described with reference to FIGS. 15 to 64.

Meanwhile, in terms of the data converter illustrated in FIG. 59, the operation of encoding the point cloud data may include converting the point cloud data, and the operation of converting the point cloud data may further include converting a coordinate system and adjusting the point cloud data to an index.

The operation of converting the coordinate system may include converting coordinates of the point cloud data represented as a first coordinate system into coordinates of a second coordinate system, and the operation of adjusting the point cloud data to the index may include adjusting an azimuthal angle or an elevation angle of the point cloud data to the index. The conversion of the coordinate system and index adjustment of the azimuthal angle or the elevation angle according to the embodiments may be performed by the projector 64110 of FIG. 64 or the data converter described with reference to FIGS. 55 to 59. Meanwhile, FIGS. 34 to 40 describe index adjustment of an angle.

The first coordinate system and the second coordinate system may include at least one of the Cartesian coordinate system, the spherical coordinate system, the cylindrical coordinate system, or the circular-sector-shaped coordinate system.

The operation of converting the point cloud data further includes scaling the point cloud data. The scaling operation may be performed by the projector 64110 of FIG. 64 or the data converter described with reference to FIGS. 55 to 59.

In the operation S6810 of transmitting the bitstream including the point cloud data, the bitstream includes information about a geometry coding coordinate system, an attribute coding coordinate system, and an output coordinate system. In addition, the information about the output coordinate system may include information about a coordinate system including at least one of an index-adjusted coordinate value or a scaled coordinate value. The data converter according to the embodiments may generate the information about the geometry coding coordinate system, the attribute coding coordinate system, or the output coordinate system or convert the point cloud data based on the information about the geometry coding coordinate system, the attribute coding coordinate system, or the output coordinate system.

FIG. 66 is a block diagram illustrating a point cloud data reception device 66000 according to embodiments.

The reception device 66000 according to the embodiments may receive and decode point cloud data by the reception device 10004 in FIG. 1, the reception device of FIG. 11, the reception device of FIG. 13, the XR device 1430 in FIG. 14, the reception device 16000 of FIG. 16, and/or hardware including one or more processors or integrated circuits configured to communicate with one or more memories, software, firmware, or a combination of hardware, software, and firmware.

The reception device 66000 according to the embodiments may include a receiver that receives a bitstream including point cloud data and a decoder that decodes the point cloud data The decoder may include a geometry decoder that decodes geometry representing the positions of points of the point cloud data, and an attribute decoder that decodes attributes of the points.

Referring to FIG. 66, the reception device 66000 according to the embodiments includes a re-projector 66110 that converts the point cloud data. The re-projector 66110 may include a coordinate converter and a coordinate projector.

The re-projector 66110 according to the embodiments may correspond to the data converter according to the embodiments described with reference to FIGS. 55 to 60, and the re-projector 66110 may perform coordinate system conversion, index adjustment, and scaling performed by the data converter. In addition, the data converter may correspond to the description given in relation to the transmission device of FIG. 64.

The coordinate projector projects a point of the point cloud data. The coordinate projector may re-convert the decoded point cloud data (X'Y'Z' coordinate system) in a 3-dimensional space according to a coordinate conversion type (coordinate_conversion_type) and receive and discern information about the range and scaling of the projected data (e.g., cylinder_center_x/y/z, cylinder_radius_max, cylinder_ degree_max, cylinder z_max, ref_vector_x/y/z, normal_vector_x/y/z, and clockwise_degree_flag).

The coordinate converter converts a coordinate system of the point of the point cloud data. For example, the coordinate converter may convert a cylindrical coordinate system into an XYZ Cartesian coordinate system and receive a projection type (projection_type) to acquire a method used for projection. In this case, the distribution range of the output point cloud data may be discerned through related information (e.g., orig_bounding_box_x/y/z_offset and orig_bounding_box_x/y/z_length). In addition, the coordinate converter may discern information about a coordinate system to be converted (e.g., cylinder_center_x/y/z, cylinder_radius_max, cylinder_degree_max, cylinder z_max, ref_vector_x/y/z, normal_vector_x/y/z, and clockwise_degree_flag) through signaling information.

The re-projector 66110 may or may not perform coordinate conversion and projection depending on whether received point cloud data has been projected. The received point cloud data may be projected (converted) point cloud data by the transmission device according to the embodiments or may not be the projected point cloud data. A coordinate system expressing the position of the point of the point cloud data may be at least one of the Cartesian coordinate system, the cylindrical coordinate system, the spherical coordinate system, or the circular-sector-shaped coordinate system, and the position of the point of the point cloud data may be expressed by another coordinate system through conversion of the coordinate system. The position of the point of the point cloud data may be projected based on a value expressed in a changed coordinate system.

Meanwhile, the re-projector 66110 may further include a laser position adjustor (not illustrated) and a sampling rate adjustor (not illustrated).

The laser position adjustor performs an adjustment process based on characteristics according to the position of a laser in a LiDAR structure. When a laser position adjustment flag (laser_position_adjustment_flag) is 1, the laser position adjustor may acquire information necessary for adjustment, such as the number of lasers (num_laser), an r laser (r_laser), a z laser (z_laser), and a theta laser (theta_laser). FIGS. 21 and 22 describe projection adjustment in consideration of the position of a laser, and a related operation may be performed by the laser position adjustor.

The sampling rate adjustor may perform sampling rate adjustment for each axis. The sampling rate adjustor may receive information about sampling adjustment (e.g., sampling_adjustment_cubic_flag, sampling_adjustment_spread_bbox_flag, and sampling_adjustment_type). In addition, the sampling rate adjustor may perform conversion of an azimuthal or angular index or a laser index with respect to an azimuthal angle or an elevation angle. That is, the sampling rate adjustor may perform adjustment approximation or quantization with respect to azimuthal angles or elevation angles of points.

FIGS. 34 to 39 describe adjustment through index conversion, approximation, or quantization of an azimuthal angle or an elevation angle and a related operation may be performed by the sampling rate adjustor. That is, the re-projector 66110 according to the embodiments may perform adjustment through coordinate system conversion, projection and index conversion, approximation, or quantization of point cloud data.

The re-projector 66110 according to the embodiments may correspond to the data converter according to the embodiments described with reference to FIGS. 55 to 60. In addition, the re-projector 66110 according to the embodiments may correspond to the projector 66110 according to the embodiments described with reference to FIG. 64. Accordingly, the re-projector 66110 according to the embodiments may perform coordinate system conversion, index adjustment, and scaling of point cloud data.

Meanwhile, the point cloud data reception device 66000 according to the embodiments may further include an index map generator 66120 and an inverse projector 66130.

The index map generator 66120 may generate an index map for reconstructed geometry (position) information. FIG. 24 describes an operation of generating a map between positions of projected points, position indexes, and decoded positions, which may be performed by the index map generator 66120.

The inverse projector 66130 is a component that changes attribute information reconstructed as an attribute with respect to a projected geometry into a domain for geometry information reconstructed to an original position. That is, inverse projection may be performed to reconstruct data to an original state by inversely performing a projection process of point cloud data. Inverse projection may convert the position of a point of point cloud data from a projected coordinate system to an existing coordinate system using an inverse projection equation. When projection is applied to attribute coding, attribute information is matched to an appropriate value and reconstructed by connecting the reconstructed geometry information to corresponding attribute information.

The reception device 66000 according to the embodiments may further include the inverse projector 66130 that inversely projects the position of a projected point of the point cloud data.

Meanwhile, the inverse projector 66130 according to the embodiments may correspond to the inverse data converter described with reference to FIG. 60. The inverse data converter may remove a scaling parameter, convert an index-adjusted value into an angle value, and convert a coordinate system to output data to an output coordinate system. The inverse data converter inversely converts the converted point cloud data.

The data converter and the inverse data converter according to the embodiments may convert or inversely convert the point cloud data based on information about the geometry coding coordinate system, the attribute coding coordinate system, and the output coordinate system.

By supporting various output coordinate system types and efficiently operating the data converter and the inverse data converter through signaling, the transmission device and the reception device according to the embodiments may efficiently process the point cloud data.

Figure 67:
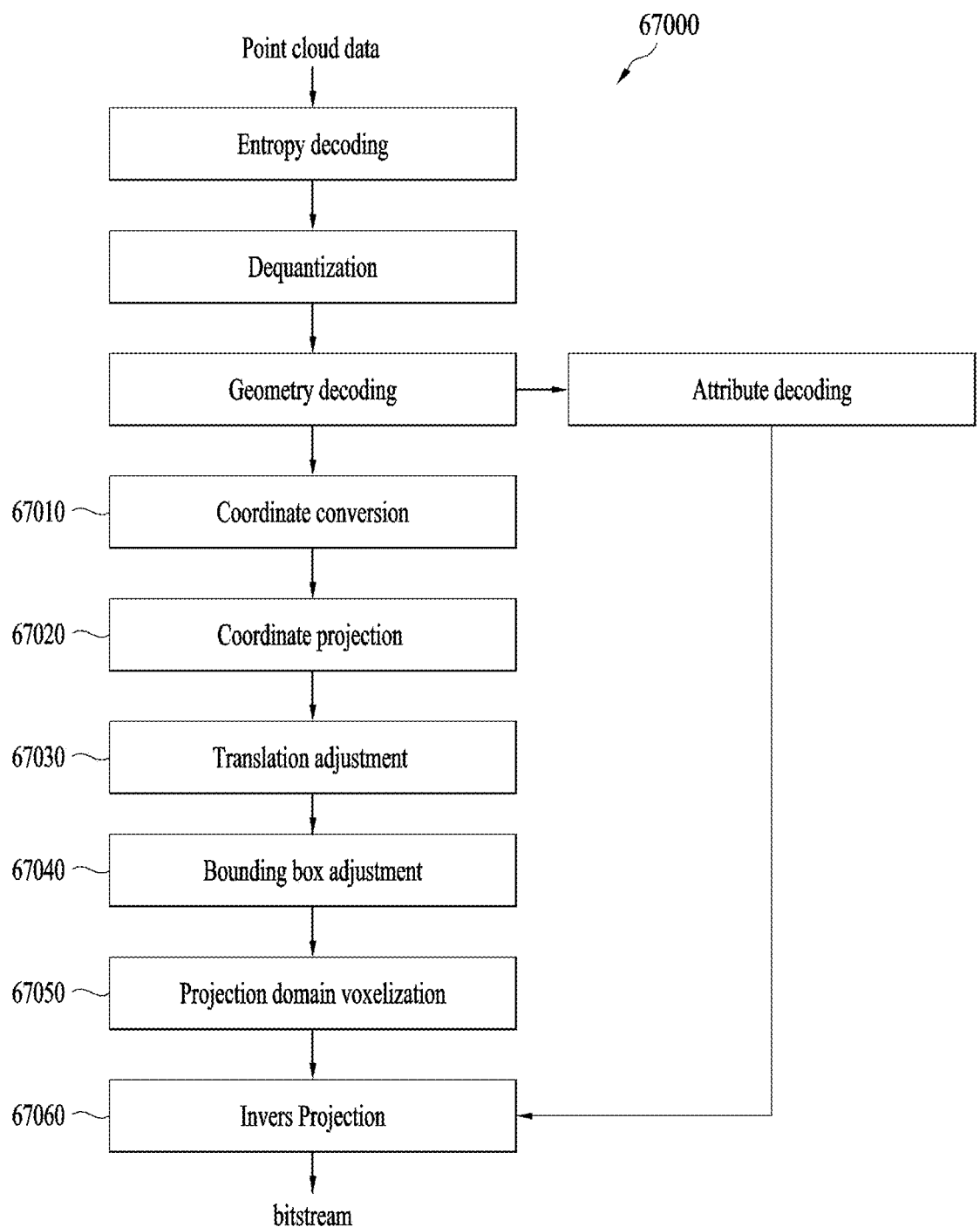
FIG. 67 illustrates an example of a point cloud data reception method according to embodiments.
Figure 69:
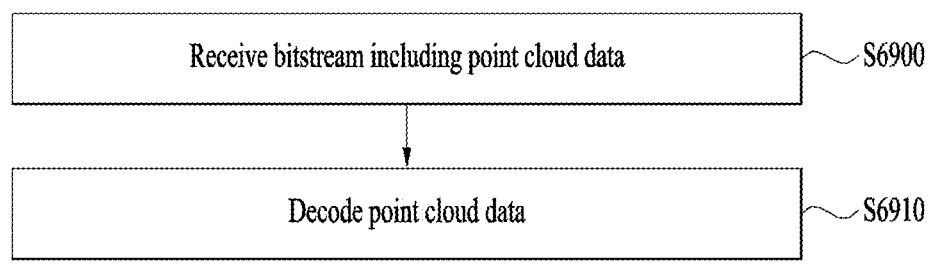
FIG. 69 illustrates an example of a point cloud data reception method according to embodiments.

FIGS. 67 and 69 illustrate examples of point cloud data reception methods according to embodiments. Referring to FIG. 69, the point cloud data reception method according to the embodiments may include receiving a bitstream including point cloud data (S6900) and decoding the point cloud data (S6910).

The reception method according to the embodiments may receive and decode point cloud data by the reception device 10004 in FIG. 1, the reception device of FIG. 11, the reception device of FIG. 13, the XR device 1430 in FIG. 14, the reception device 16000 of FIG. 16, the reception device 66000 of FIG. 66, and/or hardware including one or more processors or integrated circuits configured to communicate with one or more memories, software, firmware, or a combination of hardware, software, and firmware.

The operation S6900 of receiving the bitstream including the point cloud data may be performed by the reception device 10004 in FIG. 1, the reception devices of FIGS. 10 and 11, the reception device of FIG. 13, the XR device 1430 in FIG. 14, the reception device 16000 of FIG. 16, the reception device 66000 of FIG. 66, and/or hardware including one or more processors or integrated circuits configured to communicate with one or more memories, software, firmware, or a combination of hardware, software, and firmware.

The operation S6910 of decoding the point cloud data may be performed by the point cloud video decoder 10006 of FIG. 1, the reception devices of FIGS. 10 and 11, the reception device of FIG. 13, the XR device 1430 in FIG. 14, the reception device 1600 of FIG. 16, the reception device 66000 of FIG. 66, and/or hardware including one or more processors or integrated circuits configured to communicate with one or more memories, software, firmware, or a combination of hardware, software, and firmware.

Referring to FIG. 67, an operation 67000 of decoding point cloud data according to embodiments is illustrated. The decoding operation includes decoding geometry of the point cloud data and decoding an attribute of a point.

The operation 67000 of decoding the point cloud data according to the embodiments may further include converting the point cloud data. The converting the data may perform coordinate system conversion, index adjustment, and scaling on the point cloud data. The converting the data may be performed by the data converter described with reference to FIG. 59 or the re-projector 66110 described with reference to FIG. 66.

The converting the point cloud data may further include converting a coordinate system and projecting the coordinate system. The converting the coordinate system may include converting coordinates of a point of the point cloud data. The operation of converting the coordinate system corresponds to an operation performed by the coordinate converter of the reception device 66000. The operation of projecting the coordinate system includes projecting a point of the point cloud data. The operation of projecting the coordinate system corresponds to an operation performed by the coordinate projector of the reception device 66000.

The operation of converting the point cloud data may further include adjusting projection in consideration of a position of a laser and adjusting projection in consideration of a sampling rate. An operation performed in each procedure corresponds to an operation performed by a laser position adjustor (not illustrated) and a sampling rate adjustor (not illustrated) of the reception device 66000 according to the embodiments, and details related thereto are omitted because the description has been given above.

The operation 67000 of decoding the point cloud data according to the embodiments may further include inversely projecting the point cloud data. In the inverse projection operation, attribute information reconstructed as an attribute with respect to a projected geometry is changed into a domain for reconstructed geometry information. The operation performed in the inverse projection operation may correspond to the operation performed by the inverse projector 66130 of the reception 66000 according to the embodiments or the operation performed by the inverse data converter according to the embodiments described with reference to FIG. 60. That is, the operation 67000 of decoding the point cloud data may further include inversely converting the converted point cloud data. The inversely converting operation may remove scaling, convert an index to an angle, or convert a coordinate system. The operation of inversely converting the converted point cloud data may be performed by the inverse data converter described with reference to FIG. 60.

The transmission device according to the embodiments may rearrange data based on distribution characteristics of the point cloud data. Accordingly, the transmission device may arrange inefficiently distributed data (e.g., data having a lower density with increasing distance from the center) to have uniform distribution through projection and then transmit the data through compression with higher efficiency. In addition, the transmission device may efficiently compress data by performing coordinate system conversion and projection, and/or index adjustment considering sampling characteristics, based on the characteristics of the acquirer.

In addition, the transmission device according to the embodiments transmits information about conversion of point cloud data and information about a geometry coding coordinate system, an attribute coding coordinate system, and an output coordinate system, thereby reducing unnecessary coordinate system conversion in processing the point cloud data and increasing coding efficiency.

In addition, when a residual is generated by data prediction after index adjustment of point cloud data, the transmission device according to the embodiments may transmit the residual within $2\pi$, thereby increasing coding efficiency.

In addition, the reception method/device according to the embodiments efficiently reconstructs point cloud data, supports various output coordinate systems, and efficiently converts and outputs the coordinate system of data according to the coordinate system of required output data.

Point cloud data conversion according to embodiments may be applied to pre/post-processing independently of attribute coding. When point cloud data conversion is applied to geometry coding, point cloud data conversion may be applied to a pre-processing process of a prediction-based geometry coding method or to the prediction-based geometry coding method based on a converted position.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system. It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

What is claimed is:

1. A point cloud data transmission method by a device, comprising:
converting a coordinate of point cloud data from a Cartesian coordinate to a spherical coordinate;
encoding geometry data of the point cloud data;
converting a coordinate of reconstructed geometry data from the Cartesian coordinate to the spherical coordinate which includes at least one of a scaled radius, an angular identifier or a laser identifier;
encoding attribute data of the point cloud data; and
transmitting a bitstream including the point cloud data,
wherein the bitstream includes information for a scale factor related to the spherical coordinate for the attribute data.

2. The point cloud data transmission method of claim 1, wherein the spherical coordinate include at least one of an azimuthal angle or an elevation angle,
wherein the azimuthal angle or the elevation angle is adjusted based on an index.

3. The point cloud data transmission method of claim 1, wherein the specific coordinate includes at least one of a spherical coordinate system, a cylindrical coordinate system, or a circular-sector-shaped coordinate system.

4. The point cloud data transmission method of claim 1, wherein the bitstream includes information about a geometry coding coordinate system, an attribute coding coordinate system, and an output coordinate system.

5. The point cloud data transmission method of claim 4, wherein the information about the output coordinate system includes information about a coordinate system including at least one of an index-adjusted coordinate value or a scaled coordinate value.

6. A point cloud data transmission device, comprising:
a memory; and
at least one processor connected to the memory, wherein the at least one processor is configured to:
convert a coordinate of point cloud data from a Cartesian coordinate to a spherical coordinate;
encode geometry data of the point cloud data;
convert a coordinate of reconstructed geometry data from the Cartesian coordinate to the spherical coordinate which includes at least one of a scaled radius, an angular identifier or a laser identifier;
encode attribute data of the point cloud data; and
transmit a bitstream including the point cloud data,
wherein the bitstream includes information for a scale factor related to the spherical coordinate for the attribute data.

7. The point cloud data transmission device of claim 6, wherein the spherical coordinate include at least one of an azimuthal angle or an elevation angle, and
wherein the azimuthal angle or the elevation angle is adjusted based on an index.

8. The point cloud data transmission device of claim 6, wherein the bitstream includes information about a geometry coding coordinate system, an attribute coding coordinate system, and an output coordinate system, and
wherein the information about the output coordinate system includes information about a coordinate system including at least one of an index-adjusted coordinate value or a scaled coordinate value.

9. A point cloud data reception method by a device, comprising:
receiving a bitstream including point cloud data, and
decoding geometry data of the point cloud data;
converting a coordinate of the point cloud data from a spherical coordinate to a Cartesian coordinate;
converting the coordinate of the point cloud data from the Cartesian coordinate to the spherical coordinate which includes at least one of a scaled radius, an angular identifier or a laser identifier; and
decoding attribute data of the point cloud data,
wherein the bitstream includes information for a scale factor related to the spherical coordinate for the attribute data.

10. The point cloud data reception method of claim 9, wherein the spherical coordinate include at least one of an azimuthal angle or an elevation angle, and
wherein the azimuthal angle or the elevation angle is adjusted based on an index.

11. The point cloud data reception method of claim 9, wherein the specific coordinate includes at least one of at least one of a Cartesian coordinate system, a spherical coordinate system, a cylindrical coordinate system, or a circular-sector-shaped coordinate system.

12. The point cloud data reception method of claim 9, wherein the bitstream includes information about a geometry coding coordinate system, an attribute coding coordinate system, and an output coordinate system.

13. The point cloud data reception method of claim 12, wherein the information about the output coordinate system includes information about a coordinate system including at least one of an index-adjusted coordinate value or a scaled coordinate value.

14. A point cloud data reception device, comprising:
a memory; and
at least one processor connected to the memory, wherein the at least one processor is configured to:
receive a bitstream including point cloud data, and
decode geometry data of the point cloud data;

convert a coordinate of the point cloud data from a spherical coordinate to a Cartesian coordinate;

convert the coordinate of the point cloud data from the Cartesian coordinate to the spherical coordinate which includes at least one of a scaled radius, an angular identifier or a laser identifier; and decode attribute data of the point cloud data, wherein the bitstream includes information for a scale factor related to the spherical coordinate for the attribute data.

15. The point cloud data reception device of claim 14, wherein the spherical coordinate include at least one of an azimuthal angle or an elevation angle, and wherein the azimuthal angle or the elevation angle is adjusted based on an index.

16. The point cloud data reception device of claim 14, wherein the bitstream includes information about a geometry coding coordinate system, an attribute coding coordinate system, and an output coordinate system.

17. The point cloud data reception device of claim 16, wherein the information about the output coordinate system includes information about a coordinate system including at least one of an index-adjusted coordinate value or a scaled coordinate value.

* * * * *